United States Patent
Ishidai et al.

(10) Patent No.: US 9,062,225 B2
(45) Date of Patent: Jun. 23, 2015

(54) PRODUCTION PROCESS FOR COLORANT, COLORANT COMPOSITION, TONER, INK FOR INK JET RECORDING AND COLOR FILTER

(71) Applicants: Keiko Ishidai, Tokyo (JP); Kimihiko Ookubo, Tokyo (JP)

(72) Inventors: Keiko Ishidai, Tokyo (JP); Kimihiko Ookubo, Tokyo (JP)

(73) Assignee: KONICA MINOLTA BUSINESS TECHNOLOGIES, INC., Tokyo (JP)

(*) Notice: Subject to any disclaimer, the term of this patent is extended or adjusted under 35 U.S.C. 154(b) by 43 days.

(21) Appl. No.: 13/842,423

(22) Filed: Mar. 15, 2013

(65) Prior Publication Data
US 2013/0260306 A1 Oct. 3, 2013

(30) Foreign Application Priority Data

Mar. 27, 2012 (JP) ................................. 2012-072592

(51) Int. Cl.
C09B 67/42 (2006.01)
C09D 11/32 (2014.01)
C09B 67/22 (2006.01)
G02B 1/04 (2006.01)
G03G 9/09 (2006.01)
G03G 9/097 (2006.01)

(52) U.S. Cl.
CPC ............ *C09D 11/32* (2013.01); *C09B 67/0035* (2013.01); *G02B 1/04* (2013.01); *G03G 9/09* (2013.01); *G03G 9/0918* (2013.01); *G03G 9/09725* (2013.01)

(58) Field of Classification Search
USPC ............ 430/108.21, 137.1; 106/411; 252/586
See application file for complete search history.

(56) References Cited

U.S. PATENT DOCUMENTS

| | | | | |
|---|---|---|---|---|
| 3,094,536 A | * | 6/1963 | Kenney et al. | 540/128 |
| 5,872,248 A | * | 2/1999 | Cheng et al. | 540/128 |

FOREIGN PATENT DOCUMENTS

| | | | | |
|---|---|---|---|---|
| CN | 101206418 | | 6/2006 | |
| DE | 3513273 | * | 3/1986 | ............ C09B 47/067 |
| EP | 1 936 441 | | 6/2008 | |
| JP | 63-005093 | | 1/1988 | |
| JP | 63-316789 | | 12/1988 | |
| JP | 03-157388 | | 7/1991 | |
| JP | 03-231975 | | 10/1991 | |
| JP | 05-148436 | | 6/1993 | |
| JP | 05-186723 | | 7/1993 | |
| JP | 05-295312 | | 11/1993 | |
| JP | 06-157536 | | 6/1994 | |
| JP | 06-256355 | | 9/1994 | |
| JP | 06-329947 | | 11/1994 | |
| JP | 07-070490 | | 3/1995 | |
| JP | 07-082515 | | 3/1995 | |
| JP | 07-097541 | | 4/1995 | |
| JP | 07-118584 | | 5/1995 | |
| JP | 08-029934 | | 2/1996 | |
| JP | 08-143581 | | 6/1996 | |
| JP | 09-015904 | | 1/1997 | |
| JP | 10-251260 | | 9/1998 | |
| JP | 2001-089682 | | 4/2001 | |
| JP | 2002-020390 | | 1/2002 | |
| JP | 2008-176311 | | 7/2008 | |
| JP | 2009-126960 | | 6/2009 | |
| JP | 2009-128750 | * | 6/2009 | ............ G03G 9/09 |
| JP | 2009-139933 | | 6/2009 | |
| JP | 2009-180980 | | 8/2009 | |
| JP | 2010-019891 | | 1/2010 | |
| JP | 2011-085687 | | 4/2011 | |
| JP | 2011-219644 | | 11/2011 | |

OTHER PUBLICATIONS

Translation of JP 2009-128750 published Jun. 2009.*
Translation of abstract of DE 3513273 published Mar. 1986.*
European Search Report EP 13 16 1490 (7 pages).
Database WPI, Week 200941, Thomson Scientific, London, GB; AN 2009-K17424; XP-002697516, and English Abstract from JP 2009-128750 (2 pages).
Database WPI, Week 201131, Thomson Scientific, London, GB, AN 2011-E38237, XP002697517, and English Abstract from JP 2011-085687 (2 pages).
Database WPI, Week 201176, Thomson Scientific, London, GB, AN 2011-N68525, XP002697518, and English Abstract from JP 2011-219644 (2 pages).
Database WPI, Week 200956, Thomson Scientific, London, GB, AN 2009-M44530, XP002697519, and English Abstract from JP 2009-180980 (2 pages).
Canadian. Journal of Chemistry, 1980, vol. 58, pp. 1281-1294.
Chelate Chemistry (5)—Experimental Methods in Complex Chemistry (I), Keihei Ueno, Nanko-Do, Ltd. Mar. 15, 1975, pp. 438-443.
English translation of Chinese Office Action, The First Notification of Reasons for Refusal, Patent Application No. 201310100743.1, Publication Date: Oct. 23, 2014.

* cited by examiner

*Primary Examiner* — Peter Vajda
(74) *Attorney, Agent, or Firm* — Lucas & Mercanti, LLP

(57) ABSTRACT

Provided is a production process for a colorant which contains a silicon phthalocyanine compound making it possible to reach a targeted particle diameter even by a conventional dispersing method and which is excellent in performances such as a color reproducibility, a light fastness, an electrostatic property, a transparency and the like, and a colorant composition, a toner, an ink for ink jet recording and a color filter which are excellent in the above performances.
The above production process is a production process for a colorant containing a silicon phthalocyanine compound and a copper phthalocyanine compound and is characterized by having a preparing step of reacting raw materials of a silicon compound and phthalocyanine under the presence of a copper salt or the copper phthalocyanine compound described above to prepare the silicon phthalocyanine compound described above.

6 Claims, No Drawings

PRODUCTION PROCESS FOR COLORANT, COLORANT COMPOSITION, TONER, INK FOR INK JET RECORDING AND COLOR FILTER

CROSS-REFERENCE TO RELATED APPLICATIONS

This application claims the foreign priority benefit under Title 35, United States Code, 119 (a)-(d) of Japanese Patent Application No. 2012-072592, filed on Mar. 27, 2012 in the Japan Patent Office, the disclosure of which is herein incorporated by reference in its entirety.

BACKGROUND OF THE INVENTION

1. Field of the Invention

The present invention relates to a production process for a colorant containing a silicon phthalocyanine compound and a copper phthalocyanine compound and a colorant composition containing the colorant produced by the above production process. Further, the present invention relates to an image recording material and a color filter prepared by using the above colorant composition.

2. Description of the Related Art

In recent years, particularly materials for forming color images are used mainly for an image recording material, and application fields of color compositions include, to be specific, ink jet recording materials, electrophotographic recording materials, recording materials of a thermal transfer system, optical recording media, transfer system silver halide photosensitive materials, printing inks, recording pens and the like. Also, color filters are used in order to record and reproduce color images in image sensors such as CCD and the like in a case of photographic equipments and in LCD and PDP in a case of displays. In the above color image recording materials and color filters, dyes of so-called three primary colors in an additive color process and a subtractive color process are used in order to reproduce or record full color images. However, solid dyes which have absorption characteristics capable of reproducing preferred color regions and which can stand various use conditions and environmental conditions are desired in the dyes of the three primary colors described above.

An image-forming method by an electrophotographic system has come to be used widely not only in conventional copying and printout of business documents but also in the field of on-demand printing. Output images themselves are products in the above light printing areas, and therefore the high image quality is naturally required.

In an image-forming method by an electrophotographic system, toners containing copper phthalocyanine compounds have so far been used principally as a cyan toner. However, the above toners have involved the problem that images which are output by using the cyan, toner alone or using it in combination with toners of other colors such as yellow (Y), magenta (M), black (K) and the like have a narrower color gamut than those of displays and that they are low particularly in a saturation.

In recent years, it has become clear that silicon phthalocyanine compounds are effectively used as a colorant for toners which have solved the above problems (refer to, for example, JP-A 2008-176311 and 2009-139933). However, it has been found that single use of the toners prepared by using the silicon phthalocyanine compounds as the colorant provides the vivid tones with an improved color reproducibility but the dark tones with an inferior color reproducibility Accordingly, there has been proposed a technique in which from the viewpoint of improving the color reproducibility, a specific silicon phthalocyanine compound and a copper phthalocyanine compound are caused to be coexistent in a specific proportion and dispersed to produce a toner, whereby they are acted complementarily to obtain the high color reproducibility in a broad color gamut of a vivid tone to a dark tone (refer to, for example, JP-A 2009-128750).

Further, it has become possible to form toner images having both of a color reproducibility and a light fastness by using a toner which contains a silicon phthalocyanine compound as a colorant having a number average primary particle diameter of 30 nm or more and 200 nm or less and which has a number average particle diameter larger by 1.2 to 2.5 times than a number average primary particle diameter of the colorant in a state in which the colorant is contained in the toner particles (refer to, for example, JP-A 2010-19891).

On the other hand, it has become apparent that toners prepared by using silicon phthalocyanine as a colorant bring about the problem that dispersion in distribution of an electrostatic property in the toner causes the toner to scatter in a form of very fine powder in developing to stain an inside of the image forming equipment. Accordingly, toners containing silicon phthalocyanine compounds are mixed with toners containing copper phthalocyanine compounds in a specific proportion, whereby distribution of an electrostatic property in the toner particles in the whole part of the toner is uniformized, and stain in an inside of the equipment caused by scattering of the toners in developing has been solved (refer to, for example, JP-A 2011-85687).

An ink jet recording method is a printing method in which small droplets of an ink composition are blown and attached onto a recording medium such as paper and the like to carry out printing. The colors of the images obtained are reproduced by ink compositions of three colors which are divided roughly into cyan, magenta and yellow.

Phthalocyanine dyes are widely used for a cyan ink composition at present since they are high in a chromaticity, a light fastness and a heat resistance, and particularly Direct Blue 199 is widely used as a dye for a cyan ink for ink jet printing. Direct Blue 199 has an excellent light fastness and an excellent heat resistance, but it has the defects that it has a high absorption in magenta color region in a reflection spectrum of images and is unsatisfactory in a color reproducibility and that it has no resistance against oxidizing substances such as nitrogen oxides (NOx) and the like in the atmosphere and is faded for a short time.

On the other hand, a high transparency is required to color filters, and a high light fastness is required as well thereto in order to prevent fading and discoloring which are caused by light coming from backlights. Color filters have so far been colored by a method called a dyeing method in which they are colored with dyes, but the heat resistance and the light fastness have been unsatisfactory even by using phthalocyanine dyes which are excellent in a light fastness and a heat resistance. Also, it is known that even pigments which are considered to be excellent in a light fastness and a heat resistance are deteriorated in a light fastness by pulverizing into fine particles, and they have to be improved in a light fastness while maintaining the characteristics of a high transparency and a high color purity.

Accordingly, inks for ink jet and color filters which are prepared by using silicon phthalocyanine and which are excellent in all of a hue, a heat resistance and a light fastness are proposed (refer to, for example, JP-A 2009-126960).

On the other hand, a large number of technologies for developing the characteristics which are different from the absorption characteristics of original compounds by a solid solution (or mixed crystal) technology in which plural compounds are mixed in a molecular state has so far been known in cases of azo pigments, quinacridone pigments, diketopyrrolopyrrole pigments and the like. Also in a case of phthalocyanine pigments, disclosed is a method in which the raw materials of copper phthalocyanine and aluminum phthalocyanine are mixed in the reaction to synthesize them, whereby bluish green mixed crystals making it possible to form sharp and transparent images are obtained (refer to, for example, JP-A 2001-89682).

In conventional techniques, however, the following problems are involved.

The problem that the color reproducibility is still unsatisfactorily improved is involved in the technique described in JP-A 2009-128750. Further, in the technique described in JP-A 2010-19891, the colorant has to be dispersed by using a medium which is as very fine as 50 to 300 nm. Accordingly, desired to be developed are silicon phthalocyanine compounds which make it possible to reach a targeted particle diameter only by a conventional method using a medium (a bead mill and the like) having a diameter of several ten to several hundred μm. Also, in the technique described in JP-A 2011-85687, the color reproducibility has to be further improved, and a countermeasure which makes it possible to cause the color reproducibility to be compatible with an electrostatic property of the toner particles is desired to be employed. Further, in the technique described in JP-A 2009-126960, if the colorant particles can be dispersed in a fine form as is the case with the toner, the high transparency is obtained while maintaining the heat resistance and the light fastness. However, long time is necessary for dispersing the particles of the colorant in a fine form, and therefore silicon phthalocyanine compounds which make it easy to reach a targeted particle diameter by a conventional dispersing method are desired to be developed. In addition, in the technique described in JP-A 2001-89682, there is a room for improving the performances of the image recording material such as a color reproducibility, a light fastness, an electrostatic property, a transparency and the like, and the performances are desired to be further improved. Incidentally, in the technique described in JP-A 2001-89682, it is characterized by using aluminum phthalocyanine, and compounds of metals other than aluminum, such as silicon compounds and the like are not assumed at all to be used.

The present invention has been made in light of the problems described above, and an object thereof is to provide a production process for a colorant which contains a silicon phthalocyanine compound making it possible to reach a targeted particle diameter even by a conventional dispersing method and which is excellent in performances such as a color reproducibility, a light fastness, an electrostatic property, a transparency and the like, and a colorant composition, a toner, an ink for ink jet recording and a color filter which are excellent in the above performances.

To achieve at least one of the above-mentioned objects, a production process reflecting one aspect of the present invention comprises:

1. A production process for a colorant containing a silicon phthalocyanine compound and a copper phthalocyanine compound, comprising a preparing step of reacting raw materials of a silicon compound and phthalocyanine under the presence of a copper salt or the copper phthalocyanine compound described above to prepare the silicon phthalocyanine compound described above.

2. The production process for a colorant as described in the above aspect 1, wherein the silicon phthalocyanine compound is represented by the following Formula (1):

Formula (1)

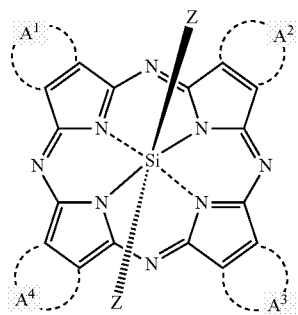

[wherein Z represents a chlorine atom, a hydroxyl group, an alkyl group, an alkoxy group, an aryloxy group or a group represented by the following Formula (2); and $A^1$ to $A^4$ represent the following atomic groups (a-1) to (a-7) which may have substituents]:

Formula (2)

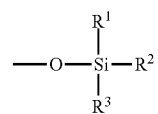

[wherein $R^1$ to $R^3$ each represent independently an alkyl group, an aryl group or a siloxy group]:

(a-1)

(a-2)

(a-3)

(a-4)

(a-5)

(a-6)
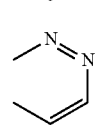

-continued

(a-7)

3. The production process for a colorant as described in the above aspect 1 or 2, wherein the copper phthalocyanine compound is represented by the following Formula (3):

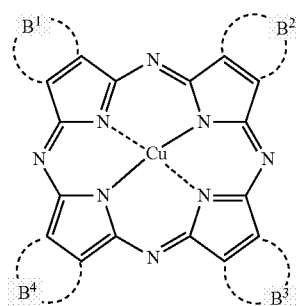
Formula (3)

[wherein $B^1$ to $B^4$ have the same definitions as those of $A^1$ to $A^4$ in Formula (1)].

4. The production process for a colorant as described in any of the above aspects 1 to 3, comprising a preparing step of reacting the raw materials of the silicon compound and the phthalocyanine under the presence of the copper salt to prepare the silicon phthalocyanine compound.

5. The production process for a colorant as described in any of the above aspects 1 to 4, wherein the cooper salt is copper chloride.

6. The production process for a colorant as described in any of the above aspects 1 to 5, wherein a ration (m1:m2) of a mass content (m1) of the silicon phthalocyanine compound contained in the colorant to a mass content (m2) of the copper phthalocyanine compound contained in the colorant is 99:1 to 80:20.

7. A colorant composition comprising the colorant produced by the production process as described in any of the above aspects 1 to 6.

8. A toner comprising the colorant composition as described in the above aspect 7.

9. An ink for ink jet recording comprising the colorant composition as described in the above aspect 7.

10. A color filter comprising the colorant composition as described in the above aspect 7.

MODES FOR CARRYING OUT THE PRESENT INVENTION

Embodiments for carrying out the present invention shall be explained below in detail, but the present invention shall not be restricted to them.

<<Production Process For a Colorant>>

The production process for a colorant according to the present invention is a production process for a colorant containing a silicon phthalocyanine compound and a copper phthalocyanine compound, and it comprises a preparing step of reacting raw materials of a silicon compound and phthalocyanine under the presence of a copper salt or the copper phthalocyanine compound described above to prepare the silicon phthalocyanine compound described above.

First, the silicon phthalocyanine compound and the copper phthalocyanine compound shall be explained, and then a step of preparing the silicon phthalocyanine compound shall be explained. The copper phthalocyanine compound mixed in the preparing step and the copper phthalocyanine compound contained in the colorant produced are the same substance. Also, the silicon phthalocyanine compound contained in the colorant may be at least one of the above compounds, and plural kinds of the silicon phthalocyanine compounds may be contained. In addition, the copper phthalocyanine compound contained in the colorant may be at least one of the above compounds, and plural kinds of the copper phthalocyanine compounds may be contained.

Silicon Phthalocyanine Compound:

The silicon phthalocyanine compound used in the present invention is represented preferably by the following Formula (1):

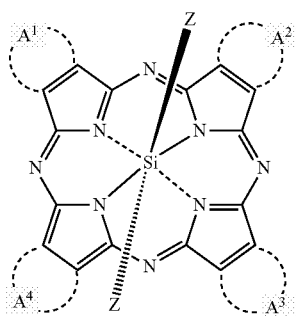
Formula (1)

In Formula (1), Z represents a chlorine atom, a hydroxyl group, an alkyl group (for example, methyl, ethyl, n-propyl, isopropyl, n-butyl, s-butyl, i-butyl, t-butyl, n-pentyl, n-hexyl, n-octyl, 2-ethylhexyl, n-dodecyl, n-tetradecyl, n-octadecyl and the like), an alkoxy group (for example, methoxy, ethoxy, n-butoxy, t-butoxy, n-octyloxy, n-dodecyloxy and the like), an aryloxy group (for example, phenoxy, p-t-butoxyphenyl and the like) or a group represent by the following Formula (2). Two Z may be the same or different and are preferably the same from the viewpoint of the production. Also, $A^1$ to $A^4$ represent the following atomic groups (a-1) to (a-7) which may have substituents:

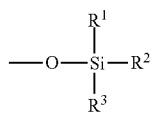
Formula (2)

[wherein $R^1$ to $R^3$ each represent independently an alkyl group, an aryl group or a siloxy group]:

(a-1)

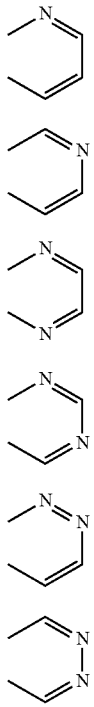

In Formula (2), $R^1$ to $R^3$ each represent independently an alkyl group (for example, methyl, ethyl, n-propyl, isopropyl, n-butyl, s-butyl, i-butyl, t-butyl and the like), an aryl group or a siloxy group (for example, trimethylsiloxy, t-butyldimethylsiloxy and the like), and it is preferably an alkyl group.

$A^1$ to $A^4$ represent the atomic groups (a-1) to (a-7) which may have substituents. The substitutable group includes alkyl groups, alkoxy groups, aryloxy groups, cycloalkyl groups (for example, cyclopentyl, cyclohexyl), aryl groups (for example, phenyl, naphthyl), heterocyclic groups (for example, furyl, thienyl, pyridyl, pyridazyl, pyrimidyl, pyrazyl, triazyl, imidazolyl, pyrazolyl, thiazolyl, benzimidazolyl, benzoxazolyl, quinazolyl, phthalazyl, pyrrolidyl, imidazolidyl, morpholyl, oxazolidyl and the like), alkylthio groups (for example, methylthio, ethylthio, propylthio, pentylthio, hexylthio, octylthio, dodecylthio), cycloalkylthio groups (for example, cyclopentylthio, cyclohexylthio), arylthio groups (for example, phenylthio, naphthylthio), alkoxycarbonyl groups (for example, methyloxycarbonyl, ethyloxycarbonyl, butyloxycarbonyl, octyloxycarbonyl, dodecyloxycarbonyl), aryloxycarbonyl groups (for example, phenyloxycarbonyl, naphthyloxycarbonyl), acyl groups (for example, acetyl, ethylcarbonyl, propylcarbonyl, pentylcarbonyl, cyclohexylcarbonyl, octylcarbonyl, 2-ethylhexylcarbonyl, dodecylcarbonyl, phenylcarbonyl, naphthylcarbonyl, pyridylcarbonyl), acyloxy groups (for example, acetyloxy, ethylcarbonyloxy, butylcarbonyloxy, octylcarbonyloxy, dodecylcarbonyloxy, phenylcarbonyloxy), acylamino groups (for example, methylcarbonylamino, ethylcarbonylamino, dimethylcarbonylamino, propylcarbonylamino, pentylcarbonylamino, cyclohexylcarbonylamino, 2-ethylhexylcarbonylamino, octylcarbonylamino, dodecylcarbonylamino, trifluoromethylcarbonylamino, phenylcarbonylamino, naphthylcarbonylamino), carbamoyl groups (for example, methylcarbamoyl, ethylcarbamoyl, n-butylcarbamoyl, phenylcarbamoyl), sulfonylamino groups (for example, methylsulfonylamino, ethylsulfonylamino, hexylsulfonylamino, decylsulfonylamino, phenylsulfonylamino), sulfamoyl groups (for example, methylsulfamoyl, ethylsulfamoyl, n-butylsulfamoyl, phenylsulfamoyl), alkylsulfonyl groups (for example, methylsulfonyl, ethylsulfonyl, butylsulfonyl, cyclohexylsulfonyl, 2-ethylhexylsulfonyl, dodecylsulfonyl), arylsulfonyl groups (for example, phenylsulfonyl, naphthylsulfonyl, 2-pyridylsulfonyl), amino groups (for example, amino, ethylamino, dimethylamino, butylamino, cyclopentylamino, 2-ethylhexylamino, dodecylamino, anilino, naphthylamino, 2-pyridylamino), halogen atoms (for example, a fluorine atom, a chlorine atom, a bromine atom, an iodine atom), a cyano group, a nitro group, alkyl halides (for example, methyl fluoride, trifluoromethyl, chloromethyl, trichloromethyl, perfluoropropyl), silyl groups (for example, trimethylsilyl, t-butyldimethylsilyl or phenyldimethylsilyl), and siloxy groups. Among the above groups, the alkyl groups, the aryl groups, the alkoxy groups, the halogen atoms, the nitro group and the alkyl halides are preferred as the substituents.

Further, $A^1$ to $A^4$ may have condensed rings, and structures which may be condensed with them are represented, for example, by the Formula (a-1) to (a-7) described above.

The specific examples of the compound represented by Formula (1) are shown below, but the present invention shall not be restricted to them. In the table described below, the term [–] means that the compounds do not have substituents, prescribed substances and the like.

TABLE 1

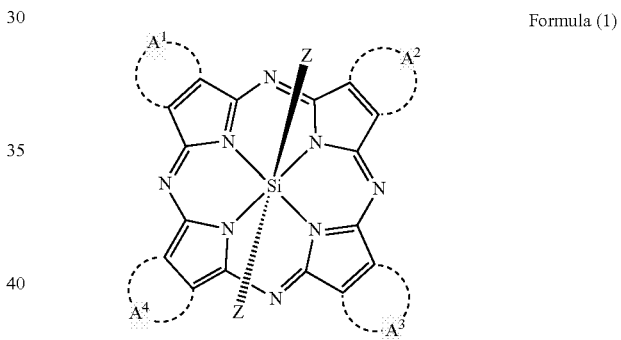

Formula (1)

| Compound No. | $A^1$ to $A^4$ | Z | Substituents on $A^1$ to $A^4$ |
|---|---|---|---|
| 1-1 | a-1 | —Cl | — |
| 1-2 | a-1 | —OH | — |
| 1-3 | a-1 | —OSi(CH$_3$)$_3$ | — |
| 1-4 | a-1 | —OSi(C$_2$H$_5$)$_3$ | — |
| 1-5 | a-1 | —OSi(C$_3$H$_7$-n)$_3$ | — |
| 1-6 | a-1 | —OSi(C$_3$H$_7$-i)$_3$ | — |
| 1-7 | a-1 | —OSi(C$_4$H$_9$)$_3$ | — |
| 1-8 | a-1 | —OSi(C$_4$H$_9$-t)$_3$ | — |
| 1-9 | a-1 | —OSi(C$_6$H$_{13}$)$_3$ | — |
| 1-10 | a-1 | —OC$_6$H$_5$ | — |
| 1-11 | a-1 | —OC$_8$H$_{17}$ | — |
| 1-12 | a-1 | —C$_8$H$_{17}$ | — |
| 1-13 | a-1 | —Cl | 4-CF$_3$ |
| 1-14 | a-1 | —Cl | 4-Cl |
| 1-15 | a-1 | —OH | 4-Cl |
| 1-16 | a-1 | —OSi(CH$_3$)$_3$ | 4-CH$_3$ |
| 1-17 | a-1 | —OSi(CH$_3$)$_3$ | 4-SO$_2$NHC$_4$H$_9$ |
| 1-18 | a-1 | —OSi(C$_2$H$_5$)$_3$ | 4-Cl |
| 1-19 | a-1 | —OSi(C$_2$H$_5$)$_3$ | 4-t-C$_4$H$_9$ |
| 1-20 | a-1 | —OSi(C$_3$H$_7$-i)$_3$ | 4,5-diCl |
| 1-21 | a-1 | —OC$_8$H$_{17}$ | 4,5-diCH$_3$ |
| 1-22 | a-1 | —OC$_6$H$_4$—CH$_3$-p | 4-Br |
| 1-23 | a-2 | —Cl | — |
| 1-24 | a-2 | —OH | — |
| 1-25 | a-2 | —OSi(CH$_3$)$_3$ | — |
| 1-26 | a-2 | —OSi(C$_2$H$_5$)$_3$ | — |
| 1-27 | a-2 | —OC$_6$H$_{13}$ | — |

TABLE 1-continued

Formula (1)

(structure shown: silicon phthalocyanine with A¹–A⁴ substituents and Z axial ligands)

| Compound No. | A¹ to A⁴ | Z | Substituents on A¹ to A⁴ |
|---|---|---|---|
| 1-28 | a-2 | —OC$_6$H$_4$—C$_4$H$_9$-p | — |
| 1-29 | a-3 | —Cl | — |
| 1-30 | a-3 | —OH | — |
| 1-31 | a-3 | —OSi(CH$_3$)$_3$ | — |
| 1-32 | a-3 | —OSi(C$_2$H$_5$)$_3$ | — |
| 1-33 | a-3 | —OC$_6$H$_{13}$ | — |
| 1-34 | a-3 | —OC$_6$H$_{13}$ | — |

TABLE 2

| Compound No. | A¹ to A⁴ | Z | Substitutions on A¹ to A⁴ |
|---|---|---|---|
| 1-35 | a-4 | —Cl | — |
| 1-36 | a-4 | —OH | — |
| 1-37 | a-4 | —OSi(CH$_3$)$_3$ | — |
| 1-38 | a-4 | —OC$_6$H$_5$ | — |
| 1-39 | a-5 | —Cl | — |
| 1-40 | a-5 | —OH | — |
| 1-41 | a-5 | —OSi(CH$_3$)$_3$ | — |
| 1-42 | a-5 | —OSi(C$_2$H$_5$)$_3$ | — |
| 1-43 | a-6 | —Cl | — |
| 1-44 | a-6 | —OH | — |
| 1-45 | a-6 | —OSi(CH$_3$)$_3$ | — |
| 1-46 | a-6 | —OSi(C$_3$H$_7$-i)$_3$ | — |
| 1-47 | a-6 | —C$_8$H$_{17}$ | — |
| 1-48 | a-7 | —Cl | — |
| 1-49 | a-7 | —OH | — |
| 1-50 | a-7 | —OSi(CH$_3$)$_3$ | — |
| 1-51 | a-7 | —OSi(C$_4$H$_9$-n)$_3$ | — |
| 1-52 | a-7 | —OC$_6$H$_4$—CH$_3$—p | — |

[Copper Phthalocyanine Compound]

The copper phthalocyanine compound used in the present invention is represented preferably by Formula (3):

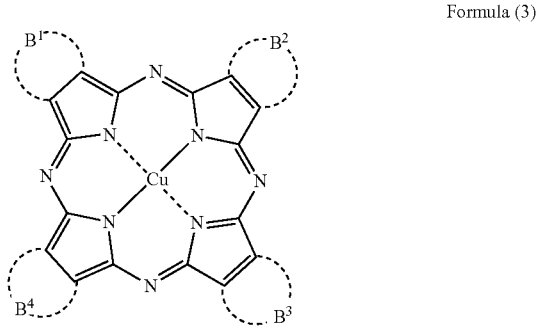

Formula (3)

In Formula (3), B¹ to B⁴ have the same definitions as those of A¹ to A⁴ in Formula (1) and may have substituents and condensed rings.

Both of the copper phthalocyanine compound mixed in the preparing step and the copper phthalocyanine compound contained in the colorant produced are represented preferably by Formula (3). When the copper salt is used in the preparing step, the copper phthalocyanine compound contained in the colorant produced is represented preferably by Formula (3).

The specific examples of the compound represented by Formula (3) are shown below, but the present invention shall not be restricted to them.

TABLE 3

| Compound No. | B¹ to B⁴ | Substituents on B¹ to B⁴ |
|---|---|---|
| 3-1 | a-1 | — |
| 3-2 | a-1 | 4-CF$_3$ |
| 3-3 | a-1 | 4-CH$_3$ |
| 3-4 | a-1 | 4-Cl |
| 3-5 | a-1 | 4-t-C$_4$H$_9$ |
| 3-6 | a-1 | 4-SO$_2$NHC$_4$H$_9$ |
| 3-7 | a-1 | 4,5-diCH$_3$ |
| 3-8 | a-1 | 4,5-diCl |
| 3-9 | a-2 | — |
| 3-10 | a-3 | — |
| 3-11 | a-4 | — |
| 3-12 | a-5 | — |
| 3-13 | a-6 | — |
| 3-14 | a-7 | — |

Next, the step of preparing the silicon phthalocyanine compound shall be explained.

Preparing Step:

The preparing step is a step of reacting the raw materials of the silicon compound and the phthalocyanine under the presence of the copper salt or the copper phthalocyanine compound to prepare the silicon phthalocyanine compound.

The colorant produced in the present invention is not produced merely by mixing and dispersing a silicon phthalocyanine compound and a copper phthalocyanine compound which are prepared separately in advance, and it is characterized by being obtained by a production process comprising a step of reacting raw materials of a silicon compound and phthalocyanine under the presence of a copper salt or the copper phthalocyanine compound in preparing the silicon phthalocyanine compound.

First, a conventional process for obtaining the silicon phthalocyanine compound shall be explained.

A silicon compound which is the raw material of the silicon phthalocyanine compound includes, for example, silicon tetrachloride. Also, the raw material of the phthalocyanine is a raw material for forming a phthalocyanine ring part and includes, for example, a 1,3-diiminoisoindoline derivative, a phthalodinitrile derivative and the like. In general, in a case of the silicon phthalocyanine compound, dichlorosilicon phthalocyanine or dihydroxysilicon phthalocyanine can be synthesized by reacting silicon tetrachloride in a high boiling solvent with the 1,3-diiminoisoindoline derivative or the phthalodinitrile derivative used as starting materials by a publicly known method. Also, in a case of the compound in which Z in Formula (1) is a substituent other than a chlorine atom and a hydroxyl group, the targeted compound of Formula (1) is obtained by reacting a raw material corresponding to Z in Formula (1) with dichlorosilicon phthalocyanine or dihydroxysilicon phthalocyanine used as an intermediate by a publicly known method. The publicly known method includes, for example, methods disclosed in JP-A 1984-157536, JP-A 1998-251260, JP-A 2009-180980 and the like.

In the above method, dichlorosilicon phthalocyanine or dihydroxysilicon phthalocyanine which is the intermediate is produced in the form of very hard and coarse particles, and therefore the silicon phthalocyanine compound represented by Formula (1) which is synthesized by using them as the intermediate is prepared as well while remaining in the form of coarse particles. When the copper phthalocyanine compound is dispersed by a solvent salt milling method, a solvent method, a dry milling method and a dispersing method (grinding method) such as media dispersion carried out by bead mill of several ten to several hundred micron, it is very difficult or takes a very long time, though can be dispersed, to disperse the colorant into particles of several ten to about 100 nm, so that the productivity is low. Further, in cases of a recrystallization method and a reprecipitation method (dissolved in a good solvent and precipitated in a poor solvent), a large amount of a solvent is required since solvents which can dissolve the objects in small quantities are not available, and therefore a large amount of solvents is needed. Accordingly, they are low in an industrial applicability. On the other hand, in sulfuric acid methods such as an acid pasting method, an acid slurry method, and the like, the silicon phthalocyanine compounds are decomposed, and therefore they cannot be used.

Accordingly, the present inventors have repeated intense investigations and found that in synthesizing dichlorosilicon phthalocyanine or dihydroxysilicon phthalocyanine, a copper salt or a copper phthalocyanine compound is added, whereby silicon phthalocyanine and copper phthalocyanine are mixed with each other in a molecular level and show properties of particles which are different from those of particles of silicon phthalocyanine and copper phthalocyanine alone and that they can be dispersed for a short time even by a conventional dispersing method (grinding method) and make it possible to further elevate the color reproducibility.

In the preparing step in the production process of the present invention, first the copper salt or the copper phthalocyanine compound and the raw materials of the silicon compound and the phthalocyanine are added to a high boiling solvent and mixed (mixing step). Next, this mixture is heated on prescribed conditions described later to react the above substances (heating step) to prepare the silicon phthalocyanine compound. The colorant containing the silicon phthalocyanine compound and the copper phthalocyanine compound is finally produced by passing through the above mixing step and heating step. When two kinds of the copper phthalocyanine compounds are added, they are added in the same quantity. Also, when the copper phthalocyanine compound is used in the preparing step, the copper phthalocyanine compound contained in the colorant produced is the same substance as the copper phthalocyanine compound used in the preparing step.

The copper salt includes, for example, cuprous chloride, cupric chloride, cuprous bromide, cupric bromide, cuprous acetate, cupric acetate and the like. At least one kind of the above copper salts is reacted with the phthalocyanine raw material present in the reaction system to form the copper phthalocyanine compound represented by Formula (3). Silicon tetrachloride which is the raw material for the silicon phthalocyanine compound is readily decomposed by water, and therefore the copper salt is preferably used in the form of an anhydride.

Adding in advance the copper phthalocyanine compound to the reaction system of the silicon phthalocyanine compound makes it possible to introduce the copper phthalocyanine compound into the particles when the silicon phthalocyanine compound is formed to mix them with each other in a molecular level, but the copper salt which makes it more possible to mix with the silicon phthalocyanine compound in a molecular level is preferred as the copper compound added to the reaction system.

The copper phthalocyanine compound and the raw materials of the silicon compound and the phthalocyanine are the same as those explained in the foregoing conventional method for obtaining a silicon phthalocyanine compound.

Nonpolar solvents such as, for example, 1-chloronaphthalene, 1,2,3,4-tetrahydronaphthalene, trichlorobenzene, dichlorobenzene and the like and a quinoline solvent can be used as the high boiling solvent used for the reaction. When the nonpolar solvents described above are used, tertiary amines having a high boiling point such as tri-n-butylamine and the like are used as a catalyst, and when the quinoline solvent is used, the reaction can be carried out under the absence of the catalyst, Conditions for reacting the raw materials of the silicon compound (for example, silicon tetrachloride) and the phthalocyanine under the presence of the copper salt or the copper phthalocyanine compound to produce the silicon phthalocyanine compound include a temperature of 150° C. or higher and 250° C. or lower, preferably 180° C. or higher and 250° C. or lower and more preferably 200° C. or higher and 230° C. or lower. They include a reaction time of 30 minutes or longer and 12 hours or shorter, preferably 1 hour or longer and 10 hours or shorter and more preferably 1 hour or longer and 8 hours or shorter.

The compound which contains copper phthalocyanine and in which Z in Formula (1) is a substituent other than a chlorine atom and a hydroxyl group can be produced as well by publicly known methods (for example, methods disclosed in JP-A 1984-157536, JP-A 1980-251260, JP-A 2009-180980 and the like), wherein the raw materials corresponding to the structure are used, and dichlorosilicon phthalocyanine or dihydroxysilicon phthalocyanine in which the copper phthalocyanine compound is introduced into particles is used as the intermediate. The substituent other than a chlorine atom and a hydroxyl group includes, for example, alkyl halides, aryl halides, alcohols, phenols, trialkylsilyl chloride, trialkylsilanol and the like. That is, in the above case, a step of adding the raw materials and reacting them is further carried out after the mixing step and the heating step in the preparing step to prepare the compound in which Z in Formula (1) is a substituent other than a chlorine atom and a hydroxyl group.

To be more specific, the production process for the colorant according to the present invention can be carried out, for example, by the processes shown in the production processes for the colorant in the examples.

The colorant obtained in the present invention containing the silicon phthalocyanine compound and the copper phthalocyanine compound may contain only each one kind thereof among plural kinds of the above compounds or may contain plural kinds of the silicon phthalocyanine compounds and plural kinds of the copper phthalocyanine compounds. Further, when the colorant is used, plural kinds of the colorants obtained by the present invention may be used in combination or may be used in combination with other coloring matters.

A ratio (m1:m2) of a content (m1) of the silicon phthalocyanine compound contained in the colorant obtained by the production process of the present invention to a content (m2) of the copper phthalocyanine compound contained therein is preferably 99:1 to 80:20. When a ratio of a content of the copper phthalocyanine compound is higher than 80:20 or lower than 99:1, an effect of elevating a color reproducibility of the colorant is not obtained, and an electrostatic property of a toner prepared by using the above colorant is not improved. The ratio (m1:m2) is more preferably 98:2 to 90:10.

The specific examples of the colorant produced by the present invention are shown below, but the colorant shall not be restricted to them. When two kinds of the copper phthalocyanine compounds are used, they have the same weight.

TABLE 4

| Colorant No. | Silicon phthalocyanine compound | Copper phthalocyanine compound-1 | Copper phthalocyanine compound-2 | m1:m2 |
|---|---|---|---|---|
| 1 | (1-1) | (3-1) | — | 90:10 |
| 2 | (1-2) | (3-1) | — | 90:10 |
| 3 | (1-4) | (3-1) | — | 90:10 |
| 4 | (1-3) | (3-1) | — | 90:10 |
| 5 | (1-11) | (3-1) | — | 90:10 |
| 6 | (1-8) | (3-1) | — | 90:10 |
| 7 | (1-10) | (3-1) | — | 90:10 |
| 8 | (1-1) | (3-4) | — | 90:10 |
| 9 | (1-2) | (3-4) | — | 90:10 |
| 10 | (1-4) | (3-4) | — | 90:10 |
| 11 | (1-14) | (3-4) | — | 90:10 |
| 12 | (1-15) | (3-4) | — | 90:10 |
| 13 | (1-18) | (3-4) | — | 90:10 |
| 14 | (1-14) | (3-1) | — | 90:10 |
| 15 | (1-15) | (3-1) | — | 90:10 |
| 16 | (1-18) | (3-1) | — | 90:10 |
| 17 | (1-29) | (3-10) | — | 90:10 |
| 18 | (1-30) | (3-10) | — | 90:10 |
| 19 | (1-32) | (3-10) | — | 90:10 |
| 20 | (1-31) | (3-10) | — | 90:10 |
| 21 | (1-29) | (3-1) | — | 90:10 |
| 22 | (1-30) | (3-1) | — | 90:10 |
| 23 | (1-32) | (3-1) | — | 90:10 |
| 24 | (1-30) | (3-1) | (3-5) | 90:10 |
| 25 | (1-32) | (3-1) | (3-7) | 90:10 |
| 26 | (1-34) | (3-1) | (3-2) | 90:10 |
| 27 | (1-3) | (3-1) | (3-4) | 90:10 |
| 28 | (1-11) | (3-1) | (3-10) | 90:10 |
| 29 | (1-14) | (3-1) | (3-4) | 90:10 |
| 30 | (1-24) | (3-9) | — | 90:10 |
| 31 | (1-25) | (3-9) | — | 90:10 |
| 32 | (1-27) | (3-9) | — | 90:10 |

TABLE 5

| Colorant No. | Silicon phthalocyanine compound | Copper phthalocyanine compound-1 | Copper phthalocyanine compound-2 | m1:m2 |
|---|---|---|---|---|
| 33 | (1-26) | (3-1) | — | 90:10 |
| 34 | (1-25) | (3-1) | (3-9) | 90:10 |
| 35 | (1-28) | (3-3) | (3-9) | 90:10 |
| 36 | (1-37) | (3-11) | — | 90:10 |
| 37 | (1-37) | (3-5) | — | 90:10 |
| 38 | (1-38) | (3-2) | (3-11) | 90:10 |
| 39 | (1-40) | (3-12) | — | 90:10 |
| 40 | (1-40) | (3-2) | — | 90:10 |
| 41 | (1-41) | (3-1) | (3-12) | 90:10 |
| 42 | (1-45) | (3-4) | — | 90:10 |
| 43 | (1-46) | (3-1) | (3-13) | 90:10 |
| 44 | (1-47) | (3-13) | — | 90:10 |
| 45 | (1-49) | (3-6) | — | 90:10 |
| 46 | (1-50) | (3-1) | — | 90:10 |
| 47 | (1-51) | (3-14) | — | 90:10 |
| 48 | (1-52) | (3-7) | (3-14) | 90:10 |
| 49 | (1-3) | (3-1) | — | 90:5 |
| 50 | (1-4) | (3-4) | — | 95:5 |
| 51 | (1-4) | (3-1) | (3-4) | 95:5 |
| 52 | (1-25) | (3-9) | — | 95:5 |
| 53 | (1-31) | (3-10) | — | 95:5 |
| 54 | (1-38) | (3-11) | — | 95:5 |
| 55 | (1-42) | (3-12) | — | 95:5 |
| 56 | (1-51) | (3-1) | (3-13) | 95:5 |
| 57 | (1-3) | (3-1) | — | 85:15 |
| 58 | (1-32) | (3-10) | — | 85:15 |
| 59 | (1-4) | (3-1) | — | 80:20 |
| 60 | (1-31) | (3-10) | — | 80:20 |

<<Colorant Composition>>

Next, the colorant composition of the present invention shall be explained.

The colorant composition of the present invention contains the foregoing colorant produced by the present invention.

The colorant is used preferably in the form of a composition combined with a dispersant (binder) for a film-forming stability and the like or a composition obtained by further adding a solvent to the above composition.

The binder includes (meth)acrylate base resins, polyester base resins, polyamide base resins, polyimde base resins, polystyrene base resins, polyepoxy base resins, polyester base resins, amino base resins, fluorine base resins, phenol base resins, polyurethane base resins, polyethylene base resins, polyvinyl chloride base resins, polyvinyl alcohol base resins, polyether base resins, polyether ketone base resins, polyphenylene sulfide base resins, polycarbonate base resins, polyamide base resins and the like. (Meth)acrylate base resins, polystyrene base resins, polyethylene base resins, polyvinyl chloride base resins and polyvinyl alcohol base resins are preferably used, and (meth)acrylate base resins and polystyrene base resins are most preferably used. Further, the copolymers thereof are preferred as well.

The (meth)acrylate base resins are synthesized by homopolymerizing or copolymerizing various methacrylate base monomers or acrylate base monomers, and the desired (meth)acrylate base resins can be obtained by changing the monomer kinds and the monomer composition ratios in various manners. Also, in the present invention, resins obtained by copolymerizing the methacrylate base monomers with copolymerizable monomers having unsaturated double bonds other than those of the methacrylate base monomers can be used as well. Further, in the present invention, resins obtained by mixing the methacrylate base resins with other plural resins can be used as well.

Monomer components for forming the (meth)acrylate base resins used in the present invention include, for example, (meth)acrylic acid, methyl (meth)acrylate, ethyl (meth)acrylate, propyl (meth)acrylate, butyl (meth)acrylate, isopropyl (meth)acrylate, isobutyl (meth)acrylate, t-butyl (meth)acrylate, stearyl (meth)acrylate, 2-hydroxyethyl (meth)acrylate, acetoacetoxyethyl (meth)acrylate, dimethylaminoethyl (meth)acrylate, 2-hydroxypropyl (meth)acrylate, di(ethylene glycol) ethyl ether (meth)acrylate, ethylene glycol methyl ether (meth)acrylate, isobornyl (meth)acrylate, ethyltrimethylammonium chloride (meth)acrylate, trifluoroethyl (meth)acrylate, octafluoropentyl (meth)acrylate, 2-acetamidemethyl (meth)acrylate, 2-methoxyethyl (meth)acrylate, 2-dimethylaminoethyl (meth)acrylate, 3-trimethoxysilanepropyl (meth)acrylate, benzyl (meth)acrylate, tridecyl (meth)acrylate, 4-hydroxybutyl (meth)acrylate, tetrahydrofurfuryl (meth)acrylate, dodecyl (meth)acrylate, octadecyl (meth)acrylate, 2-diethylaminoethyl (meth)acrylate, 2-ethylhexyl (meth)acrylate, cyclohexyl (meth)acrylate, phenyl (meth)acrylate, glycidyl (meth)acrylate and the like. They are preferably (meth)acrylate acid, methyl (meth)acrylate, ethyl (meth)acrylate, propyl (meth)acrylate, butyl (meth)acrylate, stearyl (meth)acrylate, 2-hydroxyethyl (meth)acrylate, acetoacetoxyethyl (meth)acrylate, benzyl (meth)acrylate, tridecyl (meth)acrylate, dodecyl (meth)acrylate and 2-ethylhexyl (meth)acrylate.

The polystyrene base resins include homopolymers of a styrene monomer and random copolymers, block copolymers and graft copolymers each obtained by copolymerizing a styrene monomer with other monomers having unsaturated double bonds copolymerizable therewith. Further, they include as well blended resins and polymer alloys obtained by blending the above polymers with other polymers. The examples of the styrene monomer described above include styrene, nuclear alkyl-substituted styrene such as α-methylstyrene, α-ethylstyrene, α-methylstyrene-p-methylstyrene, o-methylstyrene, m-methylstyrene, p-methylstyrene and the like, and nuclear halogenated styrene such as o-chlorostyrene, m-chlorostyrene, p-chlorostyrene, p-bromostyrene, dichlorostyrene, dibromostyrene, trichlorostyrene, tribromostyrene and the like. Among them, styrene and α-methylstyrene are preferred.

The resins used in the present invention are synthesized by homopolymerizing or copolymerizing the monomers described above, and the examples thereof include, for example, copolymer resins of benzyl methacrylate/ethyl acrylate or butyl acrylate and the like, copolymer resins of methyl methacrylate/2-ethylhexyl methacrylate and the like, copolymer resins of methyl methacrylate/methacrylic acid/stearyl methacrylate/acetoacetoxyethyl methacrylate, copolymer resins of styrene/acetoacetoxyethyl methacrylate/stearyl methacrylate, copolymer resins of styrene/2-ethylhexyl methacrylate/stearyl methacrylate and copolymer resins of 2-ethylhexyl methacrylate/2-hydroxyethyl methacrylate and the like.

The colorant composition of the present invention shows high performances in fastness properties represented by a light fastness, a heat resistance, an ozone resistance and the like. Also, it has a high color reproducibility and therefore can suitably be used for products to which the above performances are required at high levels, for example, inks, optical recording materials, sensitizing dyes for solar cells, color filters and toners.

The particularly preferred applications include toners, inks and color filters.

<<Toner>>

Next, the toner of the present invention shall be explained.

The toner according to the present invention prepared by using the composition containing the colorant of the present invention has made it possible to form images which are excellent in a light fastness and an ozone gas resistance and cause the images to exert a broader and more stable color reproducibility than those of conventional toner images and images obtained by using printing inks. In particular, images displayed on a computer screen are printout recently in many cases, and since a color gamut in conventional color printing has so far been far narrower than those of displays of computers, a large difference has been found in a hue between images on the displays and images obtained by printing out. However, use of the toner according to the present invention has made it possible to obtain printed images which are closer to a color gamut of a display of a computer than ever. As shown above, it is apparent that the toner according to the present invention contributes to expansion of a color gamut in printed images to a large extent.

In the present invention, colorants such as other phthalocyanine base colorants, preferably copper phthalocyanine, zinc phthalocyanine, aluminum phthalocyanine and the like in addition so the colorant of the present invention are used in combination as the colorant, whereby an electrophotographic toner having good performances can be obtained.

The colorants are not restricted in a kind and a number in using them in combination, and one kind of the colorant of the present invention is used preferably in combination with at least one of other combined colorants and more preferably in combination with one kind of the other colorant.

Also, a use amount of the colorant in producing the toner shall not specifically be restricted as well, and the colorant of the present invention is used in a proportion of preferably 10 to 80%, more preferably 15 to 60% and most preferably 20 to 50% based on a whole use amount of the colorants.

Combined Colorants:

The toner according to the present invention is obtained by subjecting complex resin particles and colorant particles each described later to salting-out/fusing.

The colorant (colorant particles subjected to salting-out/fusing with the complex resin particles) constituting the toner according to the present invention includes various inorganic pigments, organic pigments and dyes in addition to the colorants described above. Conventionally known pigments can be used as the inorganic pigments. The specific examples of the inorganic pigments are shown below.

Carbon blacks such as furnace black, channel black, acetylene black, thermal black, lamp black and the like, and magnetic powders such as magnetite, ferrite and the like can be used as black pigments.

The above inorganic pigments can be selected if desired and used alone or in combination of plural numbers thereof. Also, an addition amount of the pigment is 2 to 20% by mass based on the polymer, and an addition amount of 3 to 15% by mass is preferably selected.

In using it as the magnetic toner, magnetite described above can be added thereto. In this case, it is added preferably to the toner in a proportion of 20 to 60% by mass based on the toner from the viewpoint of providing the prescribed magnetic characteristics.

Conventionally known compounds can be used as the organic pigments and dyes. The specific examples of the organic pigments and dyes are shown below.

The pigments for magenta or red include, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and the like.

The pigments for orange or yellow include, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 138, C.I. Pigment Yellow 155, C.I. Pigment Yellow 156, C.I. Pigment Yellow 185 and the like.

The pigments for green or cyan include, for example, C.I. Pigment Blue 15, C.I. Pigment Blue 15:2, C.I. Pigment Blue 15:3, C.I. Pigment Blue 16, C.I. Pigment Blue 60, C.I. Pigment Green 7 and the like.

Capable of being used as the dyes are, for example, C.I. Solvent Red 1, ditto 49, ditto 52, ditto 58, ditto 63, ditto 111, ditto 122, C.I. Solvent Yellow 19, ditto 44, ditto 77, ditto 79, ditto 81, ditto 82, ditto 93, ditto 98, ditto 103, ditto 104, ditto 112, ditto 162, C.I. Solvent Blue 25, ditto 36, ditto 60, ditto 70, ditto 93, ditto 95 and the like, and mixtures thereof can be used as well.

The colorant (colorant pigments) constituting the toner according to the present invention may be subjected to surface modification.

Conventionally known compounds can be used as the surface modifier, and to be specific, silane coupling agents, titanium coupling agents, aluminum coupling agents and the like can be preferably used. The silane coupling agents include, for example, alkoxysilanes such as methyltrimethoxysilane, phenyltrimethoxysilane, methylphenyldimethoxysilane, diphenyldimethoxysilane and the like, siloxanes such as hexamethyldisiloxane and the like, γ-chloropropyltrimethoxysilane, vinyltrichlorosilane, vinyltrimethoxysilane, vinyltriethoxysilane, γ-methacryloxypropyltrimethoxysilane, γ-glycidoxypropyltrimethoxysilane, γ-mercaptopropyltrimethoxysilane, γ-aminopropyltriethoxysilane, γ-ureidopropyltriethoxysilane and the like. The titanium coupling agents include, for example, TTS, 9S, 38S, 41B, 46B, 55, 138S, 238S and the like which are commercially available under the trade name of [PLENACT] (registered trademark) manufactured by Ajinomoto Co., Inc., and A-1, B-1, TOT, TST, TAA, TAT, TLA, TOG, TBSTA, A-10, TBT, B-2, B-4, B-7, B-10, TBSTA-400, TTS, TOA-30, TSDNA, TTAB, TTOP and the like which are commercially available products manufactured by Nippon Soda Co., Ltd. The aluminum coupling agents include, for example [PLENACT AL-M] and the like manufactured by Ajinomoto Co., Inc.

An addition amount of the above surface modifiers is preferably 0.01 to 20% by mass, more preferably 0.1 to 5% by mass based on the colorant.

The surface modifying method of the colorant particles includes a method in which the surface modifier is added to a dispersion of the colorant particles and in which the mixture is heated to carry out the reaction.

The colorant particles subjected to surface modification are obtained by filtering and subjected repeatedly to washing treatment, by the same solvent and filtering treatment, and then they are subjected to drying treatment.

One of the preferred embodiments of the toner according to the present invention includes that the colorant is an oil-soluble dye. The oil-soluble dye is usually a dye which is soluble in an organic solvent having no such a water-soluble group as carboxylic acid sulfonic acid and the like and which is insoluble in water, but it includes dyes provided with an oil solubility by causing water-soluble dyes to form salts with long chain bases. For example, salified dyes obtained by salifying acid dyes, direct dyes and reactive dyes with long chain, amines are known.

The colorant according to the present invention includes, for example, though not be restricted to the following compounds, Valifast Yellow 4120, Valifast Yellow 3150, Valifast Yellow 3108, Valifast yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906 and Oil Black 5905 each manufactured by Orient Chemical Industries Co., Ltd., Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312 and Kayaset Blue K-FL each manufactured by Nippon Kayaku Co., Ltd., FS Yellow 1015, FS Magenta 1404, FS Cyan 1522, FS Blue 1504, C.I. Solvent Yellow 88, 83, 82 79, 56, 29, 19, 16, 14, 04, 03, 02, 01, C.I. Solvent Red 84:1, C.I. Solvent Red 84, 218, 132, 73, 72, 51, 43, 27, 24, 18, 01, C.I. Solvent Blue 70, 67, 44, 40, 35, 11, 02, 01, C.I. Solvent Black 43, 70, 34, 29, 27, 22, 7, 3, C.I. Solvent Violet 3, C.I. Solvent Green 3 and 7, Plast Yellow DY352 and Plast Red 8375 each manufactured, by Arimoto Chemical Co., Ltd., MS Yellow RD-180, MS Red G, MS magenta HM-1450H and MS Blue HM-1384 each manufactured by Mitsui Chemicals, Inc., ES Red 3001, ES Red 3002, ES Red 3003, TS Red 305, ES Yellow 1001, ES Yellow 1002, TS Yellow 118, LS Orange 2001, ES Blue 6001 and TS Turq Blue 618 each manufactured by Sumitomo Chemical Co., Ltd., MACROLEX Yellow 6G, Ceres Blue GN NEOPAN Yellow 075, Ceres Blue GN, MACROLEX Red Violet R and the like each manufactured, by Bayer A.G.

Disperse dyes can be used as the oil-soluble dyes, and though not restricted to the following compounds, they include, for example, C.I. Disperse Yellow 5, 42, 54, 64, 79, 82, 83, 33, 93, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 14S, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9.

In addition thereto, phenols, naphthols, cyclic methylene compounds such as pyrazoline, pyrazolotriazole and the like, and azomethine dyes, indoaniline dyes and the like which are derived from couplers such as open-chain methylene compounds are also preferably used as the oil-soluble dyes.

Colorant Content:

In the toner according to the present invention, a content of the colorant of the present invention falls preferably in a range of 2 to 20% by mass based on the resin, and the content of 3 to 15% by mass provides the toner with a sufficiently high density and makes it possible to cause the resin to exert a protecting performance for the colorant.

Also, compounds described and cited at pages 10 to 13 in, for example, JP-A 1996-29934 may be added as an image stabilizer in order to improve a storage stability of the colorant, and it includes phenol base compounds, amine base compounds, sulfur base compounds, phosphorus base compounds and the like which are commercially available. For the same purpose, organic UV absorbers and inorganic UV absorbers may be added as a UV absorber. The organic UV absorbers include benzotriazole base compounds such as 2-(2'-hydroxy-5'-t-butylphenyl)benzotriazole, 2-(2'-hydroxy-3',5'-di-t-butylphenyl)benzotriazole and the like, benzophenone base compounds such as 2-hydroxy-4-methoxybenzophenon, 2-hydroxy-4-n-octyloxybenzophenon and the like, phenyl salicylate, 4-t-butylphenyl salicylate, hydroxybenzoate base compounds such as n-hexadecyl 2,5-t-butyl-4-hydroxybenzoate, 2,4-di-t-butylphenyl 3',5'-di-t-butyl-4'-hydroxybenzoate and the like. The inorganic UV absorbers include titanium oxide, zinc oxide, cerium oxide, iron oxide, barium oxide and the like, but the organic UV absorbers are more preferred. The UV absorbers have an absorption wavelength of preferably 350 to 420 nm, more preferably 360 to 400 nm at a transmittance of 50%. The UV ray-blocking ability is decreased in a lower absorption wavelength than 350 nm, and the coloring is increased in a higher absorption wavelength than 420 nm, so that both are not preferred. An addition amount thereof shall not specifically be restricted and falls in a range of preferably 10 to 200% by mass, more preferably 50 to 150% by mass based on the dye. Further, they are used preferably in combination.

Silanol Compound:

A silanol compound represented by the following Formula (4) is preferably contained in the toner used in the present invention:

$$(R_s)_m Si(OH)_n \qquad \text{Formula (4)}$$

In Formula (4), $R_s$ represents a hydrogen atom, an alkyl group, an aryl group, a heterocyclic group, an alkoxy group or a siloxy group; m and n each represent an integer of 1 to 3, and m+n is 4; and when m is 2 or 3, $R_s$ may be the same or different.

In Formula (4), the alkyl group represented by $R_s$ includes, for example, methyl, ethyl, propyl, butyl, t-butyl, n-octyl and the like. The aryl group includes phenyl, naphthyl, anthranyl and the like. The heterocyclic group includes pyridyl, pyrimidyl, quinolyl, pyrazolyl, imidazolyl and the like. The alkoxy group includes, for example, methoxy, ethoxy, n-propoxy, i-propoxy, n-octoxy and the like. They may be further substituted with groups which can be substituted onto $A^1$ to $A^4$ in Formula (1) described above. $R_s$ is preferably a hydrogen atom, an alkyl group having 1 to 12 carbon atoms, an aryl group, an alkoxy group having 1 to 12 carbon atoms or a siloxy group, and in a case of the siloxy group, it is an oligomer. $R_s$ is more preferably a hydrogen atom, an alkyl group having 1 to 8 carbon atoms or an alkoxy group having 1 to 8 carbon atoms.

The organic silanol compound according to the present invention can readily be synthesized by a person ordinarily skilled in the field concerned according to publicly known methods, or it can be obtained in the form of commercial products. Reference documents therefor include, for example, JP-A 1988-22759, JP-A 1988-316789, JP-A 1988-5093, JP-A 1991-157388, JP-A 1994-256355, JP-A 1996-143581, JP-A 2002-20390 and the like.

The specific structures of the compound represented by Formula (4) according to the present invention are shown below, but the structural isomers thereof according to the substitution positions of substituents are shown merely as one example, and they are not restricted by the isomers.

4-1
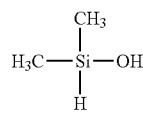

4-2
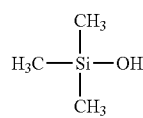

4-3
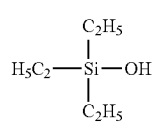

4-4
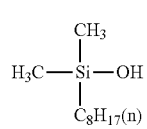

4-5
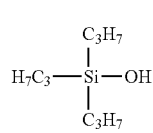

4-6
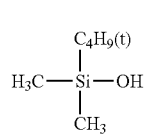

4-7
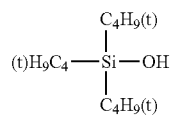

4-8
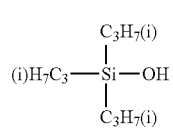

4-9
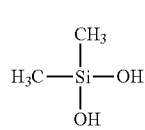

4-10
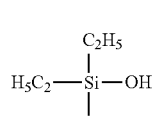

4-11
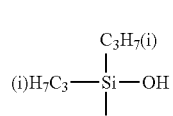

4-12
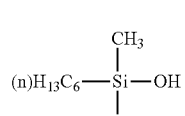

4-13
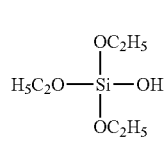

4-14
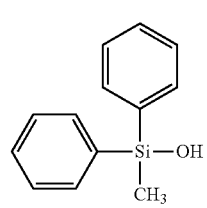

4-15
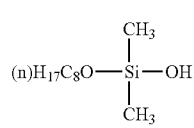

4-16
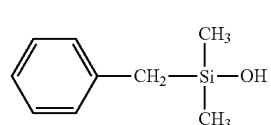

4-17
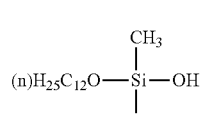

4-18
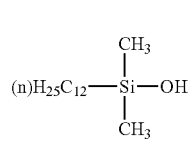

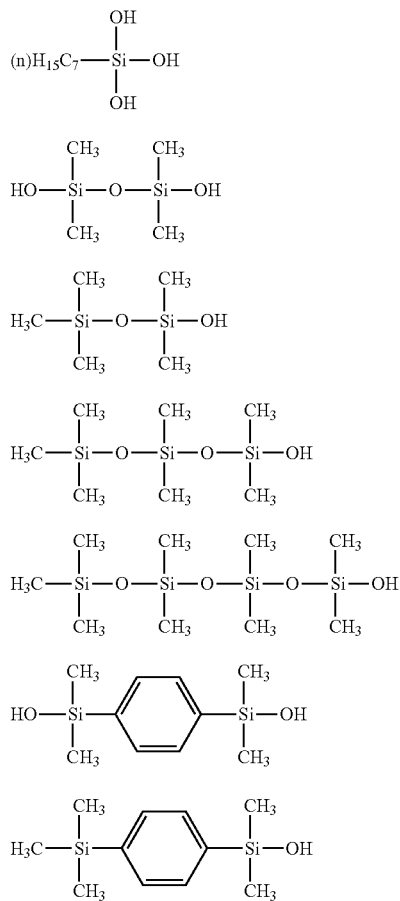

A content of the silanol compound represented by Formula (4) shall not specifically be restricted and is preferably 100 to 500 ppm, more preferably 100 to 350 ppm based on the toner for electrostatic image developing. Controlling a content of the organic silanol compound to 100 ppm or more makes it possible to exert the object and the effects of the present invention, and controlling the content to 500 ppm or less prevents the toner for electrostatic image developing from being softened too much and prevents problems on a deterioration in the toner storage stability which is excellent in the above performances, a reduction in the fixation ratio and odor from being caused, so that both are preferred.

A content of the silanol compound represented by Formula (4) described above in the production step is preferably 100 to 330 ppm based on the toner for electrostatic image developing, and controlling the content to the above range makes it possible to exert an effect on a rise in a dispersibility of the mold lubricant (wax) contained in the toner and makes it possible to set a residual amount of the organic silanol compound contained in the toner after drying under reduced pressure to a range prescribed in the present invention, but it shall not be restricted thereto.

A method for adding the silanol compound represented by Formula (4) to the toner for electrostatic image developing is preferably a method in which the silanol compound is added in preparing the colorant dispersion in the case of the toner produced by a polymerization process comprising a step of polymerizing, for example, a polymerizable monomer shown below in an aqueous medium to produce the resin. In addition thereto, however, it includes as well a method in which the silanol compound is added to the polymerizable monomer in preparing the resin particles. In a case where the production process of the polymerization process toner is a multistage polymerization process shown below, it includes as well a method in which the silanol compound is added at the same time as adding the mold lubricant.

In the present invention, a determination method of the organic silanol compound includes a method in which it is measured by using a detection method used in a conventional gas chromatograph such as an internal standard method and the like according to a gas chromatograph of a head space system. In the above method, the toner is put in an open and close vessel and heated up to temperature in heat fixation of copying machines and the like, and gas contained in the vessel is injected quickly into the gas chromatograph in a state in which the vessel is filled with volatile components to measure an amount of the volatile components and carry out as well MS (mass spectrometry).

A measuring method carried out by a head space gas chromatograph shall be explained below in detail.

Head Space Gas Chromatograph Measuring Method:
1. Sampling:
   the sample 0.8 g was put in a 20 ml vial for a head space. The sample amount is weighted by 0.01 g (needed for calculating an area per a unit weight). The vial is sealed with an exclusive crimper using a septum.
2. Heating of Sample:
   The sample is put in a thermostatic oven of 170° C. in a state in which the sample is caused to stand, and it is heated for 30 minutes.
3. Setting of Separation Conditions in Gas Chromatograph:
   A column having an inside diameter of 3 mm and a length of 3 m which is filled with a carrier coated with a silicone oil SE-30 in a mass ratio of 15% is used as a separation column. The above separation column is installed in a gas chromatograph, and He is caused to flow as a carrier gas at 50 ml/minute. A temperature of the separation column is set to 40° C. to carry out the measurement while heating the column up to 260° C. at 15° C./minute. The temperature is held for 5 minutes after reaching 260° C.
4. Introduction of Sample:
   The vial bottle is taken out from the thermostatic oven to take immediately 1 ml of gas generated from the sample in a gas-tight syringe, and this is injected into the separation column described above.
5. Calculation:
   A calibration curve is prepared in advance by using the organic silanol compound as an internal standard substance to determine individually the concentrations of the respective components.
6. Equipments:
(1) Head Space Conditions
   Head Space Equipment:
      HP7694 [Head Space Sampler] manufactured by Hewlett-Packard Company
   Temperature Conditions:
   Transfer line: 200° C.
   Loop temperature: 200° C.
   Sample amount: 0.8 g/20 ml vial
(2) GC/MS Conditions
   GC: HP5890 manufactured by Hewlett-Packard Company
   MS: HP5971 manufactured by Hewlett-Packard Company
   Column: HP-624 30 m×0.25 mm
   Oven temperature: 40° C. (3 minutes)—15° C./minute—260° C.
   Measuring mode: SIM The toner of the present invention is produced preferably by a production process (polymerization process) in which the polymerizable monomers are polymerized in an aqueous medium. In the above production process, the polymerizable monomers re polymerized by a suspension polymerization process to prepare resin particles, or the monomers are subjected to emulsion polymerization or mini-emulsion polymerization in a liquid (aqueous medium) to which an emulsion of needed additives is added to prepare fine resin particles, and after adding charge-controlling resin particles thereto if necessary, an organic solvent, a flocculant such as salts and the like are added thereto to flocculate and fuse the above resin particles, whereby the toner is produced by the above process.

Suspension Polymerization Process:

One example of the process for producing the toner of the present invention includes the following process. A charge-controlling resin is dissolved in the polymerizable monomers, and the colorant, if necessary, a mold lubricant and various constitutional materials such as a polymerization initiator and the like are added thereto to dissolve or disperse the various constitutional materials in the polymerizable monomers by means of a homogenizer, a sand mill, a sand grinder, a supersonic disperser or the like. The polymerizable monomers in which the various constitutional materials are dissolved or dispersed are dispersed in an aqueous medium containing a dispersion stabilizer in the form of oil droplets having a size desired to the toner by means of a homo-mixer, a homogenizer or the like. Then, the mixture is transferred into a reaction equipment (stirring equipment) in which a stirring mechanism is a stirring blade described later and heated to thereby expedite the polymerization reaction. After finishing the reaction, the dispersion stabilizer is removed, and the residue is filtered, washed and dried, whereby The toner of the present invention is prepared. The [aqueous medium] referred to in the present invention means a medium in which at least 50% by mass or more of water is contained.

Emulsion Polymerization Process:

Another process for producing the toner of the present invention is preferably a process in which the resin particles are subjected to salting-out/fusing in an aqueous medium to prepare the toner. The above process shall not specifically be restricted and includes, for example, processes shown in JP-A 1993-265252, JP-A 1994-329947 and JP-A 1997-15904. That is, the toner of the present invention can be formed by a process in which a plurality or more of the resin particles, the dispersed particles comprising the constitutional materials such as the colorant and the like or the fine particles constituted from the resins, the colorant and the like is subjected to salting-out, flocculation and fusion, particularly a process in which the above constitutional materials are dispersed in water by using an emulsifier, and then the emulsion is salted out by adding a flocculant having a critical flocculation concentration or higher; at the same time as the salting-out, a diameter of the particles is caused to gradually grow while the particles formed are heated and fused at a temperature of not lower than a glass transition temperature of the formed polymer itself to form fused particles, and when the particles reach a targeted particle diameter, a large amount of water is added thereto to terminate particle diameter growth; a surface of the particles is smoothed while heating and stirring them to control a form thereof; and the particles are heated and dried in a flowing state while staying in an aqueous state. In the above case, a solvent which is infinitely dissolved in water, such as alcohol and the like may be added at the same time as adding the flocculant.

In the production process for the toner of the present invention, preferably used is a process in which composite resin fine particles formed by passing through a step of dissolving a crystalline substance in the polymerizable monomer and then polymerizing the polymerizable monomer and the colorant particles are subjected to salting-out/fusing. When the crystalline substance is dissolved in the polymerizable monomer, the crystalline substance may be dissolved therein after the crystalline substance is dissolved or after it is molten.

In the production process for the toner of the present invention, preferably used is a step in which the composite resin fine particles obtained by a multistage polymerization process and the colorant particles are subjected to salting-out/fusing. In this regard, the multistage polymerization process shall be explained below.

Production Process for Composite Resin Particles Obtained by Multistage Polymerization Process:

When the multistage polymerization process is used, the production process for the toner of the present invention is constituted preferably from steps shown below. It is constituted from:

1: multistage polymerization step
2: salting-out/fusing step for subjecting the composite resin fine particles and the colorant particles to salting-out/fusing to obtain the toner particles
3: ripening step which is a step following the salting-out/fusing step, wherein the temperature is held at the vicinity of a melting point of the crystalline substance, preferably the melting point ±20° C. even after fusing the resin particles, and stirring is continued at a fixed strength, whereby the crystalline substance is subjected to phase separation
4: filtering and washing step for separating the toner particles from the dispersion of the toner particles by filtering to remove the surfactant and the like from the toner particles
5: drying step for drying the toner particles subjected to washing treatment and
6: step for adding an external additive to the toner particles subjected to drying treatment.

The respective steps are explained below in detail.

Multistage Polymerization Step:

The multistage polymerization step is a polymerization method carried out for expanding a molecular weight distribution of the resin particles in order to obtain the toner in which offset is prevented from being generated. That is, polymerization reaction is carried out by dividing it into a multistage in order to form phases having different molecular weight distributions in one resin particle, and it is intentionally carried out so that a molecular weight gradient is formed, in the resulting resin particle from a center of the particle toward a surface layer thereof. For example, employed is a method in which a dispersion of the resin particle having a high molecular weight is obtained in the beginning and in which the polymerizable monomer and a chain transfer agent are then newly added to thereby form thereon a surface layer having a low molecular weight.

In the present invention, the multistage polymerization process of three stage polymerization or higher is preferably employed from the viewpoints of a stability of the production and a breaking strength of the resulting toner. A two stage polymerization process and a three stage polymerization process which are representative examples of the multistage polymerization process are explained below. The toners obtained by the above multistage polymerization processes have a lower molecular weight toward at surface layer of the toner from the viewpoint of a breaking strength thereof.

Two Stage Polymerization Process:

The two stage polymerization process is a process for producing the composite resin particles constituted from a central part (nucleus) formed from the higher molecular weight resin containing the crystalline substance and an outer layer (shell) formed from the lower molecular weight resin.

To specifically explain the above process, the crystalline substance is dissolved in the monomer in the beginning to prepare a monomer solution, and this monomer solution is dispersed in an aqueous medium (for example, a surfactant aqueous solution) in the form of oil droplets. Then, the above dispersion is subjected to polymerization treatment (first stage polymerization), whereby a dispersion of the resin particles having a high molecular weight which contain the crystalline substance is prepared.

Next, a polymerization initiator and the monomer for obtaining the lower molecular weight resin are added to the above dispersion of the resin particles, and the monomer is subjected to polymerization treatment (second stage polymerization) under the presence of the resin particles, whereby a coating layer comprising the resin (polymer of the monomer) having a low molecular weight is formed on the surface of the resin particles.

Three Stage Polymerization Process:

The tree stage polymerization process is a process for producing the composite resin particles constituted from a central part (nucleus) formed from the higher molecular weight resin, an intermediate layer containing the crystalline substance and an outer layer (shell) formed from the lower molecular weight resin. The toner of the present invention is present in the form of the composite resin particles described above.

To specifically explain the above process, the dispersion of the resin particles obtained by polymerization treatment (first stage polymerization) according to a conventional method is added to an aqueous medium (for example, an aqueous solution of a surfactant) in the beginning, and a monomer solution prepared by dissolving the crystalline substance in the monomer is dispersed in the aqueous medium described above in the form of oil droplets. Then, the above dispersion is subjected to polymerization treatment (second stage polymerization), whereby a coating layer (intermediate layer) comprising the resin (polymer of the monomer) containing the crystalline substance is formed, on the surface of the resin particles (nuclear particles) to prepare a dispersion of the composite resin particles (high molecular weight resin-middle molecular weight resin).

Next, a polymerization initiator and the monomer for obtaining the lower molecular weight resin are added to the dispersion of the composite resin particles obtained, and the monomer is subjected to polymerization treatment (third stage polymerization) under the presence of the composite resin particles, whereby a coating layer comprising the resin (polymer of the monomer) having a low molecular weight is formed on the surface of the composite resin particles. In the process described above, introduction of the intermediate layer makes it possible to disperse the crystalline substance in a fine and even manner, and therefore it is preferred.

In one embodiment of the production process for the toner of the present invention, it is one characteristic to polymerize the polymerizable monomer in the aqueous medium. That is, in forming the resin particles (nuclear particles) containing the crystalline substance or the coating layer (intermediate layer), the crystalline substance is dissolved in the monomer, and the resulting monomer solution is dispersed in the aqueous medium in the form of oil droplets. The polymerization initiator is added to the above dispersion to carry out polymerization treatment, whereby the particles are obtained in the form of a latex particle.

The aqueous medium used in the present invention means a medium comprising 50 to 100% by mass of water and 0 to 50% by mass of a water-soluble organic solvent. Solvents which can be shown as the examples of the water-soluble organic solvent include, for example, methanol, ethanol, isopropanol, butanol, acetone, methyl ethyl ketone, tetrahydrofuran and the like, and alcohol base organic solvents which do not dissolve the resins obtained are preferred.

A polymerization process suited to forming the resin particles or the coating layer containing the crystalline substance includes a process in which the monomer solution obtained by dissolving the crystalline substance in the monomer is dispersed in the form of oil droplets by making use of a mechanical energy in an aqueous medium obtained by dissolving a surfactant having a concentration of a critical micelle concentration or lower to prepare an emulsion and in which a water-soluble polymerization initiator is added to the emulsion obtained above to radically polymerize the monomer in the oil droplets (hereinafter referred to as a mini-emulsion process in the present invention). In the process described above, an oil-soluble polymerization initiator may be used in place of or together with the water-soluble polymerization initiator.

According to the mini-emulsion process in which the oil droplets are mechanically formed, desorption of the crystalline substance dissolved in the oil phase is decreased unlike a conventional emulsion polymerization process, and a sufficiently large amount of the crystalline substance can be introduced into the resin particles and the coating layer formed.

In this connection, a dispenser for dispersing the oil droplets by a mechanical energy shall not specifically be restricted and includes, for example, a stirring equipment CLEARMIX (manufactured by M Technique Co., Ltd.) equipped with a rotor which is rotated at a high speed, a supersonic disperser, a mechanical homogenizer, Manton Goalin, a pressure type homogenize and the like. The dispersed particle diameter is preferably 10 to 100 nm, more preferably 50 to 1000 nm and particularly preferably 30 to 300 nm.

A phase separation structure of the crystalline substance in the toner particles, that is, a Feret horizontal diameter, a form factor and variation coefficients thereof may be controlled by distributing the dispersed particle diameter.

Publicly known processes such as an emulsion polymerization process, a suspension polymerization process, a seed polymerization process and the like can also be employed as another polymerization process for forming the resin particles or the coating layer containing the crystalline substance. The above polymerization processes can be employed as well in order to obtain the resin particles (nuclear particles) constituting the composite resin particles or the coating layer which do not contain the crystalline substance.

A particle diameter of the composite resin particles obtained by the above polymerization process falls in a range of preferably 10 to 1000 nm in terms of a mass average particle diameter measured by means of an electrophoretic light scattering photometer [ELS-800] manufactured by Otsuka Electronics Co., Ltd.).

Also, a glass transition temperature (Tg) of the composite resin particles falls in a range of preferably 48 to 73° C., more preferably 52 to 64° C.

Further, a softening point of the composite resin particles falls in a range of preferably 95 to 140° C.

The toner of the present invention is obtained by fusing the resin particles on the surfaces of the resin and the colored particles by a salting-out/fusing method to form the resin layer, and this matter shall be explained below.

Salting-Out/Fusing Step:

The salting-out/fusing step is a step of subjecting the composite resin particles and the colorant particles obtained in the multistage polymerization step described above to salting-out/fusing (causing salting-out and fusing at the same time) to thereby obtain amorphous (non-spherical) toner particles.

In the present invention, salting-out/fusing means causing salting-out (aggregation of particles) and fusing (extinction of an interface between particles) at the same time or an action of causing salting-out and fusing at the same time. In order to cause salting-out and fusing at the same time, the particles (the composite resin particles and the colorant particles) are preferably aggregated under the temperature condition of not lower than a glass transition temperature (Tg) of the resin constituting the composite resin particles.

In the above salting-out/fusing step, particles (fine particles having a number average primary particle diameter of 10 to 1000 nm) of additives such as a charge-controlling agent and the like may be subjected to salting-out/fusing together with the composite resin particles and the colorant particles. Further, the colorant particles may be subjected to surface modification, and conventionally known compounds can be used as the surface modifier.

Ageing Step:

The ageing step is a step following the salting-out/fusing step, and it is a step of maintaining the temperature in the vicinity of a melting point of the crystalline substance, preferably a melting point ±20° C. even after fusing the resin particles and continuing stirring at a fixed strength to thereby subject the composite resin particles to phase separation. In the above step, a Feret horizontal diameter and a form factor of the crystalline substance and the variation coefficients thereof can be controlled.

In the present invention, a total of a divalent (trivalent) metal element used for a flocculant and a monovalent metal element added as a flocculation terminator is preferably 350 to 35000 ppm. A residual amount of metal ions in the toner can be determined by measuring a fluorescent X-ray intensity emitted from metal (for example, calcium originating in calcium chloride) of metal salt used as the flocculant by means of an X-ray fluorescence spectrometer [System model 3270] (manufactured by Rigaku Industrial Corp.). In the specific measuring method thereof, plural toners in which content proportions of metal salts of flocculants are known are arranged, and 5 g of each toner is palletized. Measured is a relation (calibration curve) between a content proportion (ppm by mass) of the metal salt of the flocculant and a fluorescent X-ray intensity (peak intensity) emitted from the metal of the above metal salt. Then, a toner (sample) in which a content proportion of the metal salt of the flocculant has to be measured is palletize in the same manner, and a fluorescent X-ray intensity emitted from the metal of the metal salt of the flocculant is measured, whereby a content proportion thereof, that is, [a metal ion residual amount in the toner] can be determined.

Filtering and Washing Step:

In the above filtering and washing step, carried out are filtering treatment for separating the toner particles from the dispersion of the toner particles obtained in the step described above by filtering and washing treatment for removing attached matters such as the surfactant, the salting agent and the like. In this regard, the filtering treatment method includes a centrifugal method, a vacuum filtering method carried out by using a Nusche funnel and the like and a filtering method carried out by using a filter press and the like, but it shall not specifically be restricted to them.

Drying Step:

This step is a step of subjecting the toner particles subjected to the washing treatment to drying treatment, and it is preferably a step of subjecting the toner particles to vacuum drying treatment in the present invention.

A vacuum dryer used in the above step includes, for example, a vacuum spray dryer, a vacuum freeze dryer, a vacuum dryer and the like, but it shall not be restricted to them. To be specific, a standing rack dryer which can be reduced in pressure, a transferring rack dryer, a fluid bed rack dryer, a rotary dryer, a stirring dryer and the like can preferably be used.

In the conditions of the vacuum dryer, a drying temperature is preferably not higher than Tg of the resin, and a vacuum degree, a drying time and the like are not specifically restricted and can suitably be set.

When the toner particles subject to the vacuum drying treatment are aggregated by a weak attraction between the particles, the aggregated particles may be subjected to cracking treatment. In this connection, mechanical cracking equipments such as a jet mill, a Henschel mixer, a coffee mill, a food processor and the like can be used as the cracking treatment equipment.

The toner of the present invention is prepared preferably by forming the composite resin particles under the absence of the colorant, adding a dispersion of the colorant particles to a dispersion of the composite resin particles and subjecting the colorant particles and the composite resin particles to salting-out/fusing.

As described above, the composite resin particles are prepared in a system in which the colorant is not present, whereby polymerization reaction for obtaining the composite resin particles is prevented from being blocked. Thus, according to the toner of the present invention, the excellent offset resistance is not damaged, and stain of the fixing device brought about by the attached toner and stain of the images are not brought about.

Also, polymerization reaction for obtaining the composite resin particles is carried out surely, and it results in that the monomers and the oligomers are prevented from remaining in the toner particles obtained and that foreign odor is prevented from being generated in a heat fixing step of an image-forming method using the above toner.

Further, the surface of the toner obtained is homogeneous, and the electric amount distribution is sharpened, so that images having an excellent sharpness can be formed over a long period of time. The toner which is homogeneous in a composition, a molecular weight and a surface property between the tone particles makes it possible to improve an offset resistance and a rolling prevention property while maintaining a good adhesive property (high fixing strength) onto an image support in an image-forming method comprising a fixing step carried out by a contact heating system, and the images having a suitable gloss are obtained.

Next, the respective constitutional factors used in the tone production step shall be explained in detail.

Polymerizable Monomers:

In the polymerizable monomers for producing the resins (binders) used in the present invention, a hydrophobic monomer is an essential constitutional component, and a crosslinkable monomer is used if necessary. Further, as described below, at least one of monomers having an acid polar group or monomers having a basic polar group is preferably contained.

(1) Hydrophobic Monomer:

The hydrophobic monomer constituting the monomer component shall not specifically be restricted, and conventionally known monomers can be used. Further, two or more kinds thereof can be used in combination so that the required characteristics can be satisfied.

To be specific, capable of being used are monovinyl aromatic monomers, (meth)acrylic ester base monomers, vinyl ester base monomers, vinyl ether base monomers, monoolefin base monomers, diolefin base monomers, halogenated olefin base monomers and the like.

The vinyl aromatic monomers include, for example, styrene base monomers such as styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene and the like, and derivatives thereof.

The acryl base monomers include acrylic acid, methacrylic acid, methyl acrylate, ethyl acrylate, butyl acrylate, 2-ethylhexyl acrylate, cyclohexyl acrylate, phenyl acrylate, methyl methacrylate, ethyl methacrylate, butyl methacrylate, hexyl methacrylate, 2-ethylhexyl methacrylate, ethyl β-hydroxyacrylate, propyl γ-aminoacrylate, stearyl methacrylate, dimethylaminoethyl methacrylate, diethylaminoethyl methacrylate and the like.

The vinyl ester base monomers include vinyl acetate, vinyl propionate, vinyl benzoate and the like.

The vinyl ether base monomers include vinyl methyl ether, vinyl ethyl ether, vinyl isobutyl ether, vinyl phenyl ether and the like.

The monoolefin base monomers include ethylene, propylene, isobutylene, 1-butene, 1-pentene, 4-methyl-1-penten and the like.

The diolefin base monomers include butadiene, isoprene, chloroprene and the like.

(2) Cross-Linkable Monomer:

A cross-linkable monomer may be added in order to improve the characteristics of the resin particles. The cross-linkable monomer includes monomers having two or more unsaturated bonds, such as divinylbenzene, divinylnaphthalne, divinyl ether, diethylene glycol methacrylate, ethylene glycol dimethacrylate, polyethylene glycol dimethacrylate, diallyl phthalate and the like.

(3) Monomer Having an Acid Polar Group:

The monomer having an acid polar group includes (a) α,β-ethylenically unsaturated compounds having a carboxyl group (—COOH) and (b) α,β-ethylenically unsaturated compounds having a sulfone group (—$SO_3H$).

The examples of the α,β-ethylenically unsaturated compounds having a carboxy group (—COOH) of (a) include acrylic acid, methacrylic acid, fumaric acid, maleic acid, itaconic acid, cinnamic acid, monobutyl maleate, monooctyl maleate and salts of metals such as Na, Zn and the like.

The examples of the α,β-ethylenically unsaturated compound having a sulfone group (—$SO_3H$) of (b) include sulfonated styrene, Na salt thereof, allylsulfosuccinic acid, octyl allylsulfosuccinate, Na salts thereof and the like.

(4) Monomer Having an Basic Polar Group:

Capable of being shown as the examples of the monomer having a basic polar group are (i) (meth)acrylates of aliphatic alcohols having an amine group or a quaternary ammonium group and having 1 to 12 carbon atoms, preferably 2 to 8 carbon atoms and particularly preferably 2 carbon atoms, (ii) (meth)acrylamides or (meth)acrylamides which are mono- or di-substituted with an alkyl group having 1 to 18 carbon atoms on optional N, (iii) vinyl compounds substituted with a heterocyclic group having N as a ring member and (iv) N,N-diallyl-alkylamines or quaternary ammonium salts thereof. Among them, the (meth)acrylates of aliphatic alcohols having an amine group or a quaternary ammonium group shown in (i) are preferred as the monomer having a basic polar group.

The (meth)acrylates of aliphatic alcohols having an amine group or a quaternary ammonium group shown in (i) include dimethylaminoethyl acrylate, dimethylaminoethyl methacrylate, diethylaminoethyl acrylate, diethylaminoethyl methacrylate, quaternary ammonium salts of the four compounds described above, 3-dimethylaminophenyl acrylate, 2-hydroxy-3-methacryloxypropyltrimethylammonium salts and the like.

The (meth)acrylamides or (meth)acrylamides which are mono- or di-substituted on optional N shown in (ii) include acrylamide, N-butylacrylamide, N,N-dibutylacrylamide, piperidylacrylamide, methacrylamide, N-butylmethacrylamide, N,N-dimethylacrylamide, N-octadecylacrylamide and the like.

The vinyl compounds substituted with a heterocyclic group having N as a ring member shown in (iii) include vinylpyridine, vinylpyrrolidone, vinyl-n-methylpyridinium chloride, vinyl-N-ethylpyridinium chloride and the like.

The examples of the N,N-diallyl-alkylamines shown in (iv) include N,N-diallylmethylammonium chloride, N,N-diallylethylammonium chloride and the like.

Polymerization Initiator:

The radical polymerization initiator used in the present invention can suitably be used as long as it is water-soluble. It includes, for example, persulfates (for example, potassium persulfate, ammonium persulfate and the like), azo base compounds (for example 4,4'-azobis-4-cyanovaleric acid and salts thereof, 2,2'-azobis(2-amidinopropane) salts and the like), peroxide compounds and the like. Further, the radical polymerization initiators described above can be combined, if necessary, with reducing agents and turned into redox initiators. Use of the redox initiators makes it possible to elevate the polymerization activity, lower the polymerization temperature and achieve shortening of the polymerization time, and therefore they are preferred.

The polymerization temperature may be selected from any temperatures as long as it is not lower than a minimum temperature of forming radicals of the polymerization initiator, and it is used in a range of 50 to 90° C. However, use of polymerization initiators which initiate polymerization at room temperature, for example, combination of hydrogen peroxide-reducing agent (ascorbic acid and the like) makes it possible as well to carry out the polymerization at room temperature or temperature higher than it.

Surfactant:

In order to carry out particularly mini-emulsion polymerization by using the polymerizable monomers described above, a surfactant is preferably used to disperse the monomers in an aqueous medium in the form of oil droplets. The surfactant which can be used in the above case shall not specifically be restricted, and the following ionic surfactants can be listed as the examples of the suitable compounds.

The ionic surfactants include, for example, sulfonates (sodium dodecybenzenesulfonate, sodium arylalkylpolyethersulfonate, sodium 3,3-disulfonediphenylurea-4,4-diazo-bis-amino-8-naphthol-6-sulfonate, ortho-carboxybenzene-azo-dimethylaniline, sodium 2,2,5,6-tetramethyl-triphenylmethane-4,4-diazo-bis-β-naphthol-6-sulfonate and the like), sulfuric ester salts (sodium dodecylsulfate, sodium tetradecylsulfate, sodium pentadecylsulfate, sodium octylsulfate and the like), aliphatic acid salts (sodium oleate, sodium laurate, sodium caprate, sodium caprylate, sodium caproate, potassium stearate, potassium oleate acid and the like).

Further, nonionic surfactants can be used as well. To be specific, they include, for example, polyethylene oxide, polypropylene oxide, combination or polyethylene oxide and polypropylene oxide, esters of polyethylene glycol with higher fatty acids, alkylphenol polyethylene oxide, esters of higher fatty acids with polyethylene glycol, esters of higher fatty acids with polypropylene oxide, sorbitan ester and the like.

In the present invention, the above surfactants are used primarily as an emulsifier in emulsion polymerization, and they may be used in other steps or for other purposes.

Resin Particles and Molecular Weight Distribution of Toner:

In the toner according to the present invention, the peak or the shoulder is present preferably in 100,000 to 1,000,000 and 1,000 to 50,000, more preferably 100,000 to 1,000,000, 25,0000 to 150,000 and 1,000 to 50,000.

Preferred are the resins comprising both components of a high molecular weight component having a peak or a shoulder in a range of 100,000 to 1,000,000 in terms of a molecular weight of the resin particles and a low molecular weight component having a peak or a shoulder in a range of 1,000 to 50,000. More preferably used are the resins of a middle molecular weight having a peak or a shoulder in a part of 15,000 to 100,000 in terms of a peak molecular weigh.

A method for measuring a molecular weight of the toner or the resin is preferably a method for measuring it by GPC (gel permeation chromatograph) using THF (tetrahydrofuran) as a solvent. That is, 1.0 ml of THF is added to 0.5 to 5 mg, to be more specific, 1 mg of the measuring sample, and the mixture is stirred at room temperature by means of a magnetic stirrer to dissolve the sample sufficiently in THF. Next, the solution is filtrated through a membrane filter having a pore size of 0.45 to 0.50 μm, and then the filtrate is injected into GPC. In the measuring conditions of GPC, the column is stabilized at 40° C.; THF is caused to flow at a flow rate of 1.0 ml per minute; and about 100 μl of the sample having a concentration of 1 mg/ml is injected for measurement. Combination of commercial styrene gel columns is preferably used for the column. Capable of being listed are, for example, combination of Shodex GPC KF-801, 802, 803, 804 805, 806 and 807 each manufactured by Showa Denko K.K. and combination of TSKgel G1000H, G2000H, G3000H, G4000H, G5000H, G6000H, G72000H and TSKguard column each manufactured by Tosoh Corp. Also, a refractive index detector (IR detector) and a UV detector can be used as the detector. In measuring a molecular weight of the sample, a molecular weight distribution of the sample is calculated by using a calibration curve prepared by using monodispersed polystyrene standard particles. About ten samples can be used as polystyrene for preparing the calibration curve.

Flocculant:

The flocculant used in the present invention is selected preferably from metal salts.

The metal salts include salts of monovalent metals, for example, alkali metals such as sodium, potassium, lithium and the like, salts of divalent metals, for example, alkaline earth metals such as calcium, magnesium and the like and divalent metals such as manganese, copper and the like and salts of trivalent metals such as iron, aluminum and the like.

The specific examples of the above metal salts are shown below. The specific examples of the metal salts of the monovalent metals include sodium chloride, potassium chloride, lithium chloride and the like, and the metal salts of the divalent metals include calcium chloride, zinc chloride, copper sulfate, magnesium sulfate, manganese sulfate and the like. The metal salts of the trivalent metals include aluminum chloride, iron chloride and the like. They are suitably selected according to the purposes. In general, the divalent metal salts have a smaller critical flocculation concentration (coagulation value or coagulation point) than those of the monovalent metal salts, and the trivalent metal salts have a further smaller critical flocculation concentration.

The critical flocculation concentration referred to in the present invention is an index for a stability of a dispersed matter in an aqueous dispersion and shows a concentration in a point in which the flocculant is added to being about flocculation. The above critical flocculation concentration is changed to a large extent according to a latex itself and a dispersant. It is described in, for example, Polymer Chemistry 17, 601 (1960), written by Seizo Okamura, and the value thereof can be known according to the descriptions thereof. Also, in another method, the desired salt is added to the targeted particle dispersion while changing a concentration thereof to a measure a ζ potential of the dispersion, and the salt concentration in a point in which the ζ potential starts changing can be set as the critical flocculation concentration.

In the present invention, the metal salts are used to treat the polymer fine particle dispersion so that a concentration thereof reaches a critical flocculation concentration or higher. In this case, it is optionally selected, to be natural, according to the purposes whether the metal salt is added directly or in the form of an aqueous solution. When it is added in the form of an aqueous solution, a concentration of the metal salt based on a volume of the polymer particle dispersion and a whole volume of the metal salt aqueous solution has to be not lower than a critical flocculation concentration of the polymer particle.

A concentration of the metal salt which is the flocculant in the present invention may be a critical flocculation concentration or higher, and it is added in an amount which is as large by preferably 1.2 time or more, more preferably 1.5 time or more as the critical flocculation concentration.

Mold Lubricant:

The toner used in the present invention is a toner prepared by fusing the resin particles containing therein a mold lubricant in an aqueous medium. As described above, the resin particles containing therein the mold lubricant and the colorant particles are subjected to salting-out/fusing in the aqueous medium, whereby the toner in which the mold lubricant is dispersed in a fine form.

In the toner according to the present invention, the mold lubricant is preferably low molecular weight polypropylene (number average molecular weight=1500 to 9000), low molecular weight polyethylene and the like and particularly preferably an ester base compound represented by the following formula:

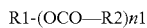

R1-(OCO—R2)n1

In the formula, n1 is an integer of 1 to 4, preferably 2 to 4, more preferably 3 to 4 and particularly preferably 4. R1 and R2 each represent a hydrocarbon group which may have a substituent. R1 may have 1 to 40 carbon atoms, preferably 1 to 20 carbon atoms and more preferably 2 to 5 carbon atoms. R2 may have 1 to 40 carbon atoms, preferably 16 to 30 carbon atoms and more preferably 18 to 26 carbon atoms.

Next, the examples of the representative compounds thereof are shown below.

1) $CH_3-(CH_2)_{12}-COO-(CH_2)_{17}-CH_3$

2) $CH_3-(CH_2)_{18}-COO-(CH_2)_{17}-CH_3$

3) $CH_3-(CH_2)_{20}-COO-(CH_2)_{21}-CH_3$

4) $CH_3-(CH_2)_{14}-COO-(CH_2)_{19}-CH_3$

5) $CH_3-(CH_2)_{20}-COO-(CH_2)_6-O-CO-(CH_2)_{20}-CH_3$

6) $CH_3-(CH_2)_{20}-COO-(CH_2)_2-CH(CH_3)-CH_2-O-CO-(CH_2)_{20}-CH_3$

7) $CH_3-(CH_2)_{22}-COO-(CH_2)_2-CH(CH_3)-CH_2-O-CO-(CH_2)_{22}-CH_3$

8) $CH_3-(CH_2)_{22}-COO-CH_2-C(CH_3)_2-CH_2-O-CO-(CH_2)_{22}-CH_3$

9) $CH_3-(CH_2)_{26}-COO-CH_2-C(CH_3)_2-CH_2-O-CO-(CH_2)_{26}-CH_3$

10)
$CH_2-O-CO-(CH_2)_{26}-CH_3$
$|$
$CH-O-CO-(CH_2)_{26}-CH_3$
$|$
$CH_2-O-CO-(CH_2)_{26}-CH_3$

11)
$CH_2-O-CO-(CH_2)_{22}-CH_3$
$|$
$CH-O-CO-(CH_2)_{22}-CH_3$
$|$
$CH_2-O-CO-(CH_2)_{22}-CH_3$

12)
$CH_2-OH$
$|$
$CH-O-CO-(CH_2)_{26}-CH_3$
$|$
$CH_2-O-CO-(CH_2)_{26}-CH_3$

13)
$CH_2-OH$
$|$
$CH-O-CO-(CH_2)_{22}-CH_3$
$|$
$CH_2-O-CO-(CH_2)_{22}-CH_3$

14)
$CH_2-OH$
$|$
$CH-OH$
$|$
$CH_2-O-CO-(CH_2)_{26}-CH_3$

15)
$CH_2-OH$
$|$
$CH-OH$
$|$
$CH_2-O-CO-(CH_2)_{22}-CH_3$

16)
$CH_3-(CH_2)_{26}-COO-CH_2-C(CH_3)(CH_2-O-CO-(CH_2)_{26}-CH_3)-CH_2-O-CO-(CH_2)_{26}-CH_3$

17)
$CH_3-(CH_2)_{20}-COO-CH_2-C(CH_2CH_3)(CH_2-O-CO-(CH_2)_{20}-CH_3)-CH_2-O-CO-(CH_2)_{20}-CH_3$

18)
$CH_3-(CH_2)_{20}-COO-CH_2-C(CH_2-O-CO-(CH_2)_{26}-CH_3)_2-CH_2-O-CO-(CH_2)_{26}-CH_3$

19)
$CH_3-(CH_2)_{20}-COO-CH_2-C(CH_2-O-CO-(CH_2)_{20}-CH_3)_2-CH_2-O-CO-(CH_2)_{20}-CH_3$

20)
$CH_3-(CH_2)_{18}-COO-CH_2-C(CH_2-O-CO-(CH_2)_{18}-CH_3)_2-CH_2-O-CO-(CH_2)_{18}-CH_3$

21)
$CH_3-(CH_2)_{16}-COO-CH_2-C(CH_2-O-CO-(CH_2)_{16}-CH_3)_2-CH_2-O-CO-(CH_2)_{16}-CH_3$

22)
$CH_3-(CH_2)_{20}-COO-CH_2-C(CH_2-O-CO-CH_3)_2-CH_2-O-CO-CH_3$

An addition amount of the compounds described above is 1 to 30% by mass, preferably 2 to 20% by mass and more preferably 3 to 15% by mass based on a whole amount of the toner.

The toner according to the present invention is prepared preferably by introducing the mold lubricant described above into the resin particles by a mini-emulsion polymerization process and salting out and fusing them with the toner particles.

Charge-Controlling Agent:

The toner can be blended with materials which can impart various performances as the materials for the toner in addition to the colorant and the mold lubricant. To be specific, they include a charge-controlling agent and the like. These components can be added by various methods such as a method in which they are added at the same time as the resin particles and the colorant particles in the salting-out/fusing stage described above and introduced into the toner, a method in which they are added to the resin particles themselves, and the like.

Various compounds which are publicly known and can be dispersed in water can be used as the charge-controlling agent. To be specific, it includes nigrosine base dyes, metal salts of napthenic acid or higher fatty acids, alkoxylated amines, quaternary ammonium salt compounds, azo base metal complexes, salicylic acid metal salts or metal complexes thereof and the like.

External Additive:

A so-called external additive can be added for use in the toner according to the present invention for the purposes of improving the fluidity and elevating the cleaning property. The external additive shall not specifically be restricted, and various inorganic fine particles, organic fine particles and lubricants can be used.

The inorganic fine particles which can be use as the external additive include conventionally known particles. To be specific, silica fine particles, titanium fine particles, alumina fine particles and the like can preferably be used. The above inorganic fine particles are preferably hydrophobic.

The specific examples of the silica fine particles include R-805, R-976, R-974, R-972, R-812 and R-809 which are commercial products manufactured by Nippon Aerosil Co., Ltd., HVK-2150 and H-200 which are commercial products manufactured by Hoechst A.G., TS-720, TS-530, TS-610, H-5 and MS-5 which are commercial products manufactured by Cabot Corporation, and the like.

The specific examples of the titanium fine particles include, for example, T-805 and T-604 which are commercial products manufactured by Nippon Aerosil Co., Ltd., MT-100S, MT-100B, MT-500BS, MT-600, MT-600SS and JA-1 which are commercial products manufactured by Tayca Corporation, TA-300SI, TA-500, TAF-130, TAF-510 and TAF510T which are commercial products manufactured by Fuji Titanium Industry Co., Ltd., IT-S, IT-OA, IT-OB and IT-OC which are commercial products manufactured by Idemitsu Kosan Co., Ltd., and the like.

The organic fine particles which can be used as the external additive include spherical fine particles having a number average primary particle diameter of 10 to 2000 nm. Constitutional materials for the above organic fine particles include polystyrene, polymethyl methacrylate, styrene-methyl methacrylate copolymers and the like.

The lubricants which can be used as the external additive include metal salts of higher fatty acids. The specific examples of the above metal salts of the higher fatty acids include metal stearate such as zinc stearate, aluminum stearate, copper stearate, magnesium stearate, calcium stearate and the like; metal oleate such as zinc oleate, manganese oleate, iron oleate, copper oleate, magnesium oleate and the like; metal palmitate such as zinc palmitate, copper palmitate, magnesium palmitate, calcium palmitate and the like; metal linoleate such as zinc linoleate, calcium linoleate and the like; metal ricinoleate such as zinc ricinoleate, calcium ricinoleate and the like.

An addition amount of the external additive is preferably 1 to 5% by mass based on the toner.

Adding Step of the External Additive:

This step is a step for adding the external additive to the toner particles subjected to the drying treatment.

An equipment used for adding the external additive includes various publicly known mixers such as a turbuler mixer, a Henschel mixer, a nauter mixer, a V type mixer and the like.

Toner Particles:

A particle diameter of the toner according to the present invention is preferably 3 to 10 μm, more preferably 3 to 8 μm in terms of a number average particle diameter. The above particle diameter can be controlled by a concentration of the flocculan (salting agent), an addition amount of the organic solvent, the fusing time and the composition of the polymer in the production process of the toner.

The number average particle diameter controlled to 3 to 10 μm reduces the toner fine particles which have such a large adhesive force as flying in the fixing step and adhering onto the heating member to bring about offset, enhances the transfer efficiency to improve an image quality of the halftone and raises a picture quality of the fine lines, the dots and the like.

A number average particle diameter of the toner can be measured by means of a Coulter counter TA-II, a Coulter multisizer SLAD1100 (laser diffraction particle diameter measuring equipment manufactured by Shimadzu Corporation) and the like.

In the present invention, the Coulter multisizer was used, and an interface (manufactured by Nikkaiki Bios Co., Ltd.) for outputting a particle size distribution and a personal computer were connected and used. The Coulter multisizer having an aperture of 100 μm was used to measure a volume distribution of the toner having a particle diameter of 2 μm or more (for example, 2 to 40 μm), and a particle size distribution and an average particle diameter thereof were calculated.

<Range of Preferred From Factor of Toner Particles>

A form factor of the toner according to the present invention is 65% by number or more for 1.0 to 1.6, preferably 65% by number or more for 1.2 to 1.6 and particularly preferably 70% by number or more for 1.2 to 1.6.

A form factor of the toner according to the present invention is shown by the following equation and shows a degree of a roundness of the toner particles:

$$\text{form factor} = ((\text{maximum diameter}/2)2 \times \pi)/\text{projected area}$$

In this connection, the maximum diameter means a maximum space between two parallel lines by which an image of the toner particle projected on a plane is interposed. Also, the projected area means an area of an image of the toner particle projected on a plane. In the present invention, the form factor was measured by taking a photograph of the toner particles enlarged by 2000 magnifications by means of a scanning type electron microscope and then analyzing a photographic image based on the above photograph by means of [SCANNING IMAGE ANALYZER] (manufactured by JEOL Ltd.). In the above case, 100 toner particle were used to measure the form factor according to the calculation equation described above in the present invention.

In the toner according to the present invention, a sum (R) of a relative frequency (r1) of the toner particles contained in a modal class and a relative frequency (r2) of the toner particles contained in a class having a higher frequency next to the modal class described above is preferably 70% or more in a histogram in which a natural logarithm ln D is allotted to a horizontal axis and in which the horizontal axis is divided into plural classes at an interval of 0.23 to show a particle size distribution based on a number, wherein D (μm) is a particle diameter of the toner particles.

Dispersion of the particle size distribution of the toner particles is narrowed by controlling the sum (R) of the relative frequency (r1) and the relative frequency (r2) to 70% or more, and therefore selective development can be surely inhibited from being generated by using the above toner in the image-forming step.

In the present invention, the histogram showing the particle size distribution based on a number described above is a histogram showing a particle size distribution based on a number, wherein a natural logarithm ln D (D: particle diameters of the respective toner particles) is divided into plural classes (0 to 0.23: 0.23 to 0.46: 0.46 to 0.69: 0.69 to 0.92: 0.92 to 1.15: 1.15 to 1.38: 1.38 to 1.61: 1.61 to 1.84: 1.84 to 2.07: 2.07 to 2.30: 2.30 to 2.53: 2.53 to 2.76 - - - ), and the particle diameter data of the sample measured by a Coulter multisizer according to the following conditions were transferred to a computer via an I/O unit, whereby the above histogram was prepared according to a particle size distribution analyzing program in the above computer.

Measuring Conditions:

1: aperture: 100 μm

2: sample preparing method: a proper amount of a surfactant (neutral detergent) is added to 50 to 100 ml of an electrolyte (ISOTON R-11 (manufactured by Coulter Scientific Japan Co., Ltd)) and stirred, and 10 to 20 mg of the sample for measurement is added thereto. This mixture is subjected to dispersing treatment for 1 minute by means of a supersonic disperser, whereby the sample is prepared.

Also, the toner according to the present invention is controlled preferably to a median diameter (D50v) of 3 μm or more and 8 μm or less based on a volume. Controlling the median diameter to the range described above makes it possible to reproduce precisely very small dot images of, for example, a 1200 dpi (dpi: dot number per 1 inch (2.54 cm)) level.

In the toner according to the present invention, it is one of the tasks that the colors of the photographic images can precisely be reproduced, and the dot images constituting the photographic images are miniaturized by controlling the median diameter based on a volume to a small diameter level of the range described above, whereby highly fine photographic images which are equal to or finer than printed images are obtained.

Particularly in the print field called on-demand printing in which an order of printing is received at a level of several 100 copies to several 1000 copies, high quality prints in which highly fine photographic images are formed can quickly be delivered to the clients.

The median diameter (D50v diameter) based on a volume can be measured and calculated by means of a multisizer 3 (manufactured by Beckman Coulter, Inc.) connected with a computer system for data processing.

In a measuring procedure, 0.02 g of the toner is left standing in 20 ml of a surfactant solution (a surfactant solution obtained by diluting a neutral detergent containing a surfactant component to ten times with purified water for the purpose of dispersing the toner) and then subjected to supersonic dispersion to prepare a toner dispersion. This toner dispersion is injected into a beaker containing ISOTON R-11 (manufactured by Coulter Scientific Japan Co., Ltd) in a sample stand with a pipette until a measuring concentration reaches 5 to 10%, and count of the measuring equipment is set to 2500 particles to measure a median diameter of the toner. The multisizer 3 having an aperture diameter of 50 μm is used.

In the toner according to the present invention, a variation coefficient (CV value) in a particle size distribution based on a volume is preferably 2% or more and 21% or less, more preferably 5% or more and 15% or less.

The variation coefficient (CV value) in a particle size distribution based on a volume shows a dispersibility of the toner particles based on a volume in a particle size distribution, and it is defined by the following equation.

CV value (%)=(standard deviation in number particle size distribution)/(median diameter (D50v) in number particle size distribution)×100

It is shown that the smaller the above CV value is the sharper the particle size distribution is, and this means that a size of the toner particles is uniformized. That is, the toner having a uniformized size is obtained, and therefore fine dot images and fine lines which are desired in forming digital images can be reproduced at a higher precision. Further, use of the small diameter toner having a uniformed size in printing photographic images makes it possible to form photographic images having a high quality of a level which is equal to or higher that that of images formed by a printing ink.

In the toner according to the present invention, a softening point (Tsp) is preferably 70° C. or higher and 110° C. or lower, more preferably 70° C. or higher and 100° C. or lower. The colorant used for the toner according to the present invention has a stable property in which a spectrum thereof is not changed by influence of heat, and influence of heat exerted to the toner in fixing can be reduced more by controlling the softening point to the ranges described above. Accordingly, images can be formed without applying a load on the colorant, and therefore the broader and more stable color reproducibility is expected to be exerted.

Further, controlling the softening point of the toner to the ranges described above makes it possible to fix toner images at lower temperature than in conventional techniques and form images which reduce consumption of an electric power and which are gentle to the environment.

A softening point of the toner can be controlled by carrying out, for example, the following methods alone or in combination. That is:

(1) controlling the kind and the composition ratio of the monomers used for forming the resins (2) controlling a molecular weight of the resin by the kind and an addition amount of the chain transfer agent (3) controlling the kind and an addition amount of wax and the like.

In a method for measuring a softening point of the toner, to be specific, the toner is molded into a cylindrical form having a height of 10 mm by means of [Flow Tester CFT-500] (manufactured by Shimadzu Corporation), and a pressure of 96×106 Pa is applied thereon by a plunger while heating the toner at a heating rate of 6° C./minute to extrude it from a nozzle having a diameter of 1 mm and a length of 1 mm. A curve (softening flow curve) between a plunger falling amount—temperature in the above flow tester is drawn by the above procedure, wherein a temperature at which the toner flows out in the beginning is set to a melt starting temperature, and a temperature corresponding to a falling amount of 5 mm is set to a softening point.

The toner according to the present invention is constituted from the particles (hereinafter referred to as the colored particles) comprising at least the resin, the colorant of the present invention and the silanol compound represented by Formula (4). The colored particles constituting the toner according to the present invention shall not specifically be restricted and can be prepared by conventional toner production methods. That is, they can be prepared by applying a toner production method by a so-called crashing method in which a toner is prepared by passing through mixing, crashing and classifying steps and a production method for a so-called polymer toner (for example, an emulsion polymerization method, a suspension polymerization method, a polyester stretching method and the like) in which a polymerizable monomer is polymerized and in which particles are formed at the same time while controlling a form and a size thereof.

When the toner according to the present invention is prepared by the crashing method, it is prepared preferably in a state in which a temperature of the mixture is maintained at 130° C. or lower. This is because of the reasons that if the temperature applied to the mixture exceeds 130° C., an aggregation state of the colorant contained in the mixture is varied by an action of heat applied to the mixture and is likely to make it impossible to maintain the even aggregation state. If the aggregation state is scattered, a color tone of the toner prepared results in being scattered, and it is concerned to cause color turbidity.

Developer:

The color toner of the present invention can be used in the form of a two-component developer in which it is constituted from the carrier and the toner, and it can be used in the form of a non-magnetic one-component developer in which it is constituted only from the toner.

Conventionally known materials including metals such as iron, ferrite, magnetite and the like and alloys of the above metals with metals such as aluminum, lead and the like can be used for the carrier comprising magnetic particles used when the toner is used in the form of the two-component developer. Among them, ferrite particles are preferred. A volume average particle diameter of the carrier is preferably 15 to 100 μm, more preferably 25 to 80 μm.

When the toner is used in the form of the non-magnetic one-component developer by which images are formed without using the carrier, the toner is rubbed and pressed onto the charging member and the developing roller in forming images, whereby the toner is electrically charged. Image formation by the non-magnetic one-component developing method makes it possible to simplify the structure of the developing apparatus, and therefore it has the merit that the whole image-forming apparatus can be compactified. Accordingly, use of the color toner of the present in the form of the non-magnetic one-component developer realizes preparation of prints of full colors by a compact color printer and makes it possible to prepare full color prints having an excellent color reproducibility even in a working environment in which a space thereof is limited.

An image-forming apparatus which can be used when the toner of the present invention is used in the form of the two-component developer, a full color image-forming apparatus in which the non-magnetic one-component developer is used, a developing equipment and a fixing equipment of a belt fixing system in which the color toner of the present can be fixed include, for example, those described in JP-A 2011-219644.

Ink for Ink Jet Recording:

Next, the ink for ink jet recording shall be explained.

The ink for ink jet recording according to the present invention contains the colorant composition of the present invention described above.

Various solvents such as aqueous solvents, oil base solvents, solid (phase change) solvents and the like can be used for the ink of the present invention, and particularly when the aqueous solvents are used, the effects of the present invention are exhibited. In general, water (for example, ion-exchanged water is preferred) and water-soluble organic solvents are used as the aqueous solvents.

The examples of the water-soluble organic solvents include alcohols (for example, methanol, ethanol, propanol, isopropanol, butanol, isobutanol, sec-butanol, t-butanol, benzyl alcohol and the like), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol and the like), polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, propylene glycol monophenyl ether and the like), amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetraamine, tetraethylenepentaamine, polyethyleneimine, pentamethyldiethylenetriamine, tetramethylpropylenediamine and the like), amides (for example, formamide, N,N-dimethylformamide, N,N-dimethylacetamide and the like), heterocycles (for example, 2-pyrrolidone, N-methyl-2-pyrrolidone, cyclohexylpyrrolidone, 2-oxazolidone, 1,3-dimethyl-2-imidazolidinone and the like), sulfoxides (for example, dimethylsulfoxide and the like), sulfones (for example, sulfolane and the like), urea, acetonitrile, acetone and the like.

On the other hand, when the colorant of the present invention is not dissolved as it is in the solvent, the colorant can be micronized by means of various dispersers (for example, a ball mill, a sand mill, an attriter, a roll mill, an agitator mill, a Henschel mixer, a colloid mill, a supersonic homogenizer, a pearl mill, a jet mill, an angmill and the like), or the colorant is dissolve in an organic solvent in which it is soluble, and then the solution can be dispersed in the solvent system thereof together with a polymer dispersant and a surfactant. Further, when it is an insoluble liquid or a semi-melt as it is, it can be dispersed in the solvent system thereof together with a polymer dispersant and a surfactant as it is or after the colorant is dissolve in an organic solvent in which it is soluble.

In a case of the aqueous solvent described above, when the colorant of the present invention is soluble in the solvent system thereof, it can be dissolved therein as it is for use.

When the colorant of the present invention is insoluble in the solvent system thereof, it is preferably dispersed in the solvent system thereof after micronized, and it is dispersed more preferably in the form of fine particles having an average particle diameter of 150 nm or less.

The average particle diameter described above is a volume average particle diameter, and it is determined by obtaining a circle-reducing average particle diameter from an average value of projected areas (those of at least 100 particles) of transmission electron micrographs (TEM) and reducing the circle-reducing average particle diameter thus obtained to a diameter of the sphere thereof. The volume average particle diameter and the standard deviation thereof are determined, and the variation coefficient can be determined by dividing the standard deviation by the volume average particle diameter. Or, the volume average particle diameter and the standard deviation thereof can be determined as well by making use of a dynamic light scattering method. They can be determined by means of, for example, a laser particle diameter analytical system manufactured by Otsuka Electronics Co., Ltd. and Zetasizer manufactured by Malvern Instruments Ltd.

Also, after the colorant is dissolved in an organic solvent in which it is soluble, it is dispersed preferably in an aqueous solvent together with an oil-soluble polymer in the form of a colored fine particle dispersion.

The specific preparing methods of the above aqueous solvent used for an ink can be referred to various methods described in, for example, JP-A 1993-148436, JP-A 1993-295312, JP-A 1995-97541, JP-A 1995-82515, JP-A 1995-118584 and the like.

Next, the oil-soluble polymer shall be explained. The oil-soluble polymer described above shall not specifically be restricted and can suitably be selected according to the purposes, and it includes suitably vinyl polymers. The vinyl polymers include conventionally known polymers and may be any one of water-insoluble polymers, water-dispersible polymers (self-emulsified polymers) and water-soluble polymers, and the water-dispersible polymers are preferred in terms of easiness of producing the color particles and a dispersion stability thereof.

The water-dispersible vinyl polymers described above may be any one of ionic dissociation type polymers, nonionic dispersible group-containing type polymers or mixtures thereof.

The ionic dissociation type vinyl polymers described above include vinyl polymers having a cationic dissociative group such as a tertiary amino group and the like and vinyl polymers having an anionic dissociative group such as carboxylic acid, sulfonic acid and the like. The nonionic dispersible group-containing type vinyl polymers described above include vinyl polymers containing a nonionic dispersible group such as a polyethyleneoxy chain and the like. Among them, preferred are the ionic dissociation type vinyl polymers having an anionic dissociative group, the nonionic dispersible group-containing type vinyl polymers and the mixed type vinyl polymers.

The monomers constituting the vinyl polymers described above include, for example, the following monomers. That is, they include acrylic esters, to be specific, methyl acrylate, ethyl acrylate, n-propyl acrylate, isopropyl acryalte, n-butyl acryalte, isobutyl acrylate, sec-butyl acrylate, t-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, 2-(2-butoxyethoxy)ethyl acrylate, glycidyl acrylate, 1-buromo-2-methoxyethyl acrylate, 1,1-dichloro-2-ethoxyethyl acrylate, 2,2,2-tetrafluoroethyl acrylate, 1H,1H,2H,2H-perfluorodecyl acrylate and the like.

They include methacrylic esters, to be specific, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, 2-(3-phenylpropyloxy)ethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-iso-propoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, 2-acetoxyethyl methacrylate, 2-acetoacetoxyethyl methacrylate, allyl methacrylate, glycidyl methacrylate, 2,2,2-tetrafluoroethyl methacrylate, 1H,1H,2H,2H-perfluorodecyl methacrylate and the like.

They include vinyl esters, to be specific, vinyl acetate, vinyl propionate, vinyl butyrate, vinyl isobutyrate, vinyl caproate, vinyl chloroacetate, vinyl methoxyacetate, vinyl phenylacetate, vinyl benzoate, vinyl salicylate and the like.

They include acrylamides, to be specific, acrylamide, methylacrylamide, ethylacrylamide, propylacrylamide, butylacrylamide, t-butylacrylamide, t-octylacrylamide, cyclohexylacrylamide, benzylacrylamide, hydroxymethylacrylamide, methoxymethylacrylamide, butoxymethylacrylamide, methoxyethylacrylamide, phenylacrylamide, dimethylacrylamide, diethylacrylamide, β-cyanoethylacrylamide, N-(2-acetoacetoxyethyl)acrylamide, diacetoneacrylamide and the like.

They include methacrylamides, to be specific, methacrylamide, methylmethacrylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacrylamide, phenylmethacrylamide, dimethylmethacrylamide, β-cyanoethylmethacrylamide, N-(2-acetoacetoxyethyl)methacrylamide and the like.

They include olefins, to be specific, cyclopentadiene, ethylene, propylene, 1-butene, 1-pentene, vinyl chloride, vinylidene chloride, isoprene, chloroprene, butadiene, 2,3-dimethylbutadiene and the like, styrenes, for example, styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, methyl vinylacetate and the like.

They include vinyl ethers, to be specific, methyl vinyl ether, butyl vinyl ether, hexyl vinyl ether, methoxyethyl vinyl ether and the like.

Other monomers include butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinylidene chloride, methylenemalononitrile, vinylidene, diphenyl-2-aryloyloxyethyl phosphate, diphenyl-2-methacryloyloxyethyl phosphate, dibutyl-2-acryloyloxyethyl phosphate, dioctyl-2-methacryloyloxyethyl phosphate and the like.

The monomers having a dissociative group include monomers having an anionic dissociative group and monomers having a cationic dissociative group.

The monomers having an anionic dissociative group described above include, for example, carboxylic acid monomers, sulfonic acid monomers, phosphoric acid monomers and the like.

The carboxylic acid monomers described above include, for example, acrylic acid, methacrylic acid, itaconic acid, maleic acid, fumaric acid, citraconic acid, crotonic acid, itaconic acid monoalkyl esters (for example, monomethyl itaconate, monoethyl itaconate, monobutyl itaconate and the like), maleic acid monoalkyl esters (for example, monomethyl maleate, monoethyl maleate, monobutyl maleate and the like) and the like.

The sulfonic acid monomers described above include, for example, styrenesulfonic acid, vinylsulfonic acid, acryloyoxyalkylsulfonic acids (for example, acryloyoxymethylsulfonic acid, acryloyoxyethylsulfonic acid, acryloyoxypropylsulfonic acid and the like), methacryloyoxyalkylsulfonic acids (for example, methacryloyoxymethylsulfonic acid, methacryloyoxyethylsulfonic acid, methacryloyoxypropylsulfonic acid and the like), acrylamidealkylsulfonic acids (for example, 2-acrylamide-2-methylethanesulfonic acid, 2-acrylamide-2-methylpropanesulfonic acid, 2-acrylamide-2-methylbutanesulfonic acid and the like), methacrylamidealkylsulfonic acids (for example, 2-methacrylamide-2-methylethanesulfonic acid, 2-methyacrylamide-2-methylpropanesulfonic acid, 2-methacrylamide-2-methylbutanesulfonic acid and the like) and the like.

The phosphoric acid monomers described above include, for example, vinylphosphonic acid, methacryloyoxyethylphosphonic acid and the like.

Among them, acrylic acid, methacrylic acid, styrenesulfonic acid, vinylsulfonic acid, acrylamidealkylsulfonic acids and, methacrylamidealkylsulfonic acids are preferred, and acrylic acid, methacrylic acid, styrenesulfonic acid, 2-acrylamide-2-methylpropanesulfonic acid and 2-crylamide-2-methylbutanesulfonic acid are more preferred.

The monomers having a cationic dissociative group described above include, for example, monomers having a tertiary amino group, such as dialkylaminoethyl methacrylate, dialkylaminoethyl acrylate and the like.

The monomers having a nonionic dissociative group described above include, for example, esters of polyethylene glycol monoalkyl ethers with carboxylic acid monomers, esters of polyethylene glycol monoalkyl ethers with sulfonic acid monomers, esters of polyethylene glycol monoalkyl ethers with phosphoric acid monomers, vinyl group-containing urethanes which are formed from polyethylene glycol monoalkyl ethers and isocyanate group-containing monomers, macromonomers having a polyvinyl alcohol structure, and the like.

The repeating number of an ethyleneoxy part in the polyethylene glycol monoalkyl ethers described above is preferably 8 to 50, more preferably 10 to 30. The alkyl group of the polyethylene glycol monoalkyl ethers described above has preferably 1 to 20 carbon atoms, more preferably 1 to 12 carbon atoms.

The above monomers may be used alone to form vinyl polymers or may be used in combination of two or more kinds thereof to form vinyl copolymers, and they can suitable be selected according to the purposes (Tg controlling, solubility improvement, dispersion stability and the like) of the vinyl polymers described above.

An organic solvent is used for the oil base solvent in the present invention.

The examples of the oil base solvent include alcohols (for example, pentanol, heptanol, octanol, phenylethyl alcohol, phenylpropyl alcohol, furfuryl alcohol, anise alcohol and the like) esters (for example, ethylene glycol diacetate, ethylene glycol monomethyl ether acetate, diethylene glycol monomethyl ether acetate, propylene glycol diacetate, ethyl acetate, amyl acetate, benzyl acetate, phenylethyl acetate, phenoxyethyl acetate, ethyl phenylacetate, benzyl propionate, ethyl benzoate, butyl benzoate, butyl laurate, isopropyl myristate, triethyl phosphate, tributyl phosphate, diethyl phthalate, dibutyl phthalate, diethyl malonate, dipropyl malonate, diethyl diethylmalonate, diethyl succinate, dibutyl succinate, diethyl glutarate, diethyl adipate, dipropyl adipate, dibutyl adipate, di(2-methoxyethyl) adipate, diethyl sebacate, diethyl maleate, dibutyl maleate, dioctyl maleate, diethyl fumarate, dioctyl fumarate, 3-hexenyl cinnamate and the like), ethers (for example, butyl phenyl ether, benzyl ethyl ether, hexyl ether and the like), ketones (for example, benzyl methyl ketone, benzylacetone, diacetone alcohol, cyclohexanone and the like), hydrocarbons (for example, petroleum ethers, petroleum benzyl, tetralin, decalin, tertiary-amylbenzene, dimethylnaphthaline and the like) and amides (for example, N,N-diethyldodecaneamide and the like).

The oil base solvents described above can be used by dissolving the colorant of the present invention as it is, and they can be used by dispersing or dissolving it using a resinous dispersant and a binder in combination.

The specific preparing methods for the above oil base solvents can be referred to methods described in JP-A 1991-231975 and JP-A (through PCT) 1993-508883.

Phase change solvents which are solid at room temperature and which are molten in heating and injecting the ink to assume a liquid form are used for the solid (phase change) solvent used in the present invention.

The above phase change solvents include natural waxes (for example, beewax, carnauba wax, rice wax, Japan wax, jiojoba oil, sperm whale, candelilla wax, lanolin, montan wax, ozokerite, ceresine, paraffin wax, microcrystalline was, petrolatum and the like), polyethylene wax derivatives, chlorinated hydrocarbons, organic acids (for example, palmitic acid, stearic acid, behenic acid, tiglic acid, 2-acetonaphthonebehenic acid, 12-hydroxystearic acid, dihydroxystearic acid and the like), organic acid esters (for example, esters of the organic acids described above with alcohols such as glycerin, diethylene glycol, ethylene glycol acid and the like), alcohols (for example, dodecanol, tetradecanol, hexadecanol, eicosanol, docosanol, tetracosanol, hexacosanol, octacosanol, dodecenol, myricyl alcohol, tetracenol, hexadecenol, eicosenol, docosenol, pinene glycol, hinokiol, butynediol, nonanediol, isophthalyl alcohol, mesicerine, terephthalyl alcohol, hexanediol, decanediol, dodecanediol, tetradecanediol, hexadecanediol, docosanediol, tetracosanediol, terpineol, phehylglycerin, eicosanediol, octanediol, phenyl propylene glycol, bisphenol A, para-alpha-cumylphenol and the like), ketones (for example, benzoyl acetone, diacetonebenzene, benzophenone, tricosanone, heptacosanone, heptatriacontanone, hentriacontanone, heptatriacontanone, stearone, laurone, dianisole and the like), amides (for example, oleamide, laurylamide, stearamide, ricinolamide, palmitamide, tetrahydrofuramide, erucamide, myristamide, 12-hydroxystearamide, N-stearylerucamide, N-oleylstearamide, N,N'-ethylenebislauramide, N,N'-ethylenebisstearamide, N,N'-ethylenebisoleamide, N,N'-methylenebisstearamide, N,N'-ethylenebisbehenamide, N,N'-xylylenebisstearamide, N,N'-butylenebisstearamide, N,N'-dioleyladipamide, N,N'-distearyladipamide, N,N'-dioleylsebacamide, N,N'-distearylsebacamide, N,N'-distearylterephthalamide, N,N'-distearylisophthalamide, phenacetin, toluamide, acetamide, reaction products tetramide of dimeric acid, diamine and fatty acid, such as oleic acid dimer/ethylenediamine/stearic acid (mole ratio of 1:2:2) and the like), sulfoneamides (for example, paratoluenesulfoneamide, ethylbenzenesulfoneamide, butlbenzenesulfoneamide and the like), silicones (for example, Silicone SH6018 (Dow Corning Toray Co., Ltd.), Silicone KR215, 216 and 220 (Shin-Etsu Silicone Co., Ltd.) and the like), coumarones (for example, ESCURON G-90 (Nippon Steel & Sumikin Chemical Co., Ltd.) and the like), cholesterol fatty acid esters (for example, cholesterol stearate, cholesterol palmitate, cholesterol myristate, cholesterol behenate, cholesterol laurate, cholesterol melissinate and the like), sugar fatty acid esters (saccharose stearate, saccharose palmitate, saccharose behenate, saccharose laurate, saccharose melissinate, lactose stearate, lactose palmitate, lactose myristate, lactose behenate, lactose laurate, lactose melissinate and the like).

A phase change temperature in solid-liquid phase change of the solid (phase change) solvent is preferably 60 to 200° C., more preferably 80 to 150° C.

The solid (phase change) solvent described above can be used by dissolving the colorant of the present invention as it is in the solvent staying in a molten state by heating, and it can be used by dispersing or dissolving the colorant using a resinous dispersant and a binder in combination.

The specific preparing methods for the above phase change solvent can be referred to methods described in JP-A 1993-186723 and JP-A 1995-70490.

In the ink of the present invention prepared by dispersing or dissolving the colorant of the present invention using the aqueous, oil base and solid (phase change) solvents each described above, a viscosity thereof in flying is preferably $4\times10^{-2}$ Pa·c or less, more preferably $3\times10^{-2}$ Pa·c or less.

A surface tension of the ink of the present invention in flying is preferably $2\times10^{-4}$ to $10^{-3}$ N/cm, more preferably $3\times10^{-4}$ to $8\times10^{-4}$ N/cm.

The colorant of the present invention is used in a range of preferably 0.1 to 25% by mass, more preferably 0.5 to 10% by mass based on the ink.

The resinous dispersant used in the present invention is preferably polymer compounds having a molecular weight of 1,000 to 1,000,000, and when they are used, they are contained in the ink preferably in a proportion of 0.1 to 50% by mass.

The ink of the present invention can be blended as well with a viscosity-controlling agent, a surface tension-controlling agent, resistivity-controlling agent, a film-forming agent, a dispersant, a surfactant, a UV absorber, an antioxidant, a fading inhibitor, an anti-mold agent, a rust preventive and the like according to the purpose of enhancing a discharge stability, a compatibility with the print head and the ink cartridge, a storage stability, an image-preserving property and other various performances.

A recording method in which the ink of the present is used shall not specifically be restricted, and it can be used as an ink particularly for an ink jet printer of an on-demand system. The specific examples of the on-demand system include an electric-mechanical conversion system (for example, a single cavity type, a double cavity type, a bender type, a piston type, a shear mode type, a sheared wall type and the like), an electric-thermal conversion system (for example, a thermal ink jet type, a bubble jet (registered trademark) and the like), an electrostatically-abstracting system (for example, an electrostatically-controlling system, a slit jet type and the like), a discharge system (for example, a spark jet type and the like) and the like.

<<Color Filter>>

Next, the color filter of the present invention shall be explained.

The color filter of the present invention contains the foregoing colorant composition of the present invention.

In using the colorant composition of the present invention for color filter application, various dispersing means such as a two roll mill, a three roll mill, a sand mill, a kneader and the like can be used when the colorant composition of the present invention is dispersed in the transparent resin.

In the present invention, vanishes used for conventionally known color compositions for color filters are used as the resin vanish. Also, a solvent or an aqueous medium which is suited to the resin vanish is used as the dispersing medium. Further, conventionally known additives, for example, a dispersion aid, a smoothing agent, an adhesion agent and the like are added, if necessary, and used.

A photosensitive resin vanish and a non-photosensitive resin vanish are used as the resin vanish. The photosensitive resin vanish includes, for example, photosensitive resin vanishes used for UV-curing inks, electron beam-curling inks and the like, and any of vanishes used for printing inks such as typographic inks, lithographic inks, intaglio gravure inks, stencil screen inks and the like, vanishes used for electrodeposition, vanishes used for developers of electronic printing and electrostatic printing, vanishes used for thermal transfer ribbons can be used as the non-photosensitive resin vanish.

The examples of the photosensitive resin vanish include vanishes of photosensitive cyclized rubber base resins, photosensitive phenol base resins, photosensitive polymethacrylate base resins, photosensitive polyacrylamide base resins, photosensitive polyimide base resins and the like, and unsaturated polyester base resins, polyester acrylate base resins, polyepoxy acrylate base resins, polyurethane acrylate base resins, polyether acrylate base resins, polyol acrylate base resins and the like, and they further include vanishes to which monomers are added as reactive diluents.

A photopolymerization initiator such as benzoin ether, benzophenone and the like is added to the colorant composition of the present invention and the vanish described above, and the mixture is blended by a conventionally known method, whereby a photosensitive color composition can be prepared. Also, a thermally polymerizable color composition can be prepared by using a thermal polymerization initiator in place of the photopolymerization initiator.

When the photosensitive color composition described above is used to form a pattern of the color filter, the above photosensitive color composition is coated on a whole surface of a transparent substrate by means of a spin coater, a low speed rotary coater, a roll coater, a knife coater and the like or printed on a whole surface thereof or a little larger part than the pattern by various printing methods such as an ink jet method and the like. After preliminarily drying the substrate, a photomask is closely adhered to it and exposed by using an ultrahigh pressure mercury lamp to print the pattern. Then, developing and rinsing are carried out, and post-baking is carried out if necessary, whereby the pattern of the color filter can be formed.

The examples of the vanish of the non-photosensitive resin include cellulose-acetate base resins, nitrocellulose base resins, styrene base (co)polymers, polyvinylbutyral base resins, aminoalkyd base resins, polyester base resins, amino resin-modified polyester base resins, polyurethane base resins, acryl polyol urethane base resins, soluble polyamide base resins, soluble polyimide base resins, soluble polyamideimide base resins, soluble polyesterimide base resins, casein, hydroxyethyl cellulose, water-soluble salts of styrene-maleic ester base copolymers, water-soluble salts of (meth)acrylic ester base (co)polymers, water-soluble aminoalkyd base resins, water-soluble aminopolyester base resins, water-soluble polyamide base resins and the like, and they are used alone or in combination.

When the non-photosensitive color composition described above is used to form a pattern of the color filter, a method for forming the pattern includes a method in which the above non-photosensitive color composition, for example, a printing ink for a color filter is used to print a color pattern directly on a transparent substrate by the various printing methods described above, a method in which an aqueous electrodeposition composition for a color filter is used to print a color pattern on a substrate by electrodeposition, a method in which a color pattern is printed by using an electronic printing method and an electrostatic printing method, a method in which a color pattern is formed once on a transferring substrate by the methods described above and in which it is then transferred on a substrate for a color filter and a method in which a color pattern is printed by an ink jet method.

The substrate is subjected, if necessary, to baking, polishing for smoothing a surface thereof and top coating for protecting the surface according to ordinary methods. Also, a method in which a black matrix is formed according to an ordinary method to obtain RGB primary color base or YMC complementary color base color filter can be used.

EXAMPLES

The present invention is explained below by reference to examples, but the present invention shall not be restricted by them.

Example 1

<<Production of Colorant>>
(1) Synthesis of (1A) to 1D)

Synthetic Example 1A

Added to 1750 ml of quinoline were 152.3 g of 1,3-diiminoisoindoline, 7.0 g of cupric chloride (anhydride) and 231.6 g of silicon tetrachloride, and they were reacted at 210 to 220° C. for 1 hour under nitrogen atmosphere. The product was separated by hot filtration at 180° C. and washed in order of quinoline and acetone. Then, after the product was refluxed in 1000 ml of acetone by heating, the crystal was separated by filtration and dried to obtain 140.3 g of a colorant (1A) containing a compound (1-1) and a compound (3-1).

Synthetic Example 1B

The same operation as in Synthetic Example 1A was carried out to obtain 140.5 g of a colorant (1B) containing the compound (1-1) and the compound (3-1), except that an amount of 1,3-diiminoisoindoline was changed to 137.1 g and that 7.0 g of cupric chloride was replaced by 14.0 g of copper phthalocyanine (3-1).

Synthetic Example 1C

Phthalodinitrile 192 g, cuprous chloride 14.9 g and a 28% sodium methoxide-methanol solution 57.9 g were added to a mixed solvent of tetralin 1050 mL and tri-n-butylamine 450 mL, and the mixture was stirred at room temperature for 1 hour under nitrogen atmosphere. Then, 230 g of silicon tetrachloride was dropwise added thereto to react them at 190 to 200° C. for 2 hours. The reaction mixture was filtrated at 120° C., and the product obtained was washed in order with toluene and then acetone. The product was added to 900 mL of acetone, and the mixture was refluxed by heating. Then, the product was separated by filtration and dried to obtain 165.3 g of a colorant (1C) containing the compound (1-1) and the compound (3-1).

Synthetic Example 1D

The same operation as in Synthetic Example 1C was carried out to obtain 166.0 g of a colorant (1D) containing the compound (1-1) and the compound (3-1), except that an amount of phthalodinitrile was changed to 172.8 g and that 14.9 g of cuprous chloride was changed to 16.5 g of copper phthalocyanine (3-1).
(2) Synthesis of Colorants (2A) to (2F)

Synthetic Example 2A

The colorant (1A) 140.0 g obtained in Synthetic Example 1A was added to a mixed solution of 35.0 g of NaOH, 3100 ml of water and 830 ml of pyridine, and they were reacted for 1 hour by heating and refluxing. The product was separated by hot filtration and washed in order of pyridine, acetone and water. Then, after the product was stirred repeatedly several times in 1300 ml of water at room temperature, water was confirmed to be neutralized, and the crystal was separated by filtration and dried to obtain 105.3 g of a colorant (2A) containing a compound (1-2) and the compound (3-1).

Synthetic Examples 2B to 2D

The same operation as in Synthetic Example 2A was carried out to obtain colorants (2B) to (2D) containing the compound (1-2) and the compound (3-1), except that the colorant (1A) in Synthetic Example 2A was changed to the colorants (1B) to (1D).

Synthetic Example 2E 1,8-Diazabicyclo[5,4,0]-7-undecene (DBU) 566 g and cupric chloride 8.3 g were added to 1800 g of anhydrous sulfolane, and the mixture was stirred. 1,3-Diiminoisoindoline 180 g was gradually added thereto. Silicon tetrachloride 284.4 g was dropwise added to the above solution through a dropping funnel while taking care of heat generation. After finishing dropwise adding, the temperature was elevated to carry out the reaction at 150° C. for 8 hours. The solution was left cooling while stirring, and when it reached 30° C., it was poured slowly into 36 kg of ice and water under stirring to obtain a greenish brown slurry. This slurry was stirred for 1 hour and then heated, and it was subjected to heating treatment at 80° C. for 2 hours. The solution was filtrated while hot, and then the filtrated matter was washed by hot water of 60° C. and dried to obtain 147.7 g of a colorant (2E) containing the compound (1-2) and the compound (3-1).

Synthetic Example 2F

The same operation as in Synthetic Example 2E was carried out to obtain 147.5 g of a colorant (2F) containing the compound (1-2) and the compound (3-1), except that in Synthetic Example 2E, an amount of DBU was changed to 509.4 g and that 8.3 g of cupric chloride was replaced by 14.7 g of copper phthalocyanine.
(3) Synthesis of (3A) to (3F)

Hereafter, [A] given to the colorant names and the synthetic example numbers shall be given to colorant names and synthetic example numbers in which the colorant (2A) is used as the raw material and into which the substituent Z is introduced. Similarly, [B] to [F] shall be given as well to colorant names and synthetic example numbers corresponding to the colorant numbers of the raw materials.

Synthetic Example 3A

The colorant (2A) 100.0 g synthesized in Synthetic Example 2A and tri-n-butylamine 124.3 ml were added to 3000 ml of quinoline, and 87.7 g of triethylsilyl chloride was further added thereto under nitrogen atmosphere to react them at 140 to 150° C. for 6 hours. The product was cooled down to room temperature and then added to a mixed solution of 6000 ml of methanol and 600 ml of water. The deposited crystal was separated by filtering and suspended and heated in 2500 ml of toluene, and then the crystal was cooled, separated by filtering and dried to obtain 74.8 g of a colorant (3A) containing a compound (1-4) and the compound (3-1).

Synthetic Examples 3B to 3F

The same operation as in Synthetic Example 3A was carried out to obtain colorants (3B) to (3F) containing the compound (1-4) and the compound (3-1), except that in Synthetic Example 3A, the colorant (2A) was replaced by colorants (2B) to (2F).

Synthetic Examples 4 to 7

Synthesis of Colorants (4A) to (7A)

The same operation as in Synthetic Example 3A was carried out to obtain colorants (4A) to (7A), except that in Synthetic Example 3A, triethylsilyl chloride was changed to reagents (added in equimolar amounts) described in Table 6.

Synthetic Examples 8 to 10

Synthesis of Colorants (4B) to (7B)

The same operation as in Synthetic Example 3B was carried out to obtain colorants (4B) to (7B), except that in Synthetic Example 3B, triethylsily chloride was changed to reagents (added in equimolar amounts) described in Table 6.

Synthetic Examples 11 and 12

Synthesis of Colorants (4C) and (5C)

The same operation as in Synthetic Example 3C was carried out to obtain colorants (4C) and (5C), except that in Synthetic Example 3C, triethylsilyl chloride was changed to reagents (added in equimolar amounts) described in Table 6.

Synthetic Examples 13 and 14

Synthesis of Colorants (4D) and (5D)

The same operation as in Synthetic Example 3D was carried out to obtain colorants (4D) and (5D), except that in Synthetic Example 3D, triethylsilyl chloride was changed to reagents (added in equimolar amounts) described in Table 6.

Synthetic Example 15

Synthesis of Colorant (8B)

The same operation as in Synthetic Example 1B was carried out to obtain a colorant (8B), except that in Synthetic Example 1B, the copper phthalocyanine compound (3-1) was replaced by a compound (3-4).

Synthetic Example 16

Synthesis of Colorant (9B)

The same operation as in Synthetic Example 2B was carried out to obtain a colorant (9B), except that in Synthetic Example 2B, the colorant (1B) was replaced by the colorant (8B).

Synthetic Example 17

Synthesis of Colorant (10B)

The same operation as in Synthetic Example 3B was carried out to obtain a colorant (10B), except that in Synthetic Examples 3B, the colorant (2B) was replaced by the colorant (9B).

Synthetic Example 18

Synthesis of Colorant (11A)

The same operation as in Synthetic Example 1A was carried out to obtain 171.4 g of a colorant (11A) containing a compound (1-14) and the compound (3-4), except that in Synthetic Example 1A, 1,3-diiminoisoindoline was changed to 188.6 g of 1,3-diimino-5-chloroisoindoline.

Synthetic Example 19

Synthesis of Colorant (11B)

The same operation as in Synthetic Example 1B was carried out to obtain 171.4 g of a colorant (11B) containing the compound (1-14) and the compound (3-4), except that in Synthetic Example 1B, 1,3-diiminoisoindoline was changed to 188.6 g of 1,3-diimino-5-chloroisoindoline and that the copper phthalocyanine compound (3-1) was replaced by the compound (3-4).

Synthetic Example 20

Synthesis of Colorant (12A)

The same operation as in Synthetic Example 2A was carried out to obtain 134.2 g of a colorant (12A) containing a compound (1-15) and the compound (3-4), except that in Synthetic Example 2A, the colorant (1A) was replaced by the colorant (11A).

Synthetic Example 21

Synthesis of Colorant (12B)

The same operation as in Synthetic Example 2B was carried out to obtain 134.7 g of a colorant (12B) containing the compound (1-15) and the compound (3-4), except that in Synthetic Example 2B, the colorant (1B) was replaced by the colorant (11B).

Synthetic Example 22

Synthesis of Colorant (13A)

The same operation as in Synthetic Example 2A was carried out to obtain 76.0 g of a colorant (13A) containing a compound (1-18) and the compound (3-4), except that in Synthetic Example 3A, the colorant (2A) was replaced by the colorant (12A).

Synthetic Example 23

Synthesis of Colorant (13B)

The same operation as in Synthetic Example 2B was carried out to obtain 76.2 g of a colorant (13B) containing the compound (1-18) and the compound (3-4), except that in Synthetic Example 3B, the colorant (2B) was replaced by the colorant (12B).

Synthetic Example 24

Synthesis of Colorant (14B)

The same operation as in Synthetic Example 1B was carried out to obtain 171.5 g of a colorant (14B) containing the compound (1-14) and the compound (3-1), except that in Synthetic Example 1B, 1,3-diiminoisoindoline was changed to 188.6 g of 1,3-diimino-5-chloroisoindoline.

Synthetic Example 25

Synthesis of Colorant (15B)

The same operation as in Synthetic Example 2B was carried out to obtain 134.7 g of a colorant (15B) containing the compound (1-15) and the compound (3-1), except that in Synthetic Example 2B, the colorant (1B) was replaced by the colorant (14B).

Synthetic Example 26

Synthesis of Colorant (16B)

The same operation as in Synthetic Example 2B was carried out to obtain 76.4 g of a colorant (16B) containing the compound (1-18) and the compound (3-1), except that in Synthetic Example 3B, the colorant (2B) was replaced by the colorant (15B).

Synthetic Example 27

Synthesis of Colorant (17A)

The same operation as in Synthetic Example 1A was carried out to obtain a colorant (17A) containing a compound (1-29) and a compound (3-10), except that in Synthetic Example 1A, 1,3-diiminoisoindoline was replaced by 1,3-diiminopyrrolino[3,4-c]pyridine (added in an equimolar amount).

Synthetic Example 28

Synthesis of Colorant (17B)

The same operations as in Synthetic Examples 1A and 1B were carried out to obtain a colorant (17B) containing the compound (1-29) and the compound (3-10), except that in Synthetic Example 1B, 1,3-diiminoisoindoline was replaced by 1,3-diiminopyrrolino[3,4-c]pyridine (added in an equimolar amount) and that copper phthalocyanine was changed from the compound (3-1) to the compound (3-10).

Synthetic Examples 29 and 30

Synthesis of Colorants (18A) and (18B)

The same operations as in Synthetic Examples 2A and 2B were carried out to obtain colorants (18A) and (18B) containing a compound (1-30) and the compound (3-10), except that in Synthetic Examples 2A and 2B, the colorants (1A) and (1B) were replaced by the colorants (17A) and (17B).

Synthetic Examples 31 and 32

Synthesis of Colorants (19A) and (19B)

The same operations as in Synthetic Examples 3A and 3B were carried out to obtain colorants (19A) and (19B) containing a compound (1-32) and the compound (3-10), except that in Synthetic Examples 3A and 3B, the colorants (2A) and (2B) were replaced by the colorants (18A) and (18B).

Synthetic Examples 33 and 34

Synthesis of Colorants (20A) and (20B)

The same operations as in Synthetic Examples 31 and 32 were carried out to obtain colorants (20A) and (20B) containing a compound (1-31) and the compound (3-10), except that in Synthetic Examples 31 and 32, 87.7 g of triethylsilyl chloride was changed to 63.2 g of trimethylsilyl chloride.

Synthetic Example 35

Synthesis of Colorant (21B)

The same operation as in Synthetic Example 28 was carried out to obtain 171.5 g of a colorant (21B) containing a compound (1-29) and the compound (3-1), except that in Synthetic Example 28, copper phthalocyanine was changed from the compound (3-10) to the compound (3-1).

Synthetic Example 36

Synthesis of Colorant (22B)

The same operation as in Synthetic Example 2B was carried out to obtain 134.7 g of a colorant (22B) containing the compound (1-30) and the compound (3-1), except that in Synthetic Example 2B, the colorant (1B) was replaced by the colorant (21B).

Synthetic Example 37

Synthesis of Colorant (23B)

The same operation as in Synthetic Example 3B was carried out to obtain 76.4 g of a colorant (23B) containing the compound (1-32) and the compound (3-1), except that in Synthetic Example 3B, the colorant (2B) was replaced by the colorant (22B).

Synthetic Example 38

Synthesis of Colorant (24B)

The same operation as in Synthetic Example 28 was carried out to obtain an intermediate in which the substituent Z was Cl, except that in Synthetic Example 28, 14.0 g of the copper phthalocyanine compound (3-10) was replaced by 7.0 g of the copper phthalocyanine compound (3-1) and 7.0 g of a compound (3-5). Further, the same operation as in Synthetic Example 2B was carried out to obtain a colorant (24B), except that in Synthetic Example 2B, the colorant (1B) was changed to the above intermediate.

Synthetic Examples 39 to 42

Synthesis of Colorants (25B) to (28B)

The same operation as in Synthetic Example 38 was carried out to obtain colorants (25B) to (28B), except that in Synthetic Example 38, the copper phthalocyanine compound (3-5) was changed to compounds shown in copper phthalocyanine compound-2 described in Table 7.

Synthetic Example 43

Synthesis of Colorant (29B)

The same operation as in Synthetic Example 1B was carried out to obtain an intermediate in which the substituent Z was Cl, except that in Synthetic Example 1B, 1,3-diiminoisoindoline was replaced by an equimolar amount of 1,3-diimino-5-chloroisoindoline and that a half amount of 14.0 g of the copper phthalocyanine compound (3-1) was replaced by the compound (3-4). Next, the same operation as in Synthetic Example 2B was carried out to obtain a colorant (29B), except that in Synthetic Example 2B, the colorant (1B) was changed to the above intermediate.

Synthetic Examples 44 and 45

Synthesis of Colorant (30A) and (39A)

The same operation as in Synthetic Example 1A was carried out to obtain an intermediate in which the substituent Z was Cl, except that 1,3-diiminoisoindoline in Synthetic Example 1A was replaced by an equimolar amount of 5,7-diiminopyrrolino[3,4-c]pyridine or an equimolar amount of 5,7-diiminopyrrolino[3,4-b]pyrimidine. Further, the same operation as in Synthetic Example 2A was carried out to obtain colorants (30A) and (39A), except that in Synthetic Example 2A, the colorant (1A) was replaced by the above intermediate.

Synthetic Examples 46 to 49

Synthesis of Colorants (30B), (39B), (40B) and (45B)

The same operation as in Synthetic Example 1B was carried out to obtain an intermediate in which the substituent Z was Cl, except that in Synthetic Example 1B, 1,3-diiminoisoindoline was changed to the corresponding diimino compounds (equimolar amount: refer to following ·X·1). Next, the same operation as in Synthetic Example 2B was carried out to obtain colorants (30B), (39B), (40B) and (45B), except that in Synthetic Example 2B, the colorant (1B) was changed to the above intermediate.

Synthetic Examples 50 to 54

Synthesis of Colorants (31A), (32A), (36A), (44A) and (47A)

The same operation as in Synthetic Example 1A was carried out to obtain an intermediate in which the substituent Z was Cl, except that in Synthetic Example 1A, 1,3-diiminoisoindoline was changed to an equimolar amount of the corresponding diimino compounds (refer to following ·X·1). Next, the same operation as in Synthetic Example 2A was carried out to obtain an intermediate in which the substituent Z was OH, except that in Synthetic Examples 2A, the colorant (1A) was replaced by the above intermediate. Further, the same operation as in Synthetic Example 3A was carried out to obtain colorants (31A), (32A), (36A), (44A) and (47A), except that in Synthetic Example 3A, the colorant (2A) was replaced by the intermediate in which the substituent Z was OH and that triethylsilyl chloride was replaced by reagents (equimolar amounts) described in Tables 7 and 8 into which the substituent Z was introduced.

Synthetic Examples 55 to 69

Synthesis of Colorants (31B) to (38B), (41B) to (44B) and (46B) to (48B)

The same operation as in Synthetic Example 1B was carried out to obtain an intermediate in which the substituent Z was Cl, except that in Synthetic Example 1B, 1,3-diiminoisoindoline was changed to an equimolar amount of the corresponding diimino compounds (refer to following ·X·1). Next the same operation as in Synthetic Example 2B was carried out to obtain an intermediate in which the substituent Z was OH, except that in Synthetic Example 2B, the colorant (1B) was changed to the above intermediate. Further, the same operation as in Synthetic Example 3B was carried out to obtain colorants (31B) to (38B), (41B) to (44B) and (46B) to (48B), except that in Synthetic Example 3B, triethylsilyl chloride was replaced by reagents (equimolar amounts) described in Tables 7 and 8, into which the substituent Z was introduced.

Synthetic Example 70

Synthesis of Colorant (49A)

The same operation as in Synthetic Example 1A was carried out to obtain an intermediate in which the substituent Z was Cl, except that in Synthetic Example 1A, an amount of cupric chloride was changed to 3.5 g and that an amount of silicon tetrachloride was changed to 244.5 g. Next, the same operation as in Synthetic Example 1A was carried out to obtain an intermediate in which the substituent Z is OH, except that in Synthetic Example 1A, the colorant (1A) was replaced by the above intermediate. Further, the same operation as in Synthetic Example 3A was carried out to obtain a colorant (49A), except that in Synthetic Example 3A, triethylsilyl chloride was changed to 66.7 g of trimethylsilyl chloride.

Synthetic Examples 71 to 74

Synthesis of Colorants (52A) to (55A)

The same operation as in Synthetic Example 70 was carried out to obtain colorants (52A) to (55A), except that in Synthetic Example 70, 1,3-diiminoisoindoline was changed to an equimolar amount of the corresponding diimino compounds (refer to following ·X·1).

Synthetic Example 75

Synthesis of Colorant (49B)

The same operation as in Synthetic Example 1A was carried out to obtain an intermediate in which the substituent Z was Cl, except that in Synthetic Example 1B, an amount of 1,3-diiminoisoindoline was changed to 144.7 g and that cupric chloride was replaced by 7.0 g of copper phthalocyanine (3-1). Next, the same operation as in Synthetic Example 2B was carried out to obtain an intermediate in which the substituent Z was OH, except that in Synthetic Example 2B, the colorant (1B) was replaced by the above intermediate. Further, the same operation as in Synthetic Example 3B was carried out to obtain a colorant (49B), except that in Synthetic Examples 3B, the colorant (2B) was replaced by the intermediate containing the compound (1-2) and the compound (3-1) and that triethylsily chloride was changed to 66.7 g of trimethylsilyl chloride.

Synthetic Examples 76 to 80

Synthesis of Colorants (50B) and (52B) to (55B)

The same operation as in Synthetic Example 75 was carried out to obtain colorants (50B) and (52B) to (55B), except that in Synthetic Example 75, copper phthalocyanine (3-1) was changed to compounds described in Table 8.

Synthetic Examples 81 and 82

Synthesis of Colorants (51B) and (56B)

The same operation as in Synthetic Example 75 was carried out to obtain colorants (51B) and (56B), except that in Synthetic Example 75, a half amount of copper phthalocyanine (3-1) was replaced by compounds described in the copper phthalocyanine compound-2.

Synthetic Example 83

Synthesis of Colorant (57A)

The same operation as in Synthetic Example 70 was carried out to obtain a colorant (57A), except that in Synthetic Example 70, changed were cupric chloride to 10.5 g, silicon tetrachloride to 218.7 g and trimethylsilyl chloride to 63.0 g.

Synthetic Example 84

Synthesis of Colorant (57B)

The same operation as in Synthetic Example 75 was carried out to obtain a colorant (57B), except that in Synthetic Example 75, changed were 1,3-diiminoisoindoline to 129.5 g, copper phthalocyanine (3-1) to 10.5 g and trimethylsilyl chloride to 63.0 g.

Synthetic Example 85

Synthesis of Colorant (58A)

The same operation as in Synthetic Example 83 was carried out to obtain a colorant (58A), except that in Synthetic Example 83, 1,3-diiminoisoindoline was replaced by 1,3-diiminopyrrolino[3,4-c]pyridine (equimolar amount).

Synthetic Example 86

Synthesis of Colorant (58B)

The same operation as in Synthetic Example 84 was carried out to obtain a colorant (58B), except that in Synthetic Example 84, 1,3-diiminoisoindoline was replaced by 1,3-diiminopyrrolino[3,4-c]pyridine (equimolar amount).

Synthetic Example 87

Synthesis of Colorant (59A)

The same operation as in Synthetic Example 83 was carried out to obtain a colorant (59A), except that in Synthetic Example 83, changed were cupric chloride to 14.0 g, silicon tetrachloride to 205.8 g and trimethylsilyl chloride to 59.3 g.

Synthetic Example 88

Synthesis of Colorant (59B)

The same operation as in Synthetic Example 84 was carried out to obtain a colorant (59B), except that in Synthetic Example 84, changed were 1,3-diiminoisoindoline to 121.7 g, copper phthalocyanine (3-1) to 14.0 g and trimethylsilyl chloride to 59.3 g.

Synthetic Example 89

Synthesis of Colorant (60A)

The same operation as in Synthetic Example 87 was carried out to obtain a colorant (60A), except that in Synthetic Example 87, 1,3-diiminoisoindoline was replaced by 1,3-diiminopyrrolino[3,4-c]pyridine (equimolar amount).

Synthetic Example 90

Synthesis of Colorant (60B)

The same operation as in Synthetic Example 88 was carried out to obtain a colorant (60B), except that in Synthetic Example 88, 1,3-diiminoisoindoline was replaced by 1,3-diiminopyrrolino[3,4-c]pyridine (equimolar amount).

※1 the following reagents were used for the diimino compounds which were the raw materials of the silicon phthalocyanine compounds according to the structures of $A^1$ to $A^4$.

| structures of $A^1$ to $A^4$ | corresponding diimino compounds |
| --- | --- |
| a-2 | 5,7-diiminopyrrolino[3,4-b]pyridine |
| a-3 | 1,3-diiminopyrrolino[3,4-c]pyridine |
| a-4 | 5,7-diiminopyrrolino[3,4-c]pyrazine |
| a-5 | 5,7-diiminopyrrolino[3.4-d]pyrimidine |
| a-6 | 5,7-diiminopyrrolino[3,4-c]pyridazine |
| a-7 | 5,7-diiminopyrrolino[3,4-d]pyridazine |

Reference Example Production Process for Silicon Phthalocyanine Colorant

Reference Example 1

Added to 1750 mol of quinoline were 152.3 g (1.05 mol) of 1,3-diiminoisoindoline and 257.3 g (1.51 mol) of silicon tetrachloride, and they were reacted at 210 to 220° C. for 1 hour under nitrogen atmosphere. The product was separated by hot filtration at 180° C. and washed in order of quinoline and acetone. Then, after the product was refluxed in 1000 ml of acetone by heating, the crystal was separated by filtration and dried to obtain 141.5 g of the compound (1-1) (yield: 88%).

Reference Example 2

Phthalodinitrile 192 g (1.5 mol) and a 28% sodium methoxide-methanol solution 57.9 (0.3 mol) were added to a mixed solvent of tetralin 1050 mL and tri-n-butylamine 450 mL, and the mixture was stirred at room temperature for 1 hour under nitrogen atmosphere. Then, 255 g (1.5 mol) of silicon tetrachloride was dropwise added thereto to react them at 190 to 200° C. for 2 hours. The reaction mixture was filtrated at 120° C., and the product obtained was washed in order with toluene and then acetone. The product was added to 900 mL of acetone and refluxed by heating, and then it was separated by filtration and dried to obtain 167.4 g of the compound (1-1) (yield: 73%).

Reference Example 3

The compound (1-1) 140.0 g (0.229 mol) synthesized in Reference Example 1 was added to a mixed solution of 35.0 g (0.875 mol) of NaOH, 3100 ml of water and 830 ml of pyridine, and they were reacted for 1 hour by heating and refluxing. The product was separated by hot filtration and washed in order of pyridine, acetone and water. Then, after the product was stirred repeatedly several times in 1300 ml of water at room temperature, water was confirmed to be neutralized. The crystal was separated by filtration and dried to obtain 105.3 g of the compound (1-2) (yield: 80%).

Reference Example 4

1,8-Diazabicyclo[5,4,0]-7-undecene (DBU) 566 g (3.72 mol) was added to 1800 g of anhydrous sulfolane, and the mixture was stirred. 1,3-Diiminoisoindoline 180 g (1.24 mol) was gradually added thereto. Silicon tetrachloride 316 g (1.8 mol) was dropwise added to the above solution through a dropping funnel while taking care of heat generation. After finishing dropwise adding, the temperature was elevated to carry out the reaction at 150° C. for 8 hours. The solution was left cooling while stirring, and when it reached 30° C., it was poured slowly into 36 kg of ice and water under stirring to obtain a greenish brown slurry. This slurry was stirred for 1 hour and then heated, and it was subjected to heating treatment at 80° C. for 2 hours. After filtrated, the product was washed by hot water of 60° C. and dried to obtain 149 g of the compound (1-2) (yield: 79%).

Reference Example 5

The compound (1-2) 100.0 g synthesized in Reference Example 3 and tri-n-butylamine 124.3 ml were added to 3000 ml of quinoline, and 87.7 g of triethylsilyl chloride was further added thereto under nitrogen atmosphere to react them at 140 to 150° C. for 6 hours. The produce was cooled down to room temperature and then added to a mixed solution of 6000 ml of methanol and 1600 ml of water. The deposited crystal was separated by filtering and suspended and heated in 2500 ml of toluene, and then the crystal was cooled, separated by filtering and dried to obtain 74.8 g of the compound (1-4) (yield: 53%).

TABLE 6

| Colorant No. | Silicon phthalocyanine compound | $A^1$ to $A^4$ | Substituent on $A^1$ to $A^4$ | Copper phthalocyanine compound-1 | Copper phthalocyanine compound-2 | m1:m2 | Reagent for introducing substituent Z |
|---|---|---|---|---|---|---|---|
| (1A) | (1-1) | a-1 | — | (3-1) | — | 90:10 | — |
| (1B) | (1-1) | a-1 | — | (3-1) | — | 90:10 | — |
| (1C) | (1-1) | a-1 | — | (3-1) | — | 90:10 | — |
| (1D) | (1-1) | a-1 | — | (3-1) | — | 90:10 | — |
| (2A) | (1-2) | a-1 | — | (3-1) | — | 90:10 | — |
| (2B) | (1-2) | a-1 | — | (3-1) | — | 90:10 | — |
| (2C) | (1-2) | a-1 | — | (3-1) | — | 90:10 | — |
| (2D) | (1-2) | a-1 | — | (3-1) | — | 90:10 | — |
| (2E) | (1-2) | a-1 | — | (3-1) | — | 90:10 | — |
| (2F) | (1-2) | a-1 | — | (3-1) | — | 90:10 | — |
| (3A) | (1-4) | a-1 | — | (3-1) | — | 90:10 | $(C_2H_5)_3SiCl$ |
| (3B) | (1-4) | a-1 | — | (3-1) | — | 90:10 | $(C_2H_5)_3SiCl$ |
| (3C) | (1-4) | a-1 | — | (3-1) | — | 90:10 | $(C_2H_5)_3SiCl$ |
| (3D) | (1-4) | a-1 | — | (3-1) | — | 90:10 | $(C_2H_5)_3SiCl$ |
| (3E) | (1-4) | a-1 | — | (3-1) | — | 90:10 | $(C_2H_5)_3SiCl$ |
| (3F) | (1-4) | a-1 | — | (3-1) | — | 90:10 | $(C_2H_5)_3SiCl$ |
| (4A) | (1-3) | a-1 | — | (3-1) | — | 90:10 | $(CH_3)_3SiCl$ |
| (4B) | (1-3) | a-1 | — | (3-1) | — | 90:10 | $(CH_3)_3SiCl$ |
| (4C) | (1-3) | a-1 | — | (3-1) | — | 90:10 | $(CH_3)_3SiCl$ |
| (4D) | (1-3) | a-1 | — | (3-1) | — | 90:10 | $(CH_3)_3SiCl$ |
| (5A) | (1-11) | a-1 | — | (3-1) | — | 90:10 | $C_8H_{17}Br$ |
| (5B) | (1-11) | a-1 | — | (3-1) | — | 90:10 | $C_8H_{17}Br$ |
| (5C) | (1-11) | a-1 | — | (3-1) | — | 90:10 | $C_8H_{17}Br$ |
| (5D) | (1-11) | a-1 | — | (3-1) | — | 90:10 | $C_8H_{17}Br$ |
| (6A) | (1-8) | a-1 | — | (3-1) | — | 90:10 | $(t-C_4H_9)_3SiCl$ |
| (6B) | (1-8) | a-1 | — | (3-1) | — | 90:10 | $(t-C_4H_9)_3SiCl$ |
| (7A) | (1-10) | a-1 | — | (3-1) | — | 90:10 | $C_6H_5Br$ |
| (7B) | (1-10) | a-1 | — | (3-1) | — | 90:10 | $C_6H_5Br$ |
| (8B) | (1-1) | a-1 | — | (3-4) | — | 90:10 | — |
| (9B) | (1-2) | a-1 | — | (3-4) | — | 90:10 | — |
| (10B) | (1-4) | a-1 | — | (3-4) | — | 90:10 | $(C_2H_5)_3SiCl$ |
| (11A) | (1-4) | a-1 | 4-Cl | (3-4) | — | 90:10 | — |
| (11B) | (1-4) | a-1 | 4-Cl | (3-4) | — | 90:10 | — |
| (12A) | (1-15) | a-1 | 4-Cl | (3-4) | — | 90:10 | — |
| (12B) | (1-15) | a-1 | 4-Cl | (3-4) | — | 90:10 | — |

TABLE 7

| Colorant No. | Silicon phthalocyanine compound | $A^1$ to $A^4$ | Substituent on $A^1$ to $A^4$ | Copper phthalocyanine compound-1 | Copper phthalocyanine compound-2 | m1:m2 | Reagent for introducing substituent Z |
|---|---|---|---|---|---|---|---|
| (13A) | (1-18) | a-1 | 4-Cl | (3-4) | — | 90:10 | $(C_2H_5)_3SiCl$ |
| (13B) | (1-18) | a-1 | 4-Cl | (3-4) | — | 90:10 | $(C_2H_5)_3SiCl$ |
| (14B) | (1-14) | a-1 | 4-Cl | (3-1) | — | 90:10 | — |
| (15B) | (1-15) | a-1 | 4-Cl | (3-1) | — | 90:10 | — |

TABLE 7-continued

| Colorant No. | Silicon phthalocyanine compound | $A^1$ to $A^4$ | Substituent on $A^1$ to $A^4$ | Copper phthalocyanine compound-1 | Copper phthalocyanine compound-2 | m1:m2 | Reagent for introducing substituent Z |
|---|---|---|---|---|---|---|---|
| (16B) | (1-18) | a-1 | 4-Cl | (3-1) | — | 90:10 | $(C_2H_5)_3SiCl$ |
| (17A) | (1-29) | a-3 | — | (3-10) | — | 90:10 | — |
| (17B) | (1-29) | a-3 | — | (3-10) | — | 90:10 | — |
| (18A) | (1-30) | a-3 | — | (3-10) | — | 90:10 | — |
| (18B) | (1-30) | a-3 | — | (3-10) | — | 90:10 | — |
| (19A) | (1-32) | a-3 | — | (3-10) | — | 90:10 | $(C_2H_5)_3SiCl$ |
| (19B) | (1-32) | a-3 | — | (3-10) | — | 90:10 | $(C_2H_5)_3SiCl$ |
| (20A) | (1-31) | a-3 | — | (3-10) | — | 90:10 | $(CH_3)_3SiCl$ |
| (20B) | (1-31) | a-3 | — | (3-10) | — | 90:10 | $(CH_3)_3SiCl$ |
| (21B) | (1-29) | a-3 | — | (3-1) | — | 90:10 | $(C_2H_5)_3SiCl$ |
| (22B) | (1-30) | a-3 | — | (3-1) | — | 90:10 | $(C_2H_5)_3SiCl$ |
| (23B) | (1-32) | a-3 | — | (3-1) | — | 90:10 | $(C_2H_5)_3SiCl$ |
| (24B) | (1-30) | a-3 | — | (3-1) | (3-5) | 90:10 | — |
| (25B) | (1-32) | a-3 | — | (3-1) | (3-7) | 90:10 | $(C_2H_5)_3SiCl$ |
| (26B) | (1-34) | a-3 | — | (3-1) | (3-2) | 90:10 | $C_6H_{13}Br$ |
| (27B) | (1-3) | a-1 | — | (3-1) | (3-4) | 90:10 | $(CH_3)_3SiCl$ |
| (28B) | (1-11) | a-1 | — | (3-1) | (3-10) | 90:10 | $C_8H_{17}I$ |
| (29B) | (1-15) | a-1 | 4-Cl | (3-1) | (3-4) | 90:10 | — |
| (30A) | (1-24) | a-2 | — | (3-9) | — | 90:10 | — |
| (30B) | (1-24) | a-2 | — | (3-9) | — | 90:10 | — |
| (31A) | (1-25) | a-2 | — | (3-9) | — | 90:10 | $(CH_3)_3SiCl$ |
| (31B) | (1-25) | a-2 | — | (3-9) | — | 90:10 | $(CH_3)_3SiCl$ |
| (32A) | (1-27) | a-2 | — | (3-9) | — | 90:10 | $C_6H_{13}Br$ |
| (32B) | (1-27) | a-2 | — | (3-9) | — | 90:10 | $C_6H_{13}Br$ |
| (33B) | (1-26) | a-2 | — | (3-1) | — | 90:10 | $(CH_3)_3SiCl$ |
| (34B) | (1-25) | a-2 | — | (3-1) | (3-9) | 90:10 | $(CH_3)_3SiCl$ |
| (35B) | (1-28) | a-2 | — | (3-3) | (3-9) | 90:10 | p-$C_4H_9$—$C_6H_4Br$ |
| (36A) | (1-37) | a-4 | — | (3-11) | — | 90:10 | $(CH_3)_3SiCl$ |
| (36B) | (1-37) | a-4 | — | (3-11) | — | 90:10 | $(CH_3)_3SiCl$ |
| (37B) | (1-37) | a-4 | — | (3-5) | — | 90:10 | $(CH_3)_3SiCl$ |
| (38B) | (1-38) | a-4 | — | (3-2) | (3-11) | 90:10 | $C_6H_5I$ |

TABLE 8

| Colorant No. | Silicon phthalocyanine compound | $A^1$ to $A^4$ | Substituent on $A^1$ to $A^4$ | Copper phthalocyanine compound-1 | Copper phthalocyanine compound-2 | m1:m2 | Reagent for introducing substituent Z |
|---|---|---|---|---|---|---|---|
| (39A) | (1-40) | a-5 | — | (3-12) | — | 90:10 | — |
| (39B) | (1-40) | a-5 | — | (3-12) | — | 90:10 | — |
| (40B) | (1-40) | a-5 | — | (3-2) | — | 90:10 | — |
| (41B) | (1-41) | a-5 | — | (3-1) | (3-12) | 90:10 | $(CH_3)_3SiCl$ |
| (42B) | (1-45) | a-6 | — | (3-4) | — | 90:10 | $(CH_3)_3SiCl$ |
| (43B) | (1-46) | a-6 | — | (3-1) | (3-13) | 90:10 | $(i-C_3H_7)_3SiCl$ |
| (44A) | (1-47) | a-6 | — | (3-13) | — | 90:10 | $C_8H_{17}Br$ |
| (44B) | (1-47) | a-6 | — | (3-13) | — | 90:10 | $C_8H_{17}Br$ |
| (45B) | (1-49) | a-7 | — | (3-6) | — | 90:10 | — |
| (46B) | (1-50) | a-7 | — | (3-1) | — | 90:10 | $(CH_3)_3SiCl$ |
| (47A) | (1-51) | a-7 | — | (3-14) | — | 90:10 | $(C_4H_9)_3SiCl$ |
| (47B) | (1-51) | a-7 | — | (3-14) | — | 90:10 | $(C_4H_9)_3SiCl$ |
| (48B) | (1-52) | a-7 | — | (3-7) | (3-14) | 90:10 | p-$C_4H_9$—$C_6H_4Br$ |
| (49A) | (1-3) | a-1 | — | (3-1) | — | 95:5 | $(CH_3)_3SiCl$ |
| (49B) | (1-3) | a-1 | — | (3-1) | — | 95:5 | $(CH_3)_3SiCl$ |
| (50B) | (1-4) | a-1 | — | (3-4) | — | 95:5 | $(C_2H_5)_3SiCl$ |
| (51B) | (1-4) | a-1 | — | (3-1) | (3-4) | 95:5 | $(C_2H_5)_3SiCl$ |
| (52A) | (1-25) | a-2 | — | (3-9) | — | 95:5 | $(CH_3)_3SiCl$ |
| (52B) | (1-25) | a-2 | — | (3-9) | — | 95:5 | $(CH_3)_3SiCl$ |
| (53A) | (1-31) | a-3 | — | (3-10) | — | 95:5 | $(CH_3)_3SiCl$ |
| (53B) | (1-31) | a-3 | — | (3-10) | — | 95:5 | $(CH_3)_3SiCl$ |
| (54A) | (1-38) | a-4 | — | (3-11) | — | 95:5 | $C_6H_5Br$ |
| (54B) | (1-38) | a-4 | — | (3-11) | — | 95:5 | $C_6H_5Br$ |
| (55A) | (1-42) | a-5 | — | (3-12) | — | 95:5 | $(C_2H_5)_3SiCl$ |
| (55B) | (1-42) | a-5 | — | (3-12) | — | 95:5 | $(C_2H_5)_3SiCl$ |
| (56B) | (1-51) | a-7 | — | (3-1) | (3-13) | 95:5 | $(C_4H_9)_3SiCl$ |
| (57A) | (1-3) | a-1 | — | (3-1) | — | 85:15 | $(CH_3)_3SiCl$ |
| (57B) | (1-3) | a-1 | — | (3-1) | — | 85:15 | $(CH_3)_3SiCl$ |

TABLE 8-continued

| Colorant No. | Silicon phthalocyanine compound | $A^1$ to $A^4$ | Substituent on $A^1$ to $A^4$ | Copper phthalocyanine compound-1 | Copper phthalocyanine compound-2 | m1:m2 | Reagent for introducing substituent Z |
|---|---|---|---|---|---|---|---|
| (58A) | (1-32) | a-3 | — | (3-10) | — | 85:15 | $(C_2H_5)_3SiCl$ |
| (58B) | (1-32) | a-3 | — | (3-10) | — | 85:15 | $(C_2H_5)_3SiCl$ |
| (59A) | (1-4) | a-1 | — | (3-1) | — | 80:20 | $(C_2H_5)_3SiCl$ |
| (59B) | (1-4) | a-1 | — | (3-1) | — | 80:20 | $(C_2H_5)_3SiCl$ |
| (60A) | (1-31) | a-3 | — | (3-10) | — | 80:20 | $(CH_3)_3SiCl$ |
| (60B) | (1-31) | a-3 | — | (3-10) | — | 80:20 | $(CH_3)_3SiCl$ |

Example 2

Toner for Electrophotograph

Preparation of Toner 1 (Toner Prepared by Mixing and Crushing Method)

The following toner components were put in a Henschel mixer (manufactured by Mitsui Miike Machinery Co., Ltd.) and subjected to mixing treatment for 5 minutes at a peripheral speed of a stirring blade which was set to 25 m/second.

| | |
|---|---|
| Polyester resin: (condensation product of bisphenol A-ethylene oxide adduct, terephthalic acid and trimellitic acid; weight average molecular weight: 20,000) | |
| Colorant (3A) | 2 parts by mass |
| Silanol compound 4-2 | 0.05 part by mass |
| Mold lubricant (pentaerythritol tetrastearate) | 6 parts by mass |
| Charge-controlling agent (boron benzilate) | 1 part by mass |

The mixture was kneaded by means of a double shaft extrusion kneader, and then after roughly crushed by means of a hammer mill, it was subjected to crushing treatment by means of a turbo mill crusher (manufactured by Freund-Turbo Corporation). Further, it was subjected to fine particle classification treatment by means of an air classifier making use of a Coanda effect, whereby color particles having a volume basis median diameter of 5.5 μm were obtained.

Next, the following external additives were added to the color particles described above, and the mixture was subjected to external addition treatment by means of a Henschel mixer (manufactured by Mitsui Miike Machinery Co., Ltd.) to prepare a [toner 1].

| | |
|---|---|
| Silica subjected to hexamethylsilazane treatment (average primary particle diameter: 12 nm) | 0.6 part by mass |
| Titanium oxide subjected to n-octylsilane treatment (average primary particle diameter: 24 nm) | 0.8 part by mass |

The external addition treatment was carried out by means of the Henschel mixer on the conditions of a peripheral speed of a stirring blade of 35 m/second, a treating temperature of 35° C. and a treating time of 15 minutes.

<<Preparation of Toners 2 to 47 (Toners Produced by Emulsion Polymerization Method)>>

Preparation of Toner-2:

(1) Preparation of Colorant Fine Particle Dispersion 1

Sodium n-dodecylsulfate 11.5 parts by mass was added to ion-exchanged water 160 parts by mass, and the mixture was dissolved by stirring to prepare a surfactant aqueous solution. The colorant (3A) 2 parts by mass was added to the above surfactant aqueous solution, and 0.05 part by mass of the silanol compound 4-2 was further added gradually thereto and subjected to dispersion treatment for 1 hour by means of [Clear Mix W Motion CLM-0.8 (manufactured by M Technique Co., Ltd.)] to prepare a [colorant fine particle dispersion 1].

The [colorant fine particles 1] contained in the [colorant fine particle dispersion 1] had a volume basis median diameter of 58 nm. The volume basis median diameter was measured on the following measuring conditions by means of MICROTRAC UPA-150 (manufactured by Honeywell Inc.).

Sample refractive index: 1.59
Sample specific gravity: 1.05 (reduced to spherical particle)
Solvent refractive index: 1.33
Solvent viscosity: 0.797 (30° C.), 1.002 (20° C.)
Zero point adjustment: adjusted by adding ion-exchanged Water 120 to a measuring cell (2) Preparation of [Resin Particles 1 for Core part]

Prepared were [resin particles 1 for a core part] provided with a multilayer structure by passing through first stage polymerization, second stage polymerization and third stage polymerization.

(a) First Stage Polymerization:

A reaction vessel equipped with a stirrer, a temperature sensor, a cooling tube and a nitrogen-introducing device was charged with 4 parts by mass of an anionic surfactant represented by the following structural formula 1 together with 3040 parts by mass or ion-exchanged water to prepare a surfactant aqueous solution.

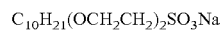

$C_{10}H_{21}(OCH_2CH_2)_2SO_3Na$  structural formula 1:

A polymerization initiator solution prepared by dissolving 10 parts by mass of potassium persulfate (KPS) in 400 parts by mass of ion-exchanged water was added to the surfactant aqueous solution described above, and the temperature was elevated up to 75° C. Then a monomer mixed solution comprising the following compounds was dropwise added to the reaction vessel in 1 hour.

| | |
|---|---|
| Styrene | 532 parts by mass |
| n-Butyl acrylate | 200 parts by mass |
| Methacrylic acid | 68 parts by mass |
| n-Octylmercaptan | 16.4 parts by mass |

After the monomer mixed solution described above was dropwise added, the mixture was heated and stirred at 75° C. for 2 hours, whereby polymerization (first stage polymerization) was carried out to prepare resin particles. The above resin particles are designated as [resin particles A1]. The [resin particles A1] prepared in the first stage polymerization had a weight average molecular weight of 16,500.

(b) Second Stage Polymerization:

A flask equipped with a stirrer was charged with a monomer mixed solution comprising the following compounds, and subsequently 93.8 parts by weight of paraffin wax [HNP- 57 (manufactured by Nippon Seiro Co., Ltd.)] was added thereto as a mold lubricant and dissolve by heating at 90° C. Thus, the monomer solution was prepared.

| Styrene | 101.1 parts by mass |
|---|---|
| n-Butyl acrylate | 62.2 parts by mass |
| Methacrylic acid | 12.3 parts by mass |
| n-Octylmercaptan | 1.75 part by mass |

On the other hand, a surfactant aqueous solution obtained by dissolving 3 parts by mass of the anionic surfactant described above in 1560 parts by mass of ion-exchanged water was prepared and heated at 98° C. The foregoing [resin particles A1] 32.8 parts by mass (reduced to the solid matter) was added to the above surfactant aqueous solution, and the monomer solution containing paraffin wax described above was further added thereto, followed by mixing and dispersing them for 8 hours by means of a mechanical disperser having a circuit [Clear Mix (manufactured by M Technique Co., Ltd.)]. An emulsified particle dispersion containing emulsified particles having a dispersion particle diameter of 340 nm was prepared by mixing and dispersing as described above.

Then, a polymerization initiator solution prepared by dissolving 6 parts by mass of potassium persulfate in 200 parts by mass of ion-exchanged water was added to the emulsified particle dispersion described above, and the mixture was heated and stirred at 98° C. for 12 hours, whereby polymerization (second stage polymerization) was carried out to prepare resin particles. The above resin particles are designed as [resin particles A2]. The [resin particles A2] prepared in the second stage polymerization had a weight average molecular weight of 23,000.

(c) Third Stage Polymerization:

A polymerization initiator solution prepared by dissolving 5.45 parts by mass of potassium persulfate in 220 parts by mass of ion-exchanged water was added to the [resin particles A2] obtained in the second stage polymerization described above, and a monomer mixed solution comprising the following compounds was dropwise added thereto in 1 hour under the temperature condition of 80° C.

| Styrene | 293.8 parts by mass |
|---|---|
| n-Butyl acrylate | 154.1 parts by mass |
| n-Octylmercaptan | 7.08 parts by mass |

After finishing dropwise adding, the mixture was heated and stirred for 2 hours to carry out polymerization (third stage polymerization), and after finishing the polymerization, it was cooled down to 28° C. to prepare [resin particles 1 for a core part]. The [resin particles 1 for a core part] prepared in the third stage polymerization had a weight average molecular weight of 26,800.

(3) Preparation of [Resin Particles 1 for Shell]

Polymerization reaction and treatment after the reaction were carried out in the same manners to prepare [resin particles 1 for a shell], except that the monomer mixed solution used in the first polymerization in preparing the [resin particles 1 for a core part] was changed to the following solution.

| Styrene | 624 parts by mass |
|---|---|
| 2-Ethylhexyl acrylate | 120 parts by mass |
| Methacrylic acid | 56 parts by mass |
| n-Octylmercaptan | 16.4 parts by mass |

(4) Preparation of Toner-2

A toner-2 was prepared by the following procedure.

(a) Preparation of Core Part

A reaction vessel equipped with a stirrer, a temperature sensor, a cooling tube and a nitrogen-introducing device was charged with:

| Resin particles for a core | 420.7 parts by mass (reduced to solid matter) |
|---|---|
| Ion-exchanged water | 900 parts by mass |
| Colorant particle dispersion 1 | 200 parts by mass | and the mixture was stirred. The temperature of the reaction vessel was controlled to 30° C. and then a sodium hydroxide aqueous solution of 5 mole/liter was added thereto to control the pH to 8 to 11.

Next, an aqueous solution prepared by dissolving 2 parts by mass of magnesium chloride hexahydrate in 1000 parts by mass of ion-exchanged water was added thereto at 30° C. in 10 minutes under stirring. After left standing for 3 minutes, heating was started, and the mixture was heated up to 65° C. in 60 minutes to associate the particles described above. In this state, a particle diameter of the associated particles was measured by means of [Multisizer 3 (manufactured by Beckman Coulter Inc.)], and when a volume basis median diameter of the associated particles reached 5.5 μm, an aqueous solution prepared by dissolving 40.2 parts by mass of sodium chloride in 1000 parts by mass of ion-exchanged water was added thereto to terminate the association.

After terminating the association, the solution was heated up to 70° C. for ageing treatment, and it was heated and stirred for 1 hour, whereby fusion was continued to prepare [a core part 1].

An average circularity of the [core part 1] was measured by means of [FPIA 2000 (manufactured by SYSTEX Corporation)] to find that it was 0.912.

(b) Preparation of Shell:

Next, the solution described above was controlled to 65° C., and 96 parts by mass of the [resin particles 1 for a shell] was added thereto. Further, an aqueous solution prepared by dissolving 2 parts by mass of magnesium chloride hexahydrate in 1000 parts by mass of ion-exchanged water was added thereto in 10 minutes, and then the mixture was heated up to 70° C. and stirred for 1 hour. Thus, the [resin particles 1 for a shell] were fused on the surface of the [core part 1], and then they were subjected to ripening treatment at 75° C. for 20 minutes to form a shell thereon.

Then, an aqueous solution prepared by dissolving 40.2 parts by mass of sodium chloride in 1000 parts by mass of ion-exchanged water was added thereto to terminate shell formation. Further, the solution was cooled down to 30° C. at a rate of 8° C./minute to form colored particles, and the particles thus obtained were separated by filtering and washed repeatedly with ion-exchanged water of 45° C., followed by drying them by hot air of 40° C., whereby [colored particles 2] having a shell on the surface of the core part were prepared.

(c) External Addition Treatment:

The following external additives were added to the [colored particles 2] prepared, and the mixture was subjected to external addition treatment by means of a Henschel mixer (manufactured by Mitsui Miike Machinery Co., Ltd.) to prepare a [toner 2].

| | |
|---|---|
| Silica subjected to hexamethylsilazane treatment (average primary particle diameter: 12 nm) | 0.6 part by mass |
| Titanium oxide subjected to n-octylsilane treatment (average primary particle diameter: 24 nm) | 0.8 part by mass |

The external addition treatment was carried out by means of a Henschel mixer on the conditions of a peripheral speed of a stirring blade of 35 m/second, a treating temperature of 35° C. and a treating time of 15 minutes.

Preparation of Toners 3 to 39:

Toners 3 to 39 were prepared by the same procedure, except that in preparing the toner 2, the colorant was changed to colorants shown in the toners No. 3 to 39 in Table 9.

Preparation of Toners 40 to 47 (Comparative Toners):

Toners 40 to 47 were prepared by the same procedure, except that in preparing the toner 2, the colorant was changed to colorants shown in the toners No. 40 to 47 in Table 9. The colorants (101) to (108) are shown in Table 10. The compound (1-4) was synthesized according to Reference Example 1, Reference Example 3 and then Reference Example 5, and the compounds (1-18) and (1-32) were obtained by carrying out synthesis in the same manner as in Reference Example 1, except that in Reference Example 1, 1,3-diiminoisoindoline was changed to an equimolar amount of 1,3-diimino-5-chloroindoline or 1,3-diiminopyrrolino[3.4-c]pyridine and then carrying out reaction in the same manners as in Reference Example 3 and Reference Example 5.

TABLE 9

| Toner No. | Colorant No. | Toner production process | Volume basis median diameter of colorant particle | Remarks |
|---|---|---|---|---|
| 1 | (3A) | Crushing process | — | Example |
| 2 | (3A) | Polymerization process | 58 nm | Example |
| 3 | (3B) | Polymerization process | 66 nm | Example |
| 4 | (3C) | Polymerization process | 62 nm | Example |
| 5 | (3D) | Polymerization process | 74 nm | Example |
| 6 | (3E) | Polymerization process | 60 nm | Example |
| 7 | (3F) | Polymerization process | 72 nm | Example |
| 8 | (4A) | Polymerization process | 58 nm | Example |
| 9 | (4B) | Polymerization process | 68 nm | Example |
| 10 | (5A) | Polymerization process | 60 nm | Example |
| 11 | (5B) | Polymerization process | 72 nm | Example |
| 12 | (5C) | Polymerization process | 62 nm | Example |
| 13 | (5D) | Polymerization process | 80 nm | Example |
| 14 | (10B) | Polymerization process | 68 nm | Example |
| 15 | (12A) | Polymerization process | 60 nm | Example |
| 16 | (12B) | Polymerization process | 70 nm | Example |
| 17 | (13A) | Polymerization process | 52 nm | Example |
| 18 | (13B) | Polymerization process | 66 nm | Example |
| 19 | (19A) | Polymerization process | 54 nm | Example |
| 20 | (19B) | Polymerization process | 68 nm | Example |
| 21 | (23B) | Polymerization process | 70 nm | Example |
| 22 | (25B) | Polymerization process | 62 nm | Example |
| 23 | (31A) | Polymerization process | 60 nm | Example |
| 24 | (31B) | Polymerization process | 66 nm | Example |
| 25 | (36A) | Polymerization process | 62 nm | Example |
| 26 | (36B) | Polymerization process | 68 nm | Example |
| 27 | (39A) | Polymerization process | 58 nm | Example |
| 28 | (39B) | Polymerization process | 76 nm | Example |
| 29 | (44A) | Polymerization process | 58 nm | Example |
| 30 | (44B) | Polymerization process | 74 nm | Example |
| 31 | (47A) | Polymerization process | 60 nm | Example |
| 32 | (47B) | Polymerization process | 72 nm | Example |
| 33 | (50B) | Polymerization process | 90 nm | Example |
| 34 | (52A) | Polymerization process | 78 nm | Example |
| 35 | (52B) | Polymerization process | 92 nm | Example |
| 36 | (57A) | Polymerization process | 60 nm | Example |
| 37 | (57B) | Polymerization process | 68 nm | Example |
| 38 | (59A) | Polymerization process | 58 nm | Example |
| 39 | (59B) | Polymerization process | 66 nm | Example |
| 40 | (101) | Polymerization process | 102 nm | Comparative Example |
| 41 | (102) | Polymerization process | 136 nm | Comparative Example |
| 42 | (103) | Polymerization process | 120 nm | Comparative Example |
| 43 | (104) | Polymerization process | 126 nm | Comparative Example |
| 44 | (105) | Polymerization process | 124 nm | Comparative Example |
| 45 | (106) | Polymerization process | 120 nm | Comparative Example |
| 46 | (107) | Polymerization process | 112 nm | Comparative Example |
| 47 | (108) | Polymerization process | 120 nm | Comparative Example |

TABLE 10

| | Comparative Colorant | | |
|---|---|---|---|
| Colorant No. | Compound (1) | Compound (3) | Ratio (1):(3) |
| (101) | — | (3-1) | 0:100 |
| (102) | (1-4) | — | 100:0 |
| (103) | (1-18) | — | 100:0 |

TABLE 10-continued

| | Comparative Colorant | | |
|---|---|---|---|
| Colorant No. | Compound (1) | Compound (3) | Ratio (1):(3) |
| (104) | (1-32) | — | 100:0 |
| (105) | (1-4) | (3-1) | 90:10 |
| (106) | (1-4) | (3-4) | 90:10 |
| (107) | (1-18) | (3-4) | 90:10 |
| (108) | (1-32) | (3-10) | 90:10 |

<<Preparation of Yellow, Magenta and Black Toners>>
Preparation of Yellow Toner:

A yellow toner was prepared by the same procedure, except that in preparing the toner 2, the colorant was changed to C.I. Pigment Yellow 74.

Preparation of Magenta Toner:

A magenta toner was prepared by the same procedure, except that in preparing the toner 2, the colorant was changed to C.I. Pigment Red 122.

Preparation of Black Toner:

A black toner was prepared by the same procedure, except that in preparing the toner 2, the colorant was changed to carbon black [MOGUL L] (manufactured by Cabot Corporation).

<<Preparation of Developer>>

The [toners 1 to 47] and the respective yellow, magenta and black toners each described above were mixed respectively with a ferrite carrier having a volume average particle diameter of 60 μm which was coated with a silicone resin to prepare [developers 1 to 48], a yellow developer, a magenta developer and a black developer each having a toner concentration of 6%.

<<Evaluation>>

The developers were evaluated by a commercial multifunctional printer [bizhub Pro C500 (manufactured by Konica Minolta Business Technologies, Inc.)] which corresponds to an image-forming apparatus of a two-component developing system and in which a developing device charged with each developer was loaded.

Also, a fixing device of a belt fixing system (described in JP-A 2011-219644) was loaded in the printer described above to evaluate the developers. Various conditions such as a surface material, a surface temperature and the like of a heating roller in the fixing device of a belt fixing system were set as follows:

Fixing speed: 230 mm/second
Surface material of heating roller: polytetrafluoroethylene (PTFE)
Surface temperature of heating roller: 125° C.

The evaluating apparatus described above was charged in order with the toners prepared above to evaluate the following items under the environment of a normal temperature and a normal humidity (29° C., 55% RH).

Printing was carried out on a paper of a 210×297 mm size under the environment of a normal temperature and a normal humidity (20° C. 55% RH).

<Evaluation of Images>

The image-forming apparatus described above in which a toner set prepared by using the color toners of the present invention was installed was used to form the respective reflection images (images on paper) on paper. The toner adhesion amount was evaluated in a range of 0.7±0.05 (mg/cm²).

Evaluation of Cyan Toner Saturation:

The toner sets prepared by using the color toners of the present invention and the comparative toners were used to output cyan solid images of a maximum saturation at a hue angle of 240 degrees and a brightness of 40 to 70 in a CIELAB color space. The evaluation was based on a case where the comparative toner (toner 40) falling outside the present invention was used. The following ranks A to C are classified to success in the evaluation:

A: improvement in the saturation by 20% or more
B: improvement in the saturation by 15% or more and less than 20%
C: improvement in the saturation by 10% or more and less than 15%
D: improvement in the saturation by less than 10%

Evaluation of Color Reproduction Area:

The respective solid image parts of single colors of yellow/magenta/cyn and R (red)/G (green)/B (blue) were used to measure the color regions thereof, whereby the areas thereof were confirmed to be expanded. The areas were compared, wherein a color region of Japan color for printing was set to 100. The areas expanded by 15% or more were classified to A; the areas expanded by 10% or more and less than 15% were classified to B; the areas expanded by 5% or more and less than 10% were classified to C; and the areas expanded by less than 5% or 0% were classified to D.

A to C were classified to success in the evaluation.

Light Fastness:

The images used for evaluating the cyan toner saturation were irradiated by a xenon fade meter for 7 days to evaluate a hue change of the mixed color images before and after irradiation. The hue change was visually evaluated by ten subjects with 10 points designated as a full mark. A level of 10 to 9 points in the average point of the ten subjects was classified to A; a level of less than 9 points and 8 points or more in the average point of the ten subjects was classified to B; a level of less than 8 points and 7 points or more in the average point of the ten subjects was classified to C; and a level of less than 7 points in the average point of the ten subjects was classified to D. A and B were a level sufficiently endurable to practical use. Accordingly, A and B were classified to success in the evaluation.

Transparency:

An orange transmission image was formed on a commercial OHP sheet (made of a polyester film having a thickness of 75 μm), and it was evaluated by measuring a visible light spectral transmission factor thereof by means of a [330 type automatic spectrophotometer (manufactured by Hitachi, Ltd.)]. That is, a visible light 0spectral transmission factor of the fixed images was measured with the OHP sheet carried thereon with no toner used as a reference to determine a difference in a spectral transmission factor between the OHP sheet carried thereon with the toner and the OHP sheet carried thereon with no toner in 440 nm, whereby a transparency of the OHP images was evaluated. A toner adhesion amount on the OHP sheet was set to 0.7±0.05 mg/cm² to evaluate the transparency. The transparency was judged to be high at 80% or more, and the following ranks A and B are classified to success in the evaluation.

A: transmission factor: 85% or more
B: transmission factor: 80% or more and less than 85%
C: transmission factor: 75% or more and less than 80%
D: transmission factor: less than 75%

Electrostatic Property:
Evaluation of Toner Flying:

In evaluation of toner flying, a bizhub C452 remolded machine was used for an evaluating machine to output images on 100,000 sheets, and then the developing device was taken out and set in a feigned rotation machine; papers having a size of 210×297 were put immediately under the center of a sleeve of the developing device; feigned rotation was carried out for 60 minutes, and a mass of the toner fallen on the papers was measured to evaluate it according to the following criteria. A rotation peripheral speed of the sleeve in the developing device was set to 620 mm/second. The following ranks A and B are classified to success in the evaluation.

A: less than 3 mg
B: 3 mg or more and less than 6 mg
C: 6 mg or more and less than 9 mg
D: 9 mg or more and less than 12 mg
E: 12 mg or more The evaluation results are shown in Table 11.

TABLE 11

| Toner No. | Evaluation of saturation Brightness 40 | Brightness 70 | Color reproducibility Color reproduction area evaluation | Light fastness | Electro-static property | Transparency | Remarks |
|---|---|---|---|---|---|---|---|
| 1 | B | A | B | B | B | B | Example |
| 2 | A | A | A | A | A | A | Example |
| 3 | A | A | B | A | A | A | Example |
| 4 | A | A | A | A | A | A | Example |
| 5 | B | A | B | A | B | B | Example |
| 6 | A | A | A | A | A | A | Example |
| 7 | B | A | B | A | B | B | Example |
| 8 | A | A | A | A | A | A | Example |
| 9 | A | A | B | A | B | A | Example |
| 10 | B | B | A | A | A | A | Example |
| 11 | B | B | B | A | A | A | Example |
| 12 | B | B | A | A | B | A | Example |
| 13 | B | B | B | A | B | B | Example |
| 14 | A | B | B | A | A | B | Example |
| 15 | A | B | A | B | A | A | Example |
| 16 | A | B | B | B | A | B | Example |
| 17 | A | B | A | B | A | A | Example |
| 18 | A | B | B | B | A | B | Example |
| 19 | A | B | A | A | A | A | Example |
| 20 | B | B | B | A | A | B | Example |
| 21 | B | A | B | A | A | A | Example |
| 22 | B | B | B | A | A | A | Example |
| 23 | A | A | A | A | A | A | Example |
| 24 | A | B | B | A | A | B | Example |
| 25 | B | A | A | A | A | A | Example |
| 26 | B | B | B | A | A | A | Example |
| 27 | A | A | A | A | A | A | Example |
| 28 | A | B | B | A | A | B | Example |
| 29 | B | A | A | A | A | A | Example |
| 30 | B | B | B | A | A | A | Example |
| 31 | A | A | A | A | A | A | Example |
| 32 | A | B | B | A | A | B | Example |
| 33 | B | A | B | A | B | B | Example |
| 34 | B | A | A | A | B | B | Example |
| 35 | B | A | B | B | B | B | Example |
| 36 | B | B | A | A | B | A | Example |
| 37 | A | C | C | B | B | A | Example |
| 38 | B | C | A | A | B | A | Example |
| 39 | A | C | C | B | B | A | Example |
| 40 | (basis) | (basis) | D | B | E | C | Comparative Example |
| 41 | D | B | C | B | E | D | Comparative Example |
| 42 | C | B | C | C | D | C | Comparative Example |
| 43 | D | C | C | B | E | D | Comparative Example |
| 44 | C | C | C | B | C | D | Comparative Example |
| 45 | C | C | C | B | C | C | Comparative Example |
| 46 | D | C | C | B | D | C | Comparative Example |
| 47 | D | C | D | B | D | D | Comparative Example |

As apparent from the evaluation results shown in Table 11, in the colorant fine particle dispersions prepared by using the colorants of the present invention, the particles were readily dispersed in a fine form as compared with a case in which the colorants comprising the comparative silicon phthalocyanine compounds were used and a case in which the colorants prepared by mixing and dispersing the silicon phthalocyanine compound and the copper phthalocyanine compound were used. Further, as apparent from the evaluation results shown in Table 11, it has become clear that the images obtained by using the electrophotographic toners of the present invention to mix the respective color toners are excellent in a color reproducibility and a light fastness and expanded in a color reproduction area and that they are improved in an electrostatic property and a transparency.

Example 3

Color Filter

<<Preparation of Color Filter>>
Preparation of Color Filter CF-1:

A red (R) mosaic pattern, a green (G) mosaic pattern and a blue (B) mosaic pattern were formed on a glass plate according to the following method in order to obtain an RGB color filter. Components shown below were used to prepare light-sensitive coating agents for color filters of a red color (R), a green color (G) and a blue color (B). The light-sensitive polyimide resin vanishes used contain photosensitizers.

| Components of light-sensitive coating agents for color filters: | |
|---|---|
| Light-sensitive coating agent for R | |
| coloring material: colorant (3A) of the present invention | 10 parts |
| light-sensitive polyimide resin vanish | 50 parts |
| N-methyl-2-pyrrolidone | 40 parts |
| Light-sensitive coating agents for G | |
| coloring material: G-1 | 10 parts |
| light-sensitive polyimide resin vanish | 50 parts |
| N-methyl-2-pyrrolidone | 40 parts |
| Light-sensitive coating agents for B | |
| coloring material: B-1 | 10 parts |
| light-sensitive polyimide resin vanish | 50 parts |
| N-methyl-2-pyrrolidone | 40 parts |

A glass plate subjected to silane coupling agent treatment was set in a spin coater, and the light-sensitive coating agent for R (red color filter) described above was spin-coated on the conditions of 300 rpm for 5 seconds in the beginning and then 2000 rpm for 5 seconds. Then, the glass plate was pre-baked at 80° C. for 15 minutes, and a photomask having a mosaic pattern was closely adhered thereon and exposed at a luminous energy of 900 mJ/cm$^2$ by means of an ultrahigh pressure mercury lamp.

Then, the glass plate was developed and washed with a dedicated developer and a dedicated rinse to form a red mosaic pattern on the glass plate. Continuously, a green (G) mosaic pattern and a blue (B) mosaic pattern were formed by coating the light-sensitive coating agent for G (green color filter) and the light-sensitive coating agent for B (blue color filter) each described above on the glass plate and baking it according to the methods described above, and then a black matrix was formed thereon according to a normal method to obtain a color filter CF-1.

Preparation of Color Filters CF-2 to 21 and Comparative Color Filters CF-22 to 25:

The color filters CF-2 to 21 of the present invention and the comparative color filters CF-22 to 25 were prepared in the same manner as in preparing the color filter CF-1, except that the colorant (3A) of the present invention was changed to coloring materials shown in Table 12.

The comparative compound 1 and the coloring materials G-1 and B-1 used for the color filters shown in Table 12 are shown below.

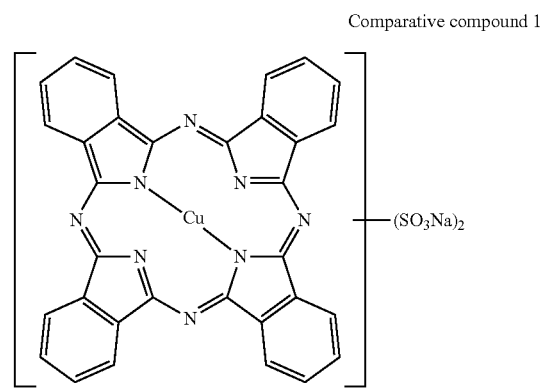

Comparative compound 1

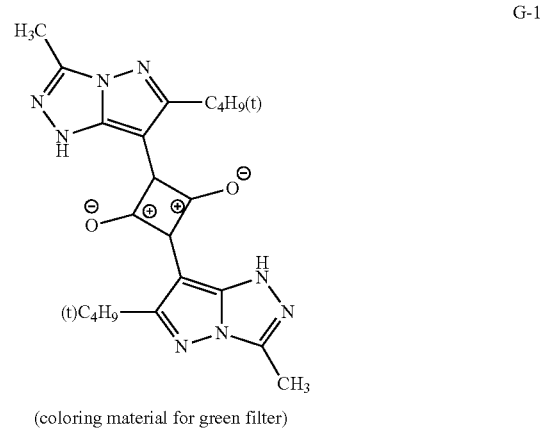

G-1

(coloring material for green filter)

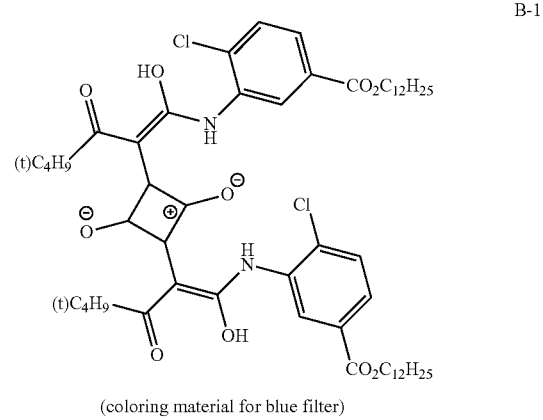

B-1

(coloring material for blue filter)

<<Evaluation of Color Filters>>

The color filters thus obtained were used to evaluate a color tone, a heat resistance and light fastness thereof by the following methods.

Color Tone:

The respective filters were visually evaluated by 10 monitors according to the following three grade criteria. The following ranks ⊚ and ○ are classified to success in the evaluation.

⊚: vivid and clear color
○: vivid color
Δ: dull color

Transparency:

A maximum transmission factor of the coating films at a wavelength of 440 nm was measured by means of [330 type automatic spectrophotometer (manufactured by Hitachi, Ltd.)]. The transparency was judged to be high at 80% or more, and the following ranks A and B are classified to success in the evaluation.

A: transmission factor: 85% or more
B: transmission factor: 80% or more and less than 85%
C: transmission factor: less than 80%

Heat Resistance:

An undercoat layer-provided glass substrate on which a pattern image was formed was put on a hot plate so that the surface of the glass substrate was brought into contact with the hot plate, and the glass substrate was heated at 130° C. for 4 hours. Then, a chromaticity change thereof before and after heating, that is, ΔEab was measured. The chromaticity was measured by means of a hue color difference meter CR-400 (manufactured by Konica Minolta Optics, Inc.). The following ranks A to C are classified to success in the evaluation.

A: less than 3
B: 3 or more and less than 4
C: 4 or more and less than 5
D: 5 or more Light Fastness:

An undercoat layer-provided glass substrate on which a pattern image was formed was irradiated at 8000 lux for 7 days by means of a xenon lump, and then a chromaticity change thereof, that is, a ΔEab value was measured. The chromaticity was measured by means of the hue color difference meter CR-400 (manufactured by Konica Minolta Optics, Inc.). The following ranks A to C are classified to success in the evaluation.

A: less than 3
B: 3 or more and less than 4
C: 4 or more and less than 5
D: 5 or more The evaluation results are shown in Table 12.

TABLE 12

| Color filter No. | Colorant No. | Color tone | Transparency | Heat resistance | Light fastness | Remarks |
|---|---|---|---|---|---|---|
| CF-1 | (3A) | ⊚ | A | A | A | Example |
| CF-2 | (3B) | ⊚ | B | A | A | Example |
| CF-3 | (4A) | ⊚ | A | A | A | Example |
| CF-4 | (4B) | ⊚ | B | A | A | Example |
| CF-5 | (5A) | ○ | A | A | A | Example |
| CF-6 | (5B) | ○ | B | A | A | Example |
| CF-7 | (10B) | ⊚ | B | B | A | Example |
| CF-8 | (20A) | ⊚ | B | A | A | Example |
| CF-9 | (20B) | ⊚ | B | B | A | Example |
| CF-10 | (28B) | ⊚ | A | B | A | Example |
| CF-11 | (32A) | ○ | A | A | A | Example |
| CF-12 | (38B) | ○ | B | B | A | Example |
| CF-13 | (39A) | ○ | A | B | B | Example |
| CF-14 | (44B) | ○ | B | B | A | Example |
| CF-15 | (47A) | ○ | A | B | B | Example |
| CF-16 | (48A) | ○ | A | B | A | Example |
| CF-17 | (49B) | ○ | B | B | A | Example |
| CF-18 | (58A) | ○ | A | B | B | Example |
| CF-19 | (58B) | ○ | B | B | B | Example |
| CF-20 | (59A) | ○ | A | B | B | Example |
| CF-21 | (59B) | ○ | B | B | B | Example |
| CF-22 | (101) | Δ | C | C | B | Comparative Example |
| CF-23 | (102) | ○ | C | B | B | Comparative Example |
| CF-24 | (105) | Δ | C | B | C | Comparative Example |
| CF-25 | Comparative compound 1 | ○ | A | D | C | Comparative Example |

It has been found from the results shown in Table 12 that the color filters CF-1 to CF-21 of the present invention are notably improved in a fastness such as a heat resistance, a light fastness and the like as compared with the comparative color filters CF-22 to CF-25 and have excellent properties as well in terms of a color tone and that they are endowed with excellent properties of color filters which can be applied to liquid crystal color displays and the like.

Example 4

Ink (1) Preparation of Color Fine Particle Dispersion

Zirconia beads 250 g having an average particle diameter of 0.5 nm were added to a mixed solution of 10 g of the colorant described in Table 13, 20 g of methyl ethyl ketone, 5 g of glycerin, 6 g of a copolymerized polymer (resin having a copolymerization ratio of styrene/acrylic acid/2-hydroxyethyl acrylate=80/5/15 which was neutralized) and 40 g of ion-exchanged water, and the mixture was dispersed for 4 hours by means of a media disperser (System Zeta; manufactured by Ashizawa Finetech Ltd.). After finishing dropwise adding, the zirconia beads were separated by filtering to obtain a dispersion. Water 40 ml was added to the above dispersion to dilute it, and then methyl ethyl ketone was removed by distillation under reduced pressure to obtain a color fine particle dispersion.

Preparation of Inks 1 to 26: Preparation of Aqueous Inks:

The color fine particle dispersion described above was weighed so that a content of the compounds contained in the inks described in Table 13 was 3% by mass based on a finished amount of the inks, and controlled were ethylene glycol to 15% by mass, glycerin to 15% by mass, triethylene glycol monobutyl ether to 3% by mass, Surfynol 465 to 0.3% by mass and water to the balance, followed by mixing and dispersing them. Then, the mixture was filtrated through a membrane filter of 2 μm to remove dusts and the coarse particles, whereby inks 1 to 26 were obtained as shown in Table 13.

Preparation of Image Samples and Evaluation of Color Tone:

The inks 1 to 26 obtained above were printed on a Canon photographic paper Gloss GP-501 by means of an ink jet printer (PM-800) commercially available from Seiko Epson Corp., and the resulting image samples were used to evaluate a light fastness, an ozone resistance and a color reproduction area of the images in the following manners.

<Light Fastness>

The sample was irradiated with a xenon light (80000 lux) for 48 hours by means of a xenon weather meter manufactured by Suga Test Instruments Co., Ltd., and then a reduction rate % (colorant residual rate (%)=(maximum absorption wavelength density of exposed sample)/(maximum absorption wavelength density of unexposed sample)×100) of a reflection spectral density in a visible region maximum absorption wavelength was calculated from the exposed sample and the unexposed sample to evaluate it according to the following four grade criteria. The following ranks A and B are classified to success in the evaluation.

A: colorant residual rate: 90% or more
B: colorant residual rate: 80% or more and less than 90%
C: colorant residual rate: 70% or more and less than 80%
D: colorant residual rate: less than 70%

<Ozone Resistance>

The sample obtained was left standing at room temperature for 10 days in a dark box in which an ozone gas concentration was set to 0.5±0.1 ppm, and a colorant residual rate thereof in a case in which a reflection density of the respective images was 1 was evaluated according to the following four grade criteria. The following ranks A and B are classified to success in the evaluation.

A: colorant residual rate: 90% or more
B: colorant residual rate: 80% or more and less than 90%
C: colorant residual rate: 70% or more and less than 80%
D: colorant residual rate: less than 70%

<Evaluation of Color Reproduction Area>

The respective solid image parts of single colors of yellow/magenta/cyn and R/G/B were used to measure the color gamuts thereof, whereby the areas thereof were confirmed to be expanded. The areas were compared, wherein a color region of Japan color for printing was set to 100. The following ranks A and B are classified to success in the evaluation.

A: area expansion: 15% or more
B: area expansion: 10% or more and less than 15%
C: area expansion: 5% or more and less than 10%
D: area expansion: less than 5%

The evaluation results are shown in Table 13. The comparative compounds 2 and 3 used for the inks shown in Table 13 are shown below.

TABLE 13

| Ink No. | Colorant | Light fastness | Ozone resistance | Evaluation of color reproduction area | Remarks |
|---|---|---|---|---|---|
| 1 | (3A) | A | A | A | Example |
| 2 | (3B) | A | A | A | Example |
| 3 | (4A) | A | A | A | Example |
| 4 | (4B) | A | A | A | Example |
| 5 | (6A) | A | A | A | Example |
| 6 | (6B) | A | A | B | Example |
| 7 | (13A) | A | A | B | Example |
| 8 | (13B) | A | A | B | Example |
| 9 | (16B) | A | A | B | Example |
| 10 | (19A) | A | A | B | Example |
| 11 | (19B) | A | A | B | Example |
| 12 | (31B) | A | A | B | Example |
| 13 | (38B) | A | A | B | Example |
| 14 | (39A) | A | A | B | Example |
| 15 | (44A) | A | A | B | Example |
| 16 | (48B) | A | A | B | Example |
| 17 | (49A) | A | A | B | Example |
| 18 | (49B) | A | A | B | Example |
| 19 | (57A) | A | B | B | Example |
| 20 | (57B) | A | B | B | Example |
| 21 | (60A) | A | B | B | Example |
| 22 | (60B) | A | B | B | Example |
| 23 | (102) | B | B | C | Comparative compound |
| 24 | (105) | B | C | C | Comparative compound |
| 25 | Comparative compound 2 | B | D | D | Comparative compound |
| 26 | Comparative compound 3 | C | C | C | Comparative compound |

Comparative compound 2

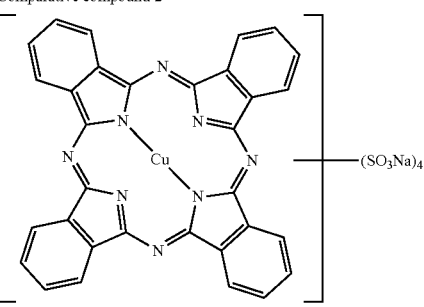

Comparative compound 3
mixture of (a)/(b)/(c) = 5/4/1 mole ratio

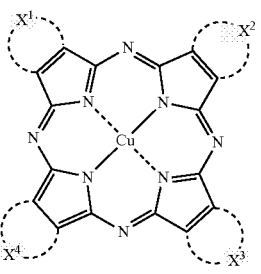

(a) one of X1 to X4 is

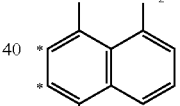

remaining three groups are

(b) remaining two of X1 to X4 are $SO_2NHCH_2CH(C_2H_5)C_4H_9$ remaining two groups are

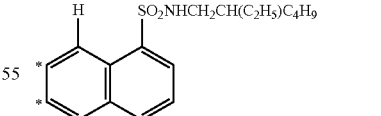

TABLE 13-continued

| Ink No. | Colorant | Light fastness | Ozone resistance | Evaluation of color reproduction area | Remarks |
|---|---|---|---|---|---|

(c) remaining three of X1 to X4 are

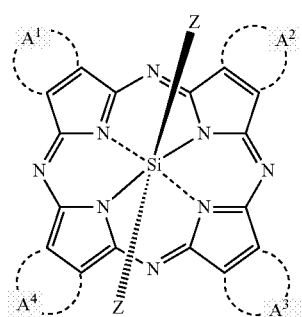

It can be found from the results shown in Table 13 that the image samples prepared by using the inks of the present invention have a good color tone, generate no bronzing and are excellent in a light fastness and an ozone resistance as compared with the image samples prepared by using the comparative inks.

According to the present invention, capable of being provided are a colorant which has a broad color reproducibility extending from a vivid tone to a dark tone and is excellent in a light fastness, a transparency and the like and which has a good electrostatic property and does not cause staining in an inside of the equipment, a colorant composition, a toner, an ink for ink jet recording, and a color filter.

What is claimed is:

1. A production process for a colorant, comprising:
   reacting raw materials of a silicon compound and phthalocyanine in the presence of a copper salt or a copper phthalocyanine compound to prepare a colorant containing a silicon phthalocyanine compound and a copper phthalocyanine compound.

2. The production process for a colorant as described in claim 1, wherein the silicon phthalocyanine compound is represented by the following Formula (1):

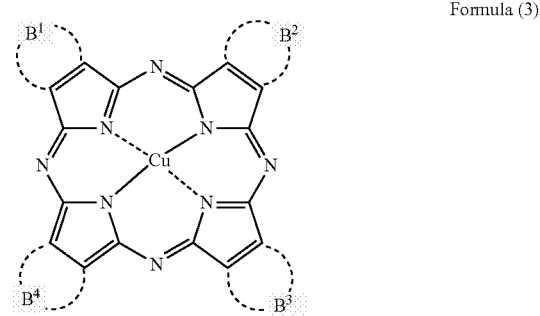

Formula (1)

wherein Z represents a chlorine atom, a hydroxyl group, an alkyl group, an alkoxy group, an aryloxy group or a group represented by the following Formula (2); and $A^1$ to $A^4$ represent the following atomic groups (a-1) to (a-7) which may have substituents:

Formula (2)

wherein $R^1$ to $R^3$ each represent independently an alkyl group, an aryl group or a siloxy group;

(a-1)

(a-2)

(a-3)

(a-4)

(a-5)

(a-6)

(a-7)

3. The production process for a colorant as described in claim 1, wherein the copper phthalocyanine compound is represented by the following Formula (3):

Formula (3)

wherein $B^1$ to $B^4$ represent the following atomic groups (a-1) to (a-7) which may have substituents:

(a-1)

(a-2)

(a-3)

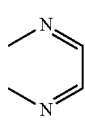
(a-4)

(a-5)

(a-6)

(a-7)

4. The production process for a colorant as described in claim 1, wherein:

the raw materials of the silicon compound and the phthalocyanine are reacted in the presence of the copper salt to prepare the colorant containing the silicon phthalocyanine compound and the copper phthalocyanine compound.

5. The production process for a colorant as described in claim 1, wherein the copper salt is copper chloride.

6. The production process for a colorant as described in claim 1, wherein a ratio (m1:m2) of a mass content (m1) of the silicon phthalocyanine compound contained in the colorant to a mass content (m2) of the copper phthalocyanine compound contained in the colorant is 99:1 to 80:20.

* * * * *